(12) United States Patent (10) Patent No.: US 8,206,618 B2
Moriyama et al. (45) Date of Patent: Jun. 26, 2012

(54) COLOR FILTER INK SET, COLOR FILTER, IMAGE DISPLAY DEVICE, AND ELECTRONIC DEVICE

(75) Inventors: Hidekazu Moriyama, Fujimi-machi (JP); Masaya Shibatani, Nagano (JP); Hiroshi Kiguchi, Nagano (JP); Hiroshi Takiguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 354 days.

(21) Appl. No.: 12/343,900

(22) Filed: Dec. 24, 2008

(65) Prior Publication Data

US 2009/0184297 A1 Jul. 23, 2009

(30) Foreign Application Priority Data

Jan. 18, 2008 (JP) ................................ 2008-008813

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)
*G02F 1/1335* (2006.01)

(52) U.S. Cl. ........ 252/582; 252/500; 252/586; 349/106; 427/162; 430/7; 524/461; 524/520

(58) Field of Classification Search .................. 349/106; 252/586, 582, 500; 359/885; 524/520, 517, 524/555, 548, 461, 157, 94, 88; 428/195.1; 427/162, 542, 596; 106/31.77, 31.92; 118/642; 430/7

See application file for complete search history.

(56) References Cited

U.S. PATENT DOCUMENTS

| | | | |
|---|---|---|---|
| 4,510,024 A | 4/1985 | Kishida et al. | |
| 5,821,314 A | 10/1998 | Ikushima et al. | |
| 6,410,206 B1 | 6/2002 | Ueda et al. | |
| 6,562,116 B1 * | 5/2003 | Satoh | 106/31.58 |
| 6,696,207 B1 * | 2/2004 | Iwasaki et al. | 430/7 |
| 6,826,001 B2 | 11/2004 | Funakura et al. | |
| 2005/0215675 A1 | 9/2005 | Nishida et al. | |
| 2006/0003256 A1 * | 1/2006 | Takahashi et al. | 430/270.1 |
| 2006/0079605 A1 * | 4/2006 | Sato et al. | 523/176 |
| 2006/0098316 A1 | 5/2006 | Tatsuzawa et al. | |
| 2006/0128832 A1 | 6/2006 | Kang et al. | |
| 2007/0146914 A1 | 6/2007 | Yamamoto | |
| 2007/0182796 A1 | 8/2007 | Ohkubo et al. | |
| 2007/0186804 A1 | 8/2007 | Heckmann et al. | |
| 2009/0114888 A1 | 5/2009 | Nishida et al. | |

FOREIGN PATENT DOCUMENTS

| | | |
|---|---|---|
| CN | 1113084 C | 7/2003 |
| CN | 101078791 A | 11/2007 |
| JP | 59-074110 A | 4/1984 |
| JP | 07-138491 A | 5/1995 |
| JP | 11-323198 A | 11/1999 |
| JP | 2002-357712 A | 12/2002 |
| JP | 2002-372613 A | 12/2002 |
| JP | 2003-064236 A | 3/2003 |
| JP | 2003-172817 A | 6/2003 |
| JP | 2004-091497 A | 3/2004 |
| JP | 2005-165176 A | 6/2005 |
| JP | 2005-315984 A | 11/2005 |
| JP | 2006-169495 A | 6/2006 |
| JP | 2006-282762 A | 10/2006 |
| JP | 2007-204658 A | 8/2007 |
| JP | 2007-206483 * | 8/2007 |
| JP | 2007-284589 A | 11/2007 |
| JP | 2007-284590 A | 11/2007 |
| JP | 2007-291232 A | 11/2007 |
| JP | 2007-298971 A | 11/2007 |
| WO | WO-95/35336 A1 | 12/1995 |

OTHER PUBLICATIONS

Office Action dated Apr. 26, 2011 for the corresponding U.S. Appl. No. 12/264,636.
Struck et al.; Additives for Radiation Curing Coatings and Inks; China Academic Journal Electronic Publishing House; Dec. 31, 2002; pp. 78-83.

\* cited by examiner

*Primary Examiner* — Bijan Ahvazi

(74) *Attorney, Agent, or Firm* — Global IP Counselors, LLP

(57) ABSTRACT

A color filter ink set is adapted to be used to manufacture a color filter by an inkjet method. The color filter ink set includes a plurality of inks with each of the inks including a colorant and a liquid medium that disperses and/or dissolves the colorant. The inks include a green ink having C. I. Pigment Green 58 and a substance represented by a prescribed chemical formula. A viscosity at 25° C. of the liquid medium of the green ink is lower than a viscosity at 25° C. of the liquid medium of the ink other than the green ink. A difference ($\eta_{max}-\eta_{min}$) between a viscosity ($\eta_{max}$ (mPa·s)) of the ink having the highest viscosity among the inks at 25° C. and a viscosity ($\eta_{min}$ (mPa·s)) of the ink having the lowest viscosity among the inks at 25° C. is 1.0 mPa·s or less.

14 Claims, 10 Drawing Sheets

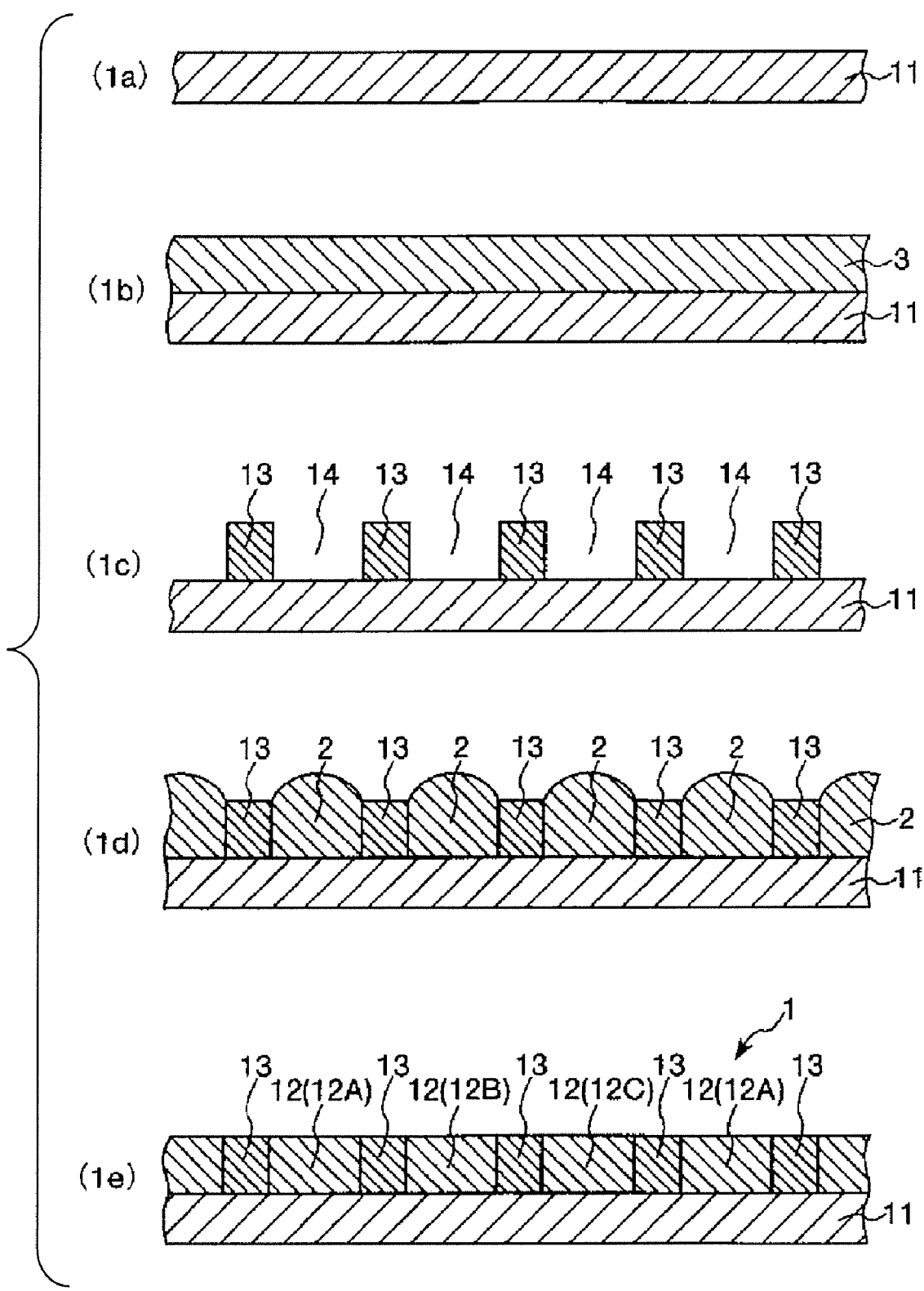
F I G. 2

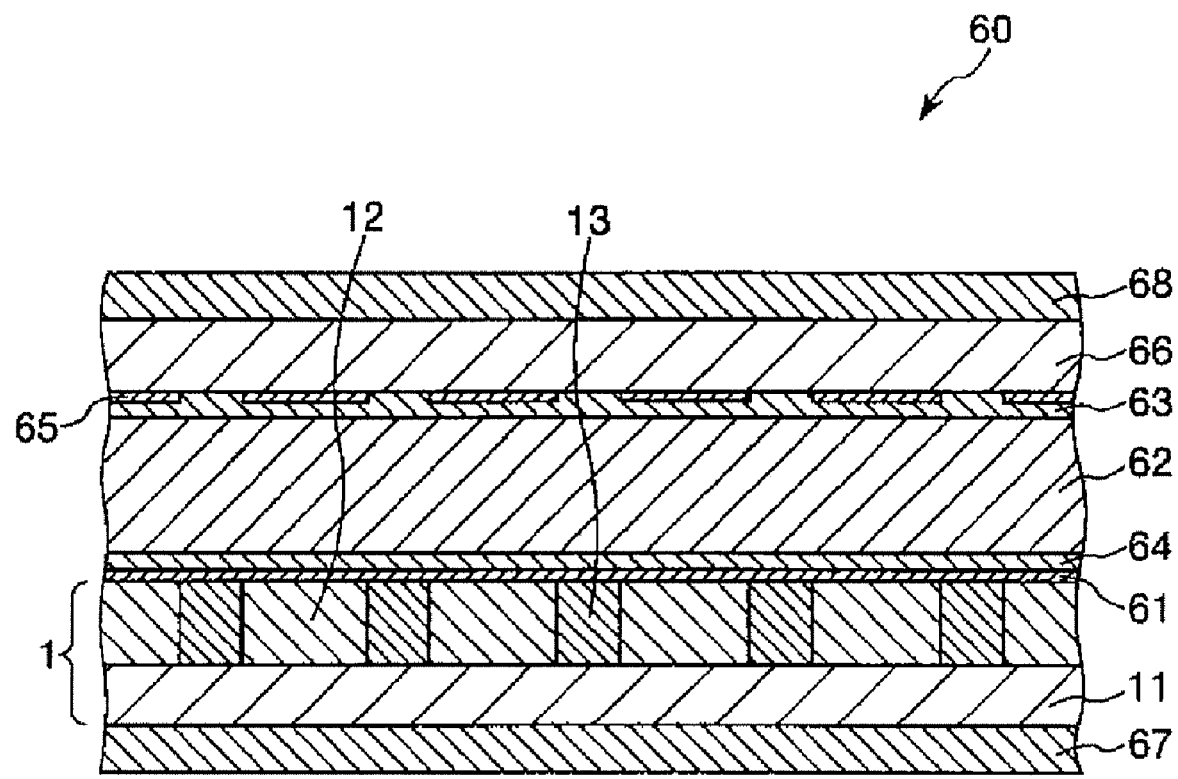
F I G. 7

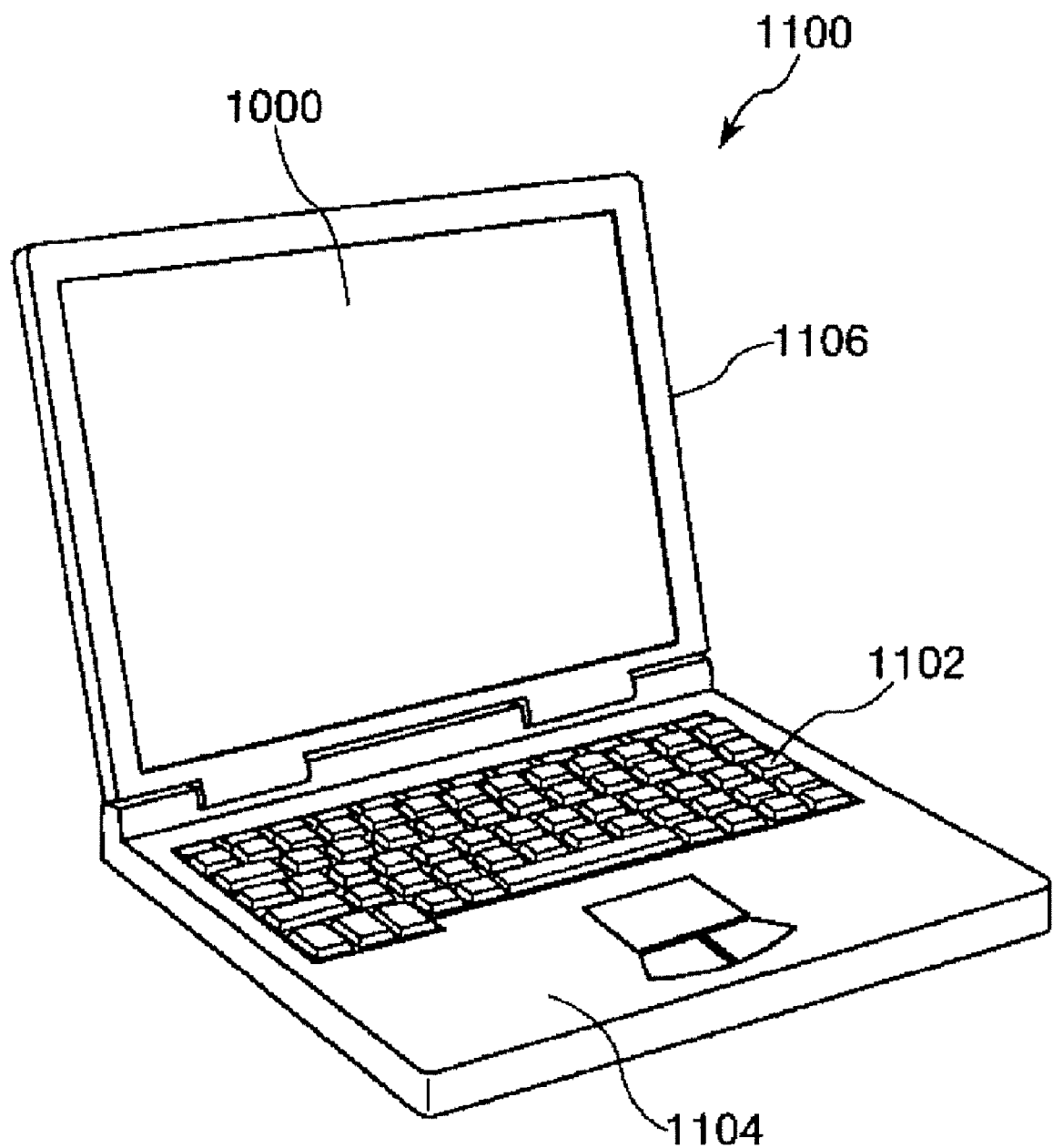
F I G. 8

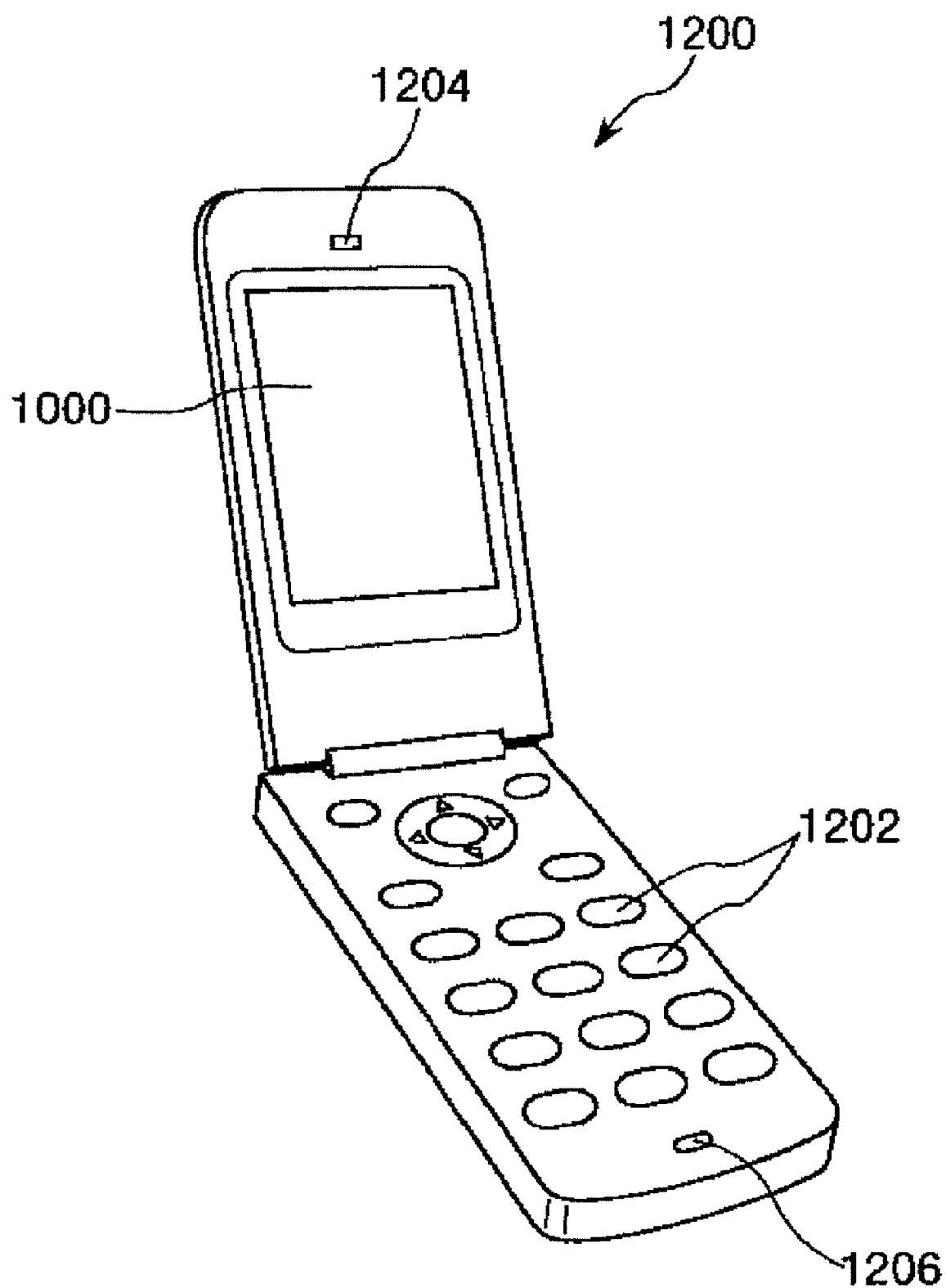
F I G. 9

COLOR FILTER INK SET, COLOR FILTER, IMAGE DISPLAY DEVICE, AND ELECTRONIC DEVICE

CROSS-REFERENCE TO RELATED APPLICATIONS

This application claims priority to Japanese Patent Application No. 2008-008813 filed on Jan. 18, 2008. The entire disclosure of Japanese Patent Application No. 2008-008813 is hereby incorporated herein by reference.

BACKGROUND

1. Technical Field

The present invention relates to a color filter ink set, a color filter, an image display device, and an electronic device.

2. Related Art

Color filters are generally used in liquid crystal display devices (LCD) and the like that display color. A color filter is generally provided with three colors of colored portions that correspond to the three primary colors of light, which are red, green and blue, and in a liquid crystal display device provided with the color filter, color display is performed by adjusting the transmittance of light in the three colors of colored portions.

Color filters have conventionally been manufactured using a so-called photolithography method in which a coating film composed of a material (color layer formation composition) that includes a colorant, a photosensitive resin, a functional monomer, a polymerization initiator, and other components is formed on a substrate, and then photosensitive processing for radiating light via a photomask, development processing, and the like are performed. In such a method, the color filters are usually manufactured by repeating a process in which a coating film corresponding to each color is formed on substantially the entire surface of the substrate, only a portion of the coating film is cured, and most of the film other than the cured portion is removed, so that there is no color overlap. Therefore, only a portion of the coating film formed in color filter manufacturing remains as a color layer in the finished color filter, and most of the coating film is removed in the manufacturing process. Therefore, not only does the manufacturing cost of the color filter increase, but the process is also undesirable from the perspective of resource saving.

Methods have recently been proposed for forming the color layer of a color filter through the use of an inkjet head (droplet discharge head) (see Japanese Laid-Open Patent Application No. 2002-372613, for example). In such a method, because the discharge position and the like of droplets of the material (color layer formation composition) used to form the color layer are easily controlled, and waste of the color layer formation composition can be reduced, the environmental impact can be reduced, and manufacturing cost can also be minimized. The same composition of liquid medium is generally used in each color of ink in an ink set for a color filter.

The colored portions of each color in a color filter include the corresponding color of pigment. C. I. Pigment Green 36 is generally used as the pigment in green-colored ink (green ink) for forming a green colored portion. C. I. Pigment Green 36 (green pigment) and a yellow pigment such as C. I. Pigment Yellow 150 are used in the green ink for hue adjustment and other purposes. Through the use of C. I. Pigment Yellow 150 (yellow pigment), effects can be anticipated whereby the transmittance of light is enhanced (a bright panel is obtained) while the content ratio of C. I. Pigment Green 36 (green pigment) is relatively reduced, and the color reproduction range is maintained. In order for the effects of using C. I. Pigment Yellow 150 (yellow pigment) to be adequately demonstrated, C. I. Pigment Yellow 150 (yellow pigment) must be included at a relatively high concentration (e.g., 2.0 to 5.0 wt %) in the green ink. There is relatively little effect on the viscosity of the ink when the content ratio of C. I. Pigment Yellow 150 (yellow pigment) in the ink is relatively low, but when the content ratio is relatively high, the viscosity of the ink abruptly increases. As a result, when the green ink includes a relatively high concentration of C. I. Pigment Yellow 150 (yellow pigment), the viscosity of the green ink is high relative to the viscosities of the other colors of ink, and problems occur in that there is a large difference between the discharge quantities of each color of ink. Since the discharge quantity easily becomes unstable in the green ink, unevenness of color easily occurs between regions of the color filter. Since the droplet discharge device (industrial) used for color filter manufacturing is entirely different from what is used for a printer (consumer-level), and the droplet discharge device is used for mass production and droplet discharge onto large-scale workpieces (substrates), for example, there is a need to discharge large quantities of droplets for long periods of time. Because the droplet discharge device is used under such harsh conditions, variation of the droplet discharge quantity occurs more readily than in a consumer-level printer, but when such variation of the discharge quantity occurs, fluctuations in characteristics occur among numerous manufactured color filters, fluctuation of color saturation occurs between regions of a color filter, and the reliability of the color filter as a product is significantly reduced.

There has recently been a tendency towards using color filter inks having a high colorant content in order to maintain a wider color reproduction range in a color filter, but such problems as those described above become more severe as the content ratio of the colorant is increased.

SUMMARY

An object of the present invention is to provide an inkjet-type color filter ink set having excellent uniformity of discharge properties among a plurality of types of ink, that can be stably and suitably used to manufacture a color filter; to provide a color filter having excellent uniformity of characteristics between individual units, and in which unevenness of color and saturation between different regions is suppressed; and to provide an image display device and electronic device provided with the color filter.

Such objects are achieved by the present invention described hereinafter.

A color filter ink set according to a first aspect is adapted to be used to manufacture a color filter by an inkjet method. The color filter ink set includes a plurality of inks with each of the inks including a colorant and a liquid medium that disperses and/or dissolves the colorant. The inks include a green ink having C. I. Pigment Green 58 and a substance represented by Formula (1) below.

Formula (1)

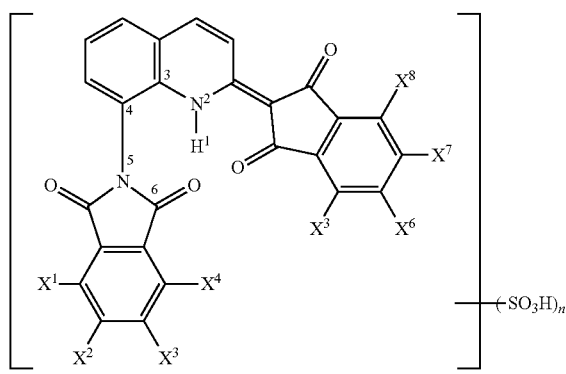

Formula (2)

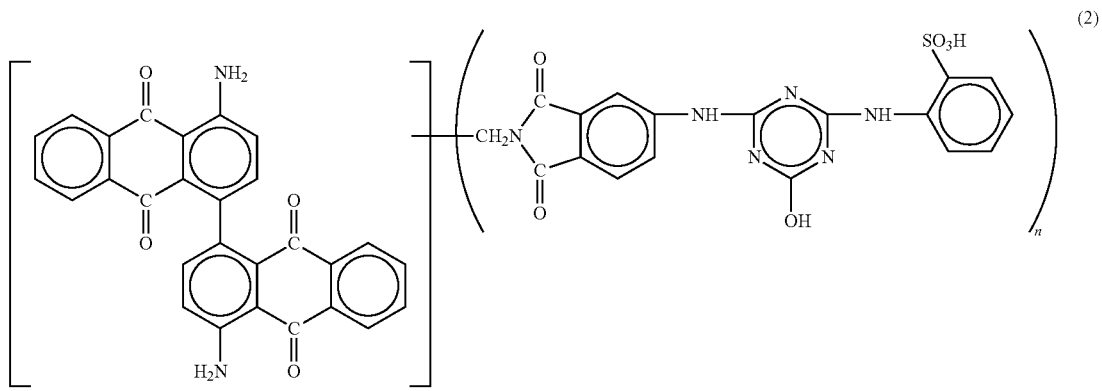

Formula (3)

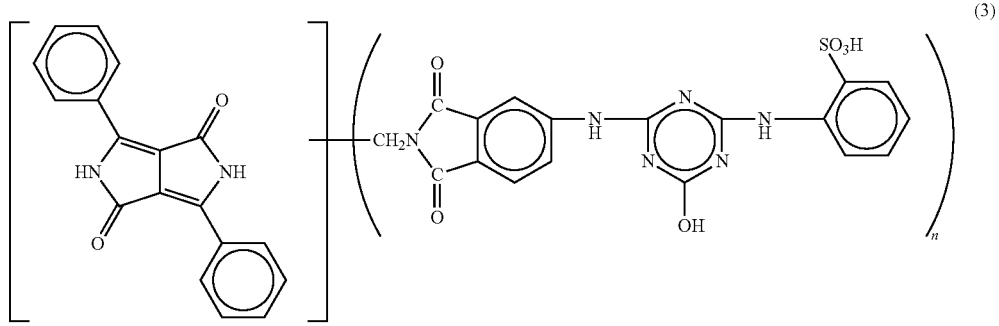

In Formula (1), a value n is an integer from 1 to 5, and $X^1$ through $X^8$ represents each independently a hydrogen atom or a halogen atom.

A viscosity at 25° C. of the liquid medium of the green ink is lower than a viscosity at 25° C. of the liquid medium of the ink other than the green ink. A difference ($\eta_{max}-\eta_{min}$) between a viscosity ($\eta_{max}$ (mPa·s)) of the ink having the highest viscosity among the inks at 25° C. and a viscosity ($\eta_{min}$ (mPa·s)) of the ink having the lowest viscosity among the inks at 25° C. is 1.0 mPa·s or less.

It is thereby possible to provide an inkjet-type color filter ink set having excellent uniformity of discharge properties among a plurality of types of ink, that can be stably and suitably used to manufacture a color filter.

In the color filter ink set as described above, the inks preferably further include a red ink having one or more substances selected from the group consisting of C. I. Pigment Red 177, C. I. Pigment Red 254, a pigment derivative represented by a chemical formula (2) below, and a pigment derivative represented by a chemical formula (3) below.

In Formula (2), a value n is an integer from 1 to 4.

In Formula (3), a value n is an integer from 1 to 4.

The color filter can thereby be provided with a particularly wide color reproduction range.

In the color filter ink set as described above, a sum of a content ratio of C. I. Pigment Red 177, a content ratio of C. I. Pigment Red 254, a content ratio of the pigment derivative represented by the chemical formula (2), and a content ratio of the pigment derivative represented by the chemical formula (3) in the red ink is preferably 3.0 to 10 wt %.

Adequate color saturation can thereby be maintained in the manufactured color filter while the red ink is provided with excellent discharge properties from the droplet discharge head (inkjet head) for manufacturing the color filter. The manufactured color filter can also be provided with particularly excellent uniformity of color saturation among the different colored portions. The manufactured color filter can also be provided with excellent durability.

In the color filter ink set as described above, the inks preferably further include a blue ink having C. I. Pigment Blue 15:6.

The color filter can thereby be provided with particularly a wide color reproduction range.

In the color filter ink set as described above, a content ratio of C. I. Pigment Blue 15:6 in the blue ink is preferably 3.0 to 10 wt %.

Adequate color saturation can thereby be maintained in the manufactured color filter while the blue ink is provided with excellent discharge properties from the droplet discharge head (inkjet head) for manufacturing the color filter. The manufactured color filter can also be provided with particularly excellent uniformity of color saturation among the different colored portions. The manufactured color filter can also be provided with excellent durability.

In the color filter ink set as described above, a content ratio of C. I. Pigment Green 58 in the green ink is preferably 6.0 to 15 wt %.

Adequate color saturation and light transmission properties can thereby be maintained in the manufactured color filter while the green ink is provided with excellent discharge properties from the droplet discharge head (inkjet head) for manufacturing the color filter. The manufactured color filter can also be provided with particularly excellent uniformity of color saturation among the different colored portions. The manufactured color filter can also be provided with excellent durability.

In the color filter ink set as described above, the inks are preferably arranged to satisfy a relationship $0.02 \leq C_C/C_{G58} \leq 0.32$, wherein a value $C_{G58}$ (wt %) indicates a content ratio of C. I. Pigment Green 58 in the green ink and a value $C_C$ (wt %) indicates a content ratio of the substance represented by the chemical formula (1) in the green ink.

An adequate color reproduction range can thereby be maintained in the manufactured color filter while the green ink is provided with excellent discharge stability from the droplet discharge head (inkjet head) for manufacturing the color filter. The manufactured color filter can also be provided with excellent durability.

In the color filter ink set as described above, at least one of the inks preferably further includes a curable resin material having a first polymer containing at least a first epoxy-containing vinyl monomer as a monomer component.

Particularly excellent durability can thereby be obtained in the manufactured color filter while the ink is provided with excellent discharge stability from the droplet discharge head (inkjet head) for manufacturing the color filter.

In the color filter ink set as described above, the first polymer is preferably a copolymer having the first epoxy-containing vinyl monomer and a second vinyl monomer as monomer components, the second vinyl monomer having an isocyanate group or a block isocyanate group in which an isocyanate group is protected by a protective group.

It is thereby possible to more effectively prevent the manufactured color filter (colored portion) from changing over time, and the color filter can be provided with particularly excellent durability. The ink can also be provided with particularly excellent discharge stability, unevenness of color, saturation, and other characteristics between regions of the manufactured color filter can be more effectively prevented, and the manufactured color filter can be provided with particularly excellent uniformity of characteristics among individual units.

In the color filter ink set as described above, the curable resin material preferably further includes a second polymer containing at least an alkoxysilyl-containing vinyl monomer represented by Formula (4) below as a monomer component.

Formula (4)

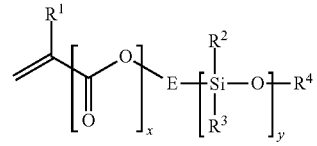

(4)

In Formula (4), $R^1$ represents a hydrogen atom or a $C_{1-7}$ alkyl group, E represents a single bond hydrocarbon group or a bivalent hydrocarbon group, $R^2$ represents a $C_{1-6}$ alkyl group or a $C_{1-6}$ alkoxyl group, $R^3$ represents a $C_{1-6}$ alkyl group or a $C_{1-6}$ alkoxyl group, $R^4$ represents a $C_{1-6}$ alkyl group, a value x is 0 or 1, and a value y is an integer from 1 to 10.

It is thereby possible to provide the ink with particularly excellent discharge stability, to more effectively prevent unevenness of color, saturation, and other characteristics between regions of the manufactured color filter, to obtain particularly excellent uniformity of characteristics between units, to obtain particularly excellent adhesion of the formed colored portion to the substrate, and to provide the manufactured color filter with particularly excellent durability (light fastness, thermal resistance, and other characteristics).

In the color filter ink set as described above, at least one of the inks preferably has a dispersing agent including an acid-value dispersing agent having a predetermined acid value and an amine-value dispersing agent having a predetermined amine value, with the acid-value dispersing agent and the amine-value dispersing agent being arranged to satisfy a relationship $0.01 \leq (AV \times C_A)/(BV \times C_B) \leq 1.9$, wherein a value AV (KOH mg/g) is the predetermined acid value of the acid-value dispersing agent, a value BV (KOH mg/g) is the predetermined amine value of the amine-value dispersing agent, a value $C_A$ (wt %) is a content ratio of the acid-value dispersing agent in the ink, and a value $C_B$ (wt %) is a content ratio of the amine-value dispersing agent in the ink.

It is thereby possible to provide the ink with particularly excellent discharge stability, to more effectively prevent unevenness of color, saturation, and other characteristics between regions of the manufactured color filter, and to obtain particularly excellent uniformity of characteristics between units.

A color filter according to a second aspect is manufactured using the color filter ink set as described above.

It is thereby possible to provide a color filter having excellent durability and excellent uniformity of characteristics between units, in which unevenness of color and saturation among regions is suppressed.

An image display device according to a third aspect has the color filter as described above.

It is thereby possible to provide an image display device having excellent durability and excellent uniformity of characteristics between units, in which unevenness of color and saturation among regions of the display portion is suppressed.

The image display device as described above is preferably a liquid crystal panel.

It is thereby possible to provide an image display device having excellent durability and excellent uniformity of characteristics between units, in which unevenness of color and saturation among regions of the display portion is suppressed.

An electronic device according to a fourth aspect has the image display device as described above.

It is thereby possible to provide an electronic device having excellent durability and excellent uniformity of characteristics between units, in which unevenness of color and saturation among regions of the display portion is suppressed.

BRIEF DESCRIPTION OF THE DRAWINGS

Referring now to the attached drawings which form a part of this original disclosure:

FIG. 2 includes a series of cross-sectional views (1*a*) to (1*e*) showing a method for manufacturing a color filter.

FIG. 7 is a cross-sectional view showing an embodiment of a liquid crystal display device.

FIG. 8 is a perspective view showing a mobile (or notebook) personal computer exemplifying an electronic device in accordance with the present invention.

FIG. 9 is a perspective view showing a portable telephone (including PHS) exemplifying an electronic device in accordance with the present invention.

DETAILED DESCRIPTION OF EXEMPLARY EMBODIMENTS

Figure 1:
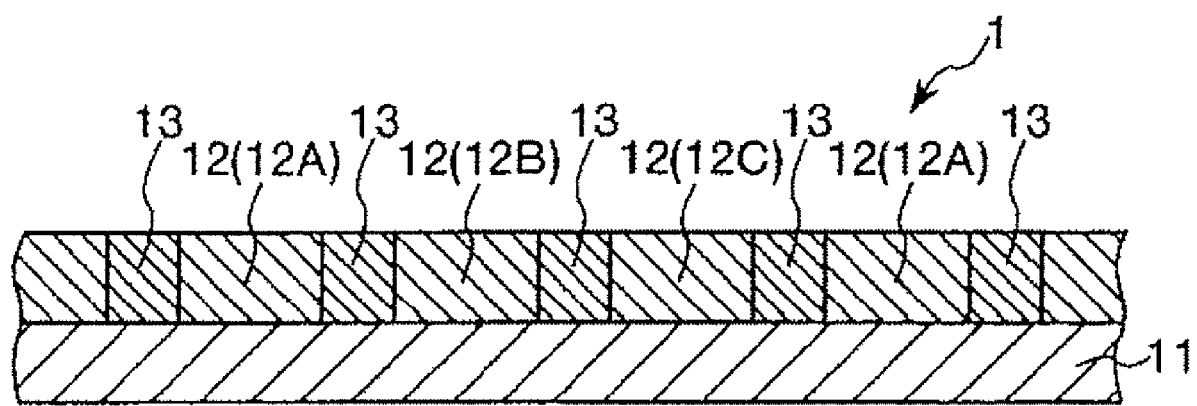
FIG. 1 is a cross-sectional view showing a preferred embodiment of a color filter according to the present invention.

Preferred embodiments of the present invention will be described in detail hereinafter.

Color Filter Ink Set

The color filter ink set of the present invention is an ink set used to manufacture (form the colored portion of a color filter) a color filter, and is used particularly in the manufacture of a color filter by an inkjet method.

The color filter ink set of the present invention is provided with a plurality of types of ink (color filter inks).

The ink set of the present invention is provided with a green ink (G ink) that includes C. I. Pigment Green 58 as a green pigment and a substance indicated by Formula (1) below, but the ink set is preferably also provided with a red-colored ink (red ink) and a blue-colored ink (blue ink), which are the other two colors constituting the primary colors of light. The color filter ink set will be described hereinafter as typically comprising the three types of ink that include "green ink (G ink)," "red ink (R ink)," and "blue ink (B ink)."

Formula (1)

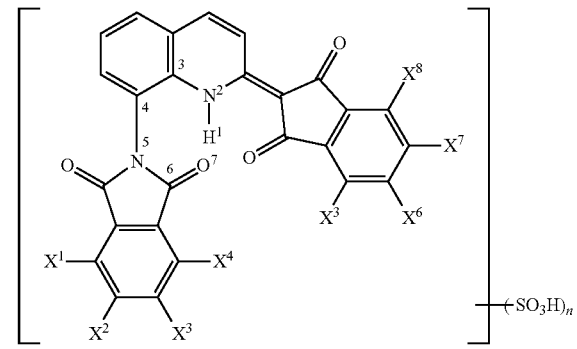

(1)

In Formula (1), n is an integer from 1 to 5; and $X^1$ through $X^8$ are each independently a hydrogen atom or a halogen atom.

Ink (Color Filter Ink)

Each ink (color filter ink) constituting the color filter ink set includes a colorant, and a liquid medium or the like for dispersing and/or dissolving the colorant.

In a color filter, C. I. Pigment Green 36 is generally used as the component material of the green colored portion. A yellow pigment such as C. I. Pigment Yellow 150 is also used together with the C. I. Pigment Green 36 (green pigment) as the component material of the green colored portion for such purposes as hue adjustment. Through the use of C. I. Pigment Yellow 150 (yellow pigment), effects can be anticipated whereby the transmittance of light in the color filter is enhanced (a bright panel is obtained) while the content ratio of C. I. Pigment Green 36 (green pigment) is relatively reduced, and the color reproduction range is maintained. In order for the effects of using C. I. Pigment Yellow 150 (yellow pigment) to be adequately demonstrated, C. I. Pigment Yellow 150 (yellow pigment) must be included at a relatively high concentration (e.g., 2.0 to 5.0 wt %) in the green ink for forming the green colored portion. There is relatively little effect on the viscosity of the ink when the content ratio of C. I. Pigment Yellow 150 (yellow pigment) in the ink is relatively low, but when the content ratio is relatively high, the viscosity of the ink abruptly increases. As a result, when the green ink includes a relatively high concentration of C. I. Pigment Yellow 150 (yellow pigment), the viscosity of the green ink is high relative to the viscosities of the other colors of ink, and problems occur in that there is a large difference between the discharge quantities of each color of ink during discharge of ink by the inkjet method. Since the discharge quantity easily becomes unstable in the green ink, unevenness of color easily occurs between regions of the color filter. Since the droplet discharge device (industrial) used for color filter manufacturing is entirely different from what is used for a printer (consumer-level), and the droplet discharge device is used for mass production and droplet discharge onto large-scale workpieces (substrates), for example, there is a need to discharge large quantities of droplets for long periods of time. Because the droplet discharge device is used under such harsh conditions, variation of the droplet discharge quantity occurs more readily than in a consumer-level printer, but when such variation of the discharge quantity occurs, fluctuations in characteristics occur among numerous manufactured color filters, fluctuation of color saturation occurs between regions of a color filter, and the reliability of the color filter as a product is significantly reduced.

Therefore, a configuration is adopted in the present invention whereby the green ink includes C. I. Pigment Green 58 and a substance indicated by Formula (1), the viscosity at 25° C. of the liquid medium constituting the green ink (the ink that includes C. I. Pigment Green 58 and a substance indicated by Formula (1)) is lower than the viscosity at 25° C. of the liquid medium constituting the inks other than the green ink, and the difference ($\eta_{max}-\eta_{min}$) of the viscosity ($\eta_{max}$ [mPa·s]) at 25° C. of the ink that has the highest viscosity at 25° C. among the plurality of inks constituting the color filter ink set and the viscosity ($\eta_{min}$ [mPa·s]) at 25° C. of the ink that has the lowest viscosity at 25° C. among the plurality of inks constituting the color filter ink set is 1.0 mPa·s or less. By satisfying such conditions, the color filter ink set can be stably and suitably used to manufacture a color filter in which there is excellent uniformity of discharge properties between the plurality of types of ink. Excellent brightness can also be obtained in the image displayed using the color filter, while an extremely wide color reproduction range is obtained in the manufactured color filter. In the present invention, a value obtained by measurement at 25° C. using an E-type viscometer can be used as the viscosity value, and a value obtained by measurement at 25° C. in accordance with JIS Z8809 in particular may be used.

In contrast, such effects as described above are not obtained when at least one of the abovementioned conditions is not satisfied. Specifically, when the viscosity at 25° C. of the liquid medium constituting the green ink (the ink that includes C. I. Pigment Green 58 and a substance indicated by Formula (1)) is the same as or higher than the viscosity at 25° C. of the liquid medium constituting an ink other than the green ink, the difference between the viscosity of the green ink and the viscosity of the other colors of ink is too large when the value of $\eta_{max}-\eta_{min}$ is too large, and a large difference occurs between the discharge quantities of the different colors of ink. As a result, it becomes difficult to make the color saturation of the green colored portion the same as the color saturation of the other colors of colored portions in the color filter. When such conditions as those described above are not satisfied, the discharge quantity of the green ink becomes unstable during discharge of ink by the inkjet method, fluctuation readily occurs in the color saturation of the green colored portion between regions of the color filter, severely uneven color and saturation occur between different regions, and there is significant fluctuation of characteristics between individual color filter units.

When a green ink is used that does not include the substance indicated by Formula (1), it is difficult to adjust to the desired hue and maintain the high light transmittance desired in the present invention. It is also impossible to obtain adequately excellent dispersion stability (green ink storage stability) of the C. I. Pigment Green 58 in the green ink, and the green ink cannot be used to manufacture color filters stably over a long period of time.

It is also possible to use C. I. Pigment Yellow 150 or another yellow pigment instead of the substance indicated by Formula (1), but in such a case, it is difficult to obtain an adequately small difference between the viscosity of the green ink and the viscosity of the other colors of ink, and to make the difference in the discharge quantities of the different colors of ink adequately small, and it is also difficult to make the color saturation of the green colored portion in the color filter the same as the color saturation of the other colors of colored portions.

It is also possible to use C. I. Pigment Green 36 or the like instead of C. I. Pigment Green 58, but in such a case, the color filter manufactured using the color filter ink set cannot be provided with a wide color reproduction range. The high light transmittance desired in the present invention is also difficult to maintain.

Even when the viscosity at 25° C. of the liquid medium constituting the green ink is the same as or higher than the viscosity at 25° C. of the liquid medium constituting the inks other than the green ink, the difference between the viscosity of the green ink and the viscosity of the other inks may be reduced by making the content ratio of C. I. Pigment Green 58 in the green ink relatively low, but in such a case, such problems as the following occur. Specifically, a large amount of green ink is required in order to form a colored portion having adequate color saturation, and a large amount of green ink must be discharged into the cell in the color filter manufacturing method such as described hereinafter, but since the amount of ink per unit of time (in a range that does not reduce the drawing speed) that can be accommodated in a cell is limited, it is difficult to form a colored portion having adequate color saturation. It may be possible to form an adequately saturated green colored portion by repeatedly performing a step for applying the green ink in the cell by the inkjet method, and a step for removing the liquid medium (liquid vehicle) included in the green ink, but in such a case, not only are the production properties of the color filter severely compromised, but the constituent materials of the substrate or the other colored portions can be degraded by heat or the like that is repeatedly applied in the step for removing the liquid medium (liquid vehicle). When the step for applying the green ink in the cell by the inkjet method and the step for removing the liquid medium (liquid vehicle) included in the green ink are repeatedly performed, the amount of ink (amount of the liquid medium) used to form the colored portions increases, and the merits of the inkjet method regarding resource saving and reduced environmental impact are not adequately obtained.

It is sufficient insofar as the difference ($\eta_{max}-\eta_{min}$) of the viscosity ($\eta_{max}$ (mPa·s)) at 25° C. of the ink that has the highest viscosity at 25° C. among the plurality of inks constituting the color filter ink set and the viscosity ($\eta_{min}$ (mPa·s)) at 25° C. of the ink that has the lowest viscosity at 25° C. among the plurality of inks constituting the color filter ink set is 1.0 mPa·s or less, but a difference of 0.9 mPa·s or less is preferred, and a difference of 0.8 mPa·s or less is more preferred. Such effects as those described above are thereby more significantly demonstrated.

The viscosities at 25° C. of the color filter inks constituting the color filter ink set are all preferably 5.0 to 15.0 mPa·s, and more preferably 6.0 to 10.0 mPa·s. blockage and the like in the droplet discharge head can thereby be more reliably prevented while fluctuations in the droplet quantity of the discharged color filter ink are made particularly small in droplet discharge by the inkjet method such as described hereinafter.

It is particularly preferred that the viscosity at 25° C. of the green ink constituting the color filter ink set be 5.0 to 9.0 mPa·s, and more preferably 6.0 to 8.1 mPa·s.

The viscosity at 25° C. of the red ink constituting the color filter ink set is preferably 5.5 to 10.0 mPa·s, and more preferably 6.5 to 9.0 mPa·s.

The viscosity at 25° C. of the blue ink constituting the color filter ink set is preferably 5.5 to 10.0 mPa·s, and more preferably 6.5 to 9.0 mPa·s.

Colorant

A color filter has a plurality of different colors of colored portions (generally three colors of colored portions corresponding to RGB). Each ink (color filter ink) constituting the color filter ink set includes a colorant that corresponds to the hue of colored portion that is to be formed. Various types of pigments and dyes, for example, may be used as the colorant constituting the color filter ink.

Green Ink

As described above, the green ink includes C. I. Pigment Green 58 as a colorant (pigment), and a substance indicated by Formula (1).

Although C. I. Pigment Green 58 has the characteristics of excellent brightness, C. I. Pigment Green 58 is a material that is extremely difficult to stably disperse in the color filter ink by the conventional technique. The conventional technique also has drawbacks in that the droplet discharge stability is severely reduced when C. I. Pigment Green 58 is included in the color filter ink (green ink) used in the inkjet method. In the present invention, however, the dispersion stability of the C. I. Pigment Green 58 is enhanced, and adequately excellent droplet discharge stability is obtained through joint use of C. I. Pigment Green 58 and the substance indicated by Formula (1).

When the green ink includes C. I. Pigment Green 58 (a brominated zinc phthalocyanine pigment), the ink can be provided with particularly excellent coloration properties. An image having more excellent contrast can also be displayed in the manufactured color filter. In a method such as the one described hereinafter, the fine dispersion step can be made particularly efficient, and the color filter ink (green ink) can be manufactured in a short time using a relatively small amount of energy. A particularly excellent product yield of the color filter ink can therefore be obtained, which also contributes to reduced production cost.

As a result of concentrated investigation, the inventors discovered that excellent effects are obtained by using the substance indicated by Formula (1) together with C. I. Pigment Green 58 as described above, and although the mechanism of these effects is not known in detail, the effects are considered to be obtained for such reasons as those described below.

A highly conjugated system is formed by the molecule as a whole in the brominated phthalocyanine that constitutes C. I. Pigment Green 58, and a planar structure is energetically stable. Planar molecules of the brominated phthalocyanine are in a layered (parallel to each other) arrangement, whereby a stable state occurs in which π electrons of conjugated systems between molecules are overlapped. The C. I. Pigment Green 58 is therefore easily aggregated, and difficult to stably disperse in a liquid medium.

In the substance indicated by Formula (1), the hydrogen atom bonded to a nitrogen atom in Formula (1) forms a hydrogen bond between the oxygen atoms that form a phthalimide structure. For this reason, the hydrogen atom bonded to a nitrogen atom in Formula (1) substantially forms a strong bond with the nitrogen atom forming the quinoline structure, as well as the oxygen atom forming the phthalimide structure, and in the substance indicated by Formula (1), a stable ring structure (seven-member ring structure) is formed by the seven atoms that are labeled 1 through 7 in Formula (1). A non-parallel state with respect to the plane of the quinoline structure and the plane of the phthalimide structure occurs through the formation of such a seven-member ring structure.

The plane of the quinoline structure, and the plane of the phthalimide structure are thus non-parallel, whereby a substance indicated by Formula (1) having the appropriate degree of affinity to C. I. Pigment Green 58 (a brominated phthalocyanine) is introduced between molecules of C. I. Pigment Green 58, and the C. I. Pigment Green 58, which is originally easily aggregated as described above, can be made less prone to aggregate. Furthermore, since the substance indicated by Formula (1) has a sulfo group in the molecule thereof, the substance has excellent dispersion properties in the liquid medium described hereinafter. Such factors as those described above are considered to operate synergistically to produce such excellent effects as described above. The facts that C. I. Pigment Green 58 has a brominated phthalocyanine structure, and has zinc as the central metal thereof are considered to be major factors in causing C. I. Pigment Green 58 and the substance indicated by Formula (1) to have appropriate affinity to each other.

Such excellent effects as those described above are demonstrated when C. I. Pigment Green 58 and the substance indicated by Formula (1) are used in combination with each other, and the effects are not obtained with other materials are used.

The content ratio of C. I. Pigment Green 58 in the green ink is preferably 6.0 to 15 wt %, and more preferably 7.0 to 10 wt %. When the content ratio of C. I. Pigment Green 58 is within the aforementioned range, adequate color saturation and light transmission properties can be maintained in the manufactured color filter while the green ink is provided with excellent discharge properties from the droplet discharge head (inkjet head) used to manufacture the color filter. The manufactured color filter is also provided with excellent durability.

The relationship $0.40 \leq C_M/C_{G58} \leq 0.90$ is preferably satisfied, and the relationship $0.50 \leq C_M/C_{G58} \leq 0.85$ is more preferably satisfied, wherein $C_{G58}$ (wt %) is the content ratio of C. I. Pigment Green 58 in the green ink, and $C_M$ (wt %) is the content ratio of the colorant in the ink having the smallest content ratio of colorant among the inks constituting the color filter ink set. Satisfying such a condition makes it possible for such effects as those described above to be more significantly demonstrated.

The average grain size of the C. I. Pigment Green 58 included in the green ink is preferably 20 to 200 nm, and more preferably 30 to 180 nm. Enhanced contrast and particularly excellent coloration properties and the like in the color filter can thereby be obtained while the color filter manufactured using the color filter ink is provided with adequately excellent light fastness, and the dispersion stability of the C. I. Pigment Green 58 in the color filter ink is maintained.

The content ratio of the substance indicated by Formula (1) in the green ink is preferably 0.2 to 4.8 wt %, and more preferably 0.5 to 2.8 wt %. When the content ratio of the substance indicated by Formula (1) is within this range, the manufactured color filter can be adjusted to the desired hue, and an adequate color reproduction range can be maintained while the green ink is provided with excellent discharge stability from the droplet discharge head (inkjet head) used to manufacture the color filter. Adequate transmittance can also be maintained. The manufactured color filter can also be provided with excellent durability.

The substance indicated by Formula (1) may be composed of a single compound, or may be a mixture of a plurality of types of compounds. When the substance indicated by Formula (1) is a mixture of a plurality of types of compounds, the sum of the content ratios of the plurality of compounds is used as the content ratio of the substance indicated by Formula (1).

The relationship $0.02 \leq C_C/C_{G58} \leq 0.32$ is preferably satisfied, and the relationship $0.05 \leq C_C/C_{G58} \leq 0.28$ is more preferably satisfied, wherein $C_{G58}$ (wt %) is the content ratio of C. I. Pigment Green 58 in the green ink, and $C_C$ (wt %) is the content ratio of the substance indicated by Formula (1) in the green ink. Satisfying such a condition makes it possible to maintain an adequate color reproduction range in the manufactured color filter, while providing the green ink with excellent discharge stability from the droplet discharge head (inkjet head) used to manufacture the color filter.

The average grain size of the substance indicated by Formula (1) included in the green ink is preferably 20 to 200 nm, and more preferably 30 to 180 nm. Particularly excellent dispersion stability of the substance indicated by Formula (1) in the color filter ink, and particularly excellent coloration properties and the like in the color filter can thereby be obtained while the color filter manufactured using the color filter ink is provided with adequately excellent light fastness.

As described above, the green ink includes C. I. Pigment Green 58 and the substance indicated by Formula (1), but may also include another colorant. Color adjustment (toning) of the colored portion formed by the color filter ink can thereby be performed, for example, and the color filter manufactured using the color filter ink set can be provided with a wider color reproduction range. Examples of such a colorant include C. I. Pigment Green 7, 36, 15, 17, 18, 19, 26, and 50; C. I. Pigment Yellow 1, 3, 12, 13, 14, 15, 16, 17, 20, 24, 31, 34, 35, 35:1, 37, 37:1, 42, 43, 53, 55, 60, 61, 65, 71, 73, 74, 81, 83, 93, 94, 95, 97, 98, 100, 101, 104, 106, 108, 109, 110, 113, 114, 116, 117, 119, 120, 126, 127, 128, 129, 138, 139, 150, 151, 152, 153, 154, 155, 156, 157, 166, 168, 175, 180, 184, and 185; C. I. Pigment Violet 1, 3, 14, 16, 19, 23, 29, 32, 36, 38, and 50; C. I. Pigment Orange 1, 5, 13, 14, 16, 17, 20, 20:1, 24, 34, 36, 38, 40, 43, 46, 49, 51, 61, 63, 64, 71, 73, and 104; C. I. Pigment Brown 7, 11, 23, 25, and 33; and derivatives thereof and other pigments; and C. I Direct Violet 7, 9, 47, 48, 51, 66, 90, 93, 94, 95, 98, 100, and 101; C. I Acid Violet 5, 9, 11, 34, 43, 47, 48, 51, 75, 90, 103, and 126; C. I Reactive Violet 1, 3, 4, 5, 6, 7, 8, 9, 16, 17, 22, 23, 24, 26, 27, 33, and 34; C. I. Basic Violet 1, 2, 3, 7, 10, 15, 16, 20, 21, 25, 27, 28, 35, 37, 39, 40, and 48; C. I. Direct Yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C. I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C. I. Reactive Yellow 2, 3, 13, 14, 15, 17, 18, 23, 24, 25, 26, 27, 29, 35, 37, 41, and 42; C. I. Basic Yellow 1, 2, 4, 11, 13, 14, 15, 19, 21, 23, 24, 25, 28, 29, 32, 36, 39, and 40; C. I. Basic Orange 21 and 23; and other dyes.

When the green ink includes components other than C. I. Pigment Green 58 and the substance indicated by Formula (1) as colorants, the content ratio of such components (the sum of the content ratios when a plurality of types of components is included) is preferably smaller than the content ratio of the substance indicated by Formula (1).

Red Ink

The red ink usually includes a red colorant.

Examples of colorants that may be included in the red ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81, 81:1, 83, 88, 90:1, 97, 101, 102, 104, 105, 106, 108, 108:1, 112, 113, 114, 122, 123, 144, 146, 149, 150, 151, 166, 168, 170, 171, 172, 174, 175, 176, 178, 179, 180, 185, 187, 188, 190, 193, 194, 202, 206, 207, 208, 209, 215, 216, 220, 224, 226, 242, 243, 245, 255, 264, and 265; and derivatives thereof and other pigments; and C. I. Direct Red 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C. I. Acid Red 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C. I. Reactive Red 3, 13, 17, 19, 21, 22, 23, 24, 29, 35, 37, 40, 41, 43, 45, 49, and 55; C. I. Basic Red 12, 13, 14, 15, 18, 22, 23, 24, 25, 27, 29, 35, 36, 38, 39, 45, and 46; and other dyes, and one or more types of colorants selected from these examples may be combined and used.

Such colorants as those described above are included as the colorant constituting the red ink, but among these examples, the red ink preferably includes one or more types of colorants selected from the group that includes C. I. Pigment Red 177, C. I. Pigment Red 254, a pigment derivative indicated by Formula (2) below, and a pigment derivative indicated by Formula (3) below. The manufactured color filter can thereby be provided with a particularly wide color reproduction range.

Formula (2)

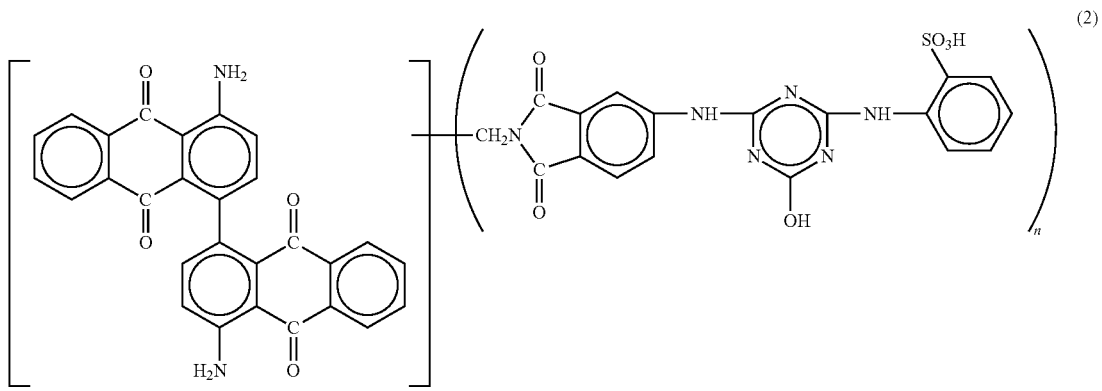

In Formula (2), n is an integer from 1 to 4.

Formula (3)

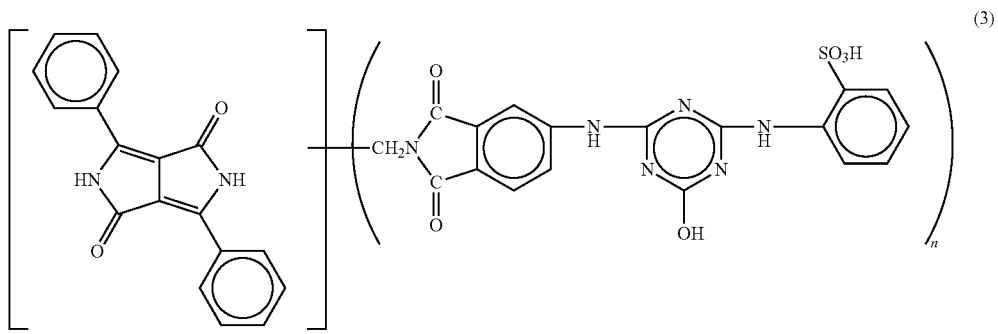

In Formula (3), n is an integer from 1 to 4.

When the red ink includes one or more types of colorants selected from the group that includes C. I. Pigment Red 177, C. I. Pigment Red 254, a pigment derivative indicated by Formula (2), and a pigment derivative indicated by Formula (3), the sum of the content ratio of C. I. Pigment Red 177, the content ratio of C. I. Pigment Red 254, the content ratio of the pigment derivative indicated by Formula (2), and the content ratio of the pigment derivative indicated by Formula (3) in the red ink is preferably 3.0 to 10 wt %, and more preferably 4.0 to 8.0 wt %. Adequate color saturation can thereby be maintained in the manufactured color filter while the red ink is provided with excellent discharge properties from the droplet discharge head (inkjet head) used to manufacture the color filter. The manufactured color filter can also be provided with particularly excellent uniformity of color saturation between colored portions of different colors. The manufactured color filter can also be provided with excellent durability.

When the red ink includes a pigment such as described above, the average grain size of the pigment included in the red ink is preferably 20 to 200 nm, and more preferably 30 to 180 nm. Particularly excellent dispersion stability of the pigment in the color filter ink, and particularly excellent coloration properties and the like in the color filter can thereby be obtained while the color filter manufactured using the color filter ink is provided with adequately excellent light fastness.

A colorant other than a red colorant may also be included in the red ink. Color adjustment (toning) of the colored portion formed by the color filter ink can thereby be performed, for example, and the color filter manufactured using the color filter ink set can be provided with a wider color reproduction range. A colorant cited in the "(Green Ink)" section, for example, may be used as such a colorant.

Blue Ink

The blue ink usually includes a blue colorant.

Examples of colorants that may be included in the blue ink include C. I. Pigment Blue 1, 15, 15:1, 15:2, 15:3, 15:4, 15:6, 17:1, 18, 60, 27, 28, 29, 35, 36, 60, and 80; and derivatives thereof and other pigments; and C. I. Acid Blue 9, 45, 80, 83, 90, and 185; and other dyes, and one or more types of colorants selected from these examples may be combined and used.

Such colorants as those described above are included as the colorant constituting the blue ink, but among these examples, C. I. Pigment Blue 15:6 is preferably the primary colorant. When the color filter ink set is provided is provided with a blue ink that includes C. I. Pigment Blue 15:6, the manufactured color filter can be provided with a particularly wide color reproduction range.

When the blue ink includes C. I. Pigment Blue 15:6, the content ratio of C. I. Pigment Blue 15:6 in the blue ink is preferably 3.0 to 10 wt %, and more preferably 4.0 to 8.0 wt %. When the content ratio of C. I. Pigment Blue 15:6 is within this range, adequate color saturation can be maintained in the manufactured color filter while the blue ink is provided with excellent discharge properties from the droplet discharge head (inkjet head) used to manufacture the color filter. The manufactured color filter can also be provided with particularly excellent uniformity of color saturation between colored portions of different colors. The manufactured color filter can also be provided with excellent durability.

The average grain size of the C. I. Pigment Blue 15:6 included in the blue ink is preferably 20 to 200 nm, and more preferably 30 to 180 nm. Particularly excellent dispersion stability of the C. I. Pigment Blue 15:6 in the color filter ink, and particularly excellent coloration properties and the like in the color filter can thereby be obtained while the color filter manufactured using the color filter ink is provided with adequately excellent light fastness.

A colorant other than a blue colorant may also be included in the blue ink. Color adjustment (toning) of the colored portion formed by the color filter ink can thereby be performed, for example, and the color filter manufactured using the color filter ink set can be provided with a wider color reproduction range. A colorant cited in the "(Blue Ink)" section, for example, may be used as such a colorant.

A powder composed of a material such as described above that is subjected to a lyophilizing treatment (treatment for enhancing affinity to the liquid medium described hereinafter) or other surface treatment may be used as the colorant. The dispersion properties and dispersion stability of the colorant particles in the color filter ink, for example, can thereby be made particularly excellent. Examples of the surface treatment performed on the colorant include modifying the surfaces of the colorant particles using a polymer, and other treatments. Examples of the polymer for modifying the surfaces of the colorant particles include polymers disclosed in Japanese Laid-open Patent Application No. 8-259876 and other publications, various types of commercially available polymers or oligomers for pigment dispersion, and the like.

Liquid Medium

The liquid medium (liquid vehicle) has the function of dissolving and/or dispersing the colorant such as described above. Specifically, the liquid medium functions as a solvent and/or dispersion medium. The liquid medium usually functions as a solvent for dissolving a thermoplastic resin in a dispersion medium liquid dispersion in a color filter ink manufacturing method such as described hereinafter. Most of the liquid medium is usually removed in the process of manufacturing the color filter.

Ester compounds, ether compounds, hydroxyketones, carbonic diesters, cyclic amide compounds, and the like, for example, may be used as the liquid medium constituting the color filter ink, preferred among which are (1) ethers (polyalcohol ethers) as condensates of polyalcohols (e.g., ethylene glycol, propylene glycol, butylene glycol, glycerin, and the like); alkyl ethers (e.g., methyl ether, ethyl ether, butyl ether, hexyl ether, and the like) of polyalcohols or polyalcohol ethers; and esters (e.g., formate, acetate, propionate, and the like); (2) esters (e.g., methyl esters and the like) of polycarboxylic acids (e.g., succinic acid, glutamic acid, and the like); (3) ethers, esters, and the like of compounds (hydroxy acids) having at least one hydroxyl group and at least one carboxyl group in the molecule thereof; and (4) carbonic diesters having a chemical structure such as that obtained by reaction of a polyalcohol and a phosgene. Examples of compounds that can be used as the liquid medium include 2-(2-methoxy-1-methylethoxy-1-methyl ethyl acetate, triethylene glycol dimethyl ether, triethylene glycol diacetate, diethylene glycol monoethyl ether acetate, 4-methyl-1,3-dioxolan-2-one, bis(2-butoxyethyl)ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxy propionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono n-propyl ether, polyethylene glycol monomethyl ether, butyl glycolate, ethylene glycol monohexyl ether, dipropylene glycol mono n-butyl ether, N-methyl-2-pyrrolidone, triethylene glycol butyl methyl ether, bis(2-propoxyethyl)ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol monobutyl ether, triethylene glycol monomethyl ether, ethylene glycol 2-ethylhexyl ether, triethylene glycol monoethyl ether, diethylene glycol monohexyl ether, triethylene glycol monobutyl ether, diethylene glycol mono-2-ethylhexyl ether, tripropylene glycol mono n-butyl ether, butyl cellosolve acetate, and the like, and one or more types of compounds selected from the above examples may be combined and used.

The boiling point of the liquid medium at atmospheric pressure (1 atm) is preferably 160 to 300° C., more preferably 180 to 290° C., and even more preferably 190 to 280° C. When the boiling point of the liquid medium at atmospheric pressure is within this range, blockage and the like in the droplet discharge head for discharging the color filter ink can be more effectively prevented, and the color filter can be manufactured with particularly excellent productivity.

The vapor pressure of the liquid medium at 25° C. is preferably 0.7 mmHg or lower, and more preferably 0.1 mmHg or lower. When the vapor pressure of the liquid medium is within this range, blockage and the like in the droplet discharge head for discharging the color filter ink can be more effectively prevented, and the color filter can be manufactured with particularly excellent productivity.

The content ratio of the liquid medium in the color filter ink is preferably 50 to 98 wt %, more preferably 70 to 95 wt %, and more preferably 80 to 93 wt %. When the content ratio of the liquid medium is within this range, the manufactured color filter can be provided with excellent durability while the discharge properties of the color filter ink from the droplet discharge head are made particularly excellent. Adequate color saturation can also be maintained in the manufactured color filter.

Green Ink

As described above, the viscosity at 25° C. (the viscosity at 25° C. will also be referred to simply as the "viscosity") of the liquid medium constituting the green ink in the present invention is lower than the viscosities of the liquid mediums constituting the inks other than the green ink.

The viscosity at 25° C. of the liquid medium constituting the green ink is not particularly limited, but is preferably 0.9 to 2.2 mPa·s, and more preferably 1.5 to 2.0 mPa·s.

The difference ($\eta_{MM}-\eta_{GM}$) of the viscosity ($\eta_{MM}$ (mPa·s)) of the liquid medium having the highest viscosity among the inks other than the green ink that constitute the color filter ink set and the viscosity ($\eta_{GM}$ (mPa·s)) of the liquid medium constituting the green ink is preferably 0.5 to 2.2 mPa·s, and more preferably 0.7 to 1.5 mPa·s. By satisfying such a relationship, particularly excellent uniformity of discharge properties between the inks can be obtained during color filter manufacturing, unevenness of color and saturation between regions is more effectively suppressed, and color filters having particularly excellent uniformity of characteristics between units can easily be manufactured.

The boiling point at atmospheric pressure of the liquid medium constituting the green ink is preferably 180 to 300° C., and more preferably 190 to 210° C. Blockage and the like in the droplet discharge head for discharging the green ink can thereby be more effectively prevented, the color filter can be provided with particularly excellent production properties, and fluctuation of the discharge quantity between inks can be effectively prevented.

The vapor pressure at 25° C. of the liquid medium constituting the green ink is preferably 0.10 mmHg or lower, and more preferably 0.04 mmHg or lower. Blockage and the like in the droplet discharge head for discharging the green ink can thereby be more effectively prevented, the color filter can be provided with particularly excellent production properties, and fluctuation of the discharge quantity between inks can be effectively prevented.

The green ink preferably includes 2-(2-methoxy-1-methylethoxy)-1-methyl ethyl acetate as the liquid medium among the materials cited above, and the liquid medium thereof is more preferably composed primarily of 2-(2-methoxy-1-methylethoxy)-1-methyl ethyl acetate (e.g., the ratio of 2-(2-methoxy-1-methylethoxy)-1-methyl ethyl acetate in the liquid medium is 90 wt % or higher). The plurality of types of ink constituting the color filter ink set can thereby be provided with particularly excellent uniformity of discharge properties, and blockage and the like of the droplet discharge head for discharging the color filter ink can be effectively prevented. The color filter ink can also be stably used for a longer period of time in color filter manufacturing, the manufactured color filter can be provided with higher quality, unevenness of color, saturation, and other characteristics between regions can be more reliably prevented, and it is possible to obtain excellent uniformity of characteristics between individual units.

The content ratio of the liquid medium in the green ink is preferably 60 to 92 wt %, and more preferably 75 to 90 wt %. The manufactured color filter can thereby be provided with excellent durability while the discharge properties of the color filter ink from the droplet discharge head used for the color filter are made particularly excellent. Adequate color saturation can also be maintained in the manufactured color filter.

Red Ink

The viscosity of the liquid medium constituting the red ink is higher than the viscosity of the liquid medium constituting the green ink.

The viscosity at 25° C. of the liquid medium constituting the red ink is not particularly limited, but is preferably 2.1 to 4.0 mPa·s, and more preferably 2.3 to 3.8 mPa·s.

The boiling point at atmospheric pressure of the liquid medium constituting the red ink is preferably 200 to 300° C., and more preferably 220 to 280° C. Blockage and the like in the droplet discharge head for discharging the red ink can thereby be more effectively prevented, the color filter can be provided with particularly excellent production properties, and fluctuation of the discharge quantity between inks can be effectively prevented.

The vapor pressure at 25° C. of the liquid medium constituting the red ink is preferably 0.10 mmHg or lower, and more preferably 0.04 mmHg or lower. Blockage and the like in the droplet discharge head for discharging the red ink can thereby be more effectively prevented, the color filter can be provided with particularly excellent production properties, and fluctuation of the discharge quantity between inks can be effectively prevented.

The red ink preferably includes one or more types of liquid mediums selected from the group that includes diethylene glycol monoethyl ether acetate, diethylene glycol monobutyl ether acetate, and 1,3-butylene glycol diacetate as the liquid medium among the materials cited above. The plurality of types of ink constituting the color filter ink set can thereby be provided with particularly excellent uniformity of discharge properties, and blockage and the like of the droplet discharge head for discharging the color filter ink can be effectively prevented. The color filter ink can also be stably used for a longer period of time in color filter manufacturing, the manufactured color filter can be provided with higher quality, unevenness of color, saturation, and other characteristics between regions can be more reliably prevented, and it is possible to obtain excellent uniformity of characteristics between individual units.

The content ratio of the liquid medium in the red ink is preferably 62 to 94 wt %, and more preferably 77 to 92 wt %. The manufactured color filter can thereby be provided with excellent durability while the discharge properties of the color filter ink from the droplet discharge head used for the color filter are made particularly excellent. Adequate color saturation can also be maintained in the manufactured color filter.

Blue Ink

The viscosity of the liquid medium constituting the blue ink is higher than the viscosity of the liquid medium constituting the green ink.

The viscosity at 25° C. of the liquid medium constituting the blue ink is not particularly limited, but is preferably 2.1 to 4.0 mPa·s, and more preferably 2.3 to 3.8 mPa·s.

The boiling point at atmospheric pressure of the liquid medium constituting the blue ink is preferably 200 to 300° C., and more preferably 220 to 280° C. Blockage and the like in the droplet discharge head for discharging the blue ink can thereby be more effectively prevented, the color filter can be provided with particularly excellent production properties, and fluctuation of the discharge quantity between inks can be effectively prevented.

The vapor pressure at 25° C. of the liquid medium constituting the blue ink is preferably 0.10 mmHg or lower, and more preferably 0.04 mmHg or lower. Blockage and the like in the droplet discharge head for discharging the blue ink can thereby be more effectively prevented, the color filter can be provided with particularly excellent production properties, and fluctuation of the discharge quantity between inks can be effectively prevented.

The blue ink preferably includes one or more types of liquid mediums selected from the group that includes diethylene glycol monoethyl ether acetate, diethylene glycol monobutyl ether acetate, and 1,3-butylene glycol diacetate as the liquid medium among the materials cited above. The plurality of types of ink constituting the color filter ink set can thereby be provided with particularly excellent uniformity of discharge properties, and blockage and the like of the droplet discharge head for discharging the color filter ink can be effectively prevented. The color filter ink can also be stably used for a longer period of time in color filter manufacturing, the manufactured blue color filter can be provided with higher quality, unevenness of color, saturation, and other characteristics between regions can be more reliably prevented, and it is possible to obtain excellent uniformity of characteristics between individual units.

The content ratio of the liquid medium in the red ink is preferably 62 to 94 wt %, and more preferably 77 to 92 wt %. The manufactured color filter can thereby be provided with excellent durability while the discharge properties of the color filter ink from the droplet discharge head used for the color filter are made particularly excellent. Adequate color saturation can also be maintained in the manufactured color filter.

Curable Resin Material

The inks (color filter inks) constituting the color filter ink set may include a curable resin material as a binder resin. The colored portions formed using the color filter ink set can thereby be provided with enhanced adhesion to the substrate. The colored portion can also be prevented from adverse effects even when chemical application or washing is performed in steps subsequent to the ink application step by the inkjet method. The term "curable resin material" in the present invention refers to a resin material that can be cured by heat, light (e.g., ultraviolet rays), or the like.

In the present invention, the heat-curable resin material used as the binder resin preferably includes a polymer A (first polymer) that contains at least an epoxy-containing vinyl monomer a1 (first epoxy-containing vinyl monomer) as a monomer component. The colored portion formed using the color filter ink set can thereby be provided with particularly excellent adhesion to the substrate, chemical resistance (solvent resistance), and other characteristics, the color filter ink can be provided with particularly excellent discharge stability, and it is possible to more reliably prevent problems such as variation of the trajectory (so-called flight deflection) of discharge droplets, inability to land the droplets in the desired position, and unstable droplet discharge quantity even when droplet discharge is performed for a long time, or droplets are discharge continuously by the inkjet method. The curable resin material (curable resin composition) will be described in detail hereinafter.

In the present embodiment, the curable resin material in the inks (color filter inks) constituting the color filter ink set includes a polymer A containing at least an epoxy-containing vinyl monomer a1 as a monomer component.

Polymer A

The polymer A contains at least the epoxy-containing vinyl monomer a1 as a monomer component. The polymer A may be composed of essentially a single compound, or may be a mixture of a plurality of types of compounds. However, when the polymer A is a mixture of a plurality of types of compounds, each of the compounds contains at least the epoxy-containing vinyl monomer a1 as a monomer component.

Epoxy-Containing Vinyl Monomer a1

The polymer A contains at least the epoxy-containing vinyl monomer a1 as a monomer component. Including such an epoxy-containing vinyl monomer a1 as a monomer component makes it possible to easily and reliably introduce an epoxy group into the polymer A. By including the epoxy-containing vinyl monomer a1 as a monomer component, the color filter ink can be provided with excellent long-term storage properties and excellent discharge stability. Including the epoxy-containing vinyl monomer a1 as a monomer component also enables the colored portion formed using the color filter ink to have excellent solvent resistance, excellent adhesion to the substrate, and excellent durability of the manufactured color filter. Including the epoxy-containing vinyl monomer a1 as a monomer component is also advantageous because the curable resin material (binder resin) can be cured under relatively mild conditions when a colored portion is formed, and the formed colored portion is provided with excellent hardness and other characteristics. When the polymer A includes a vinyl monomer a2 (second vinyl monomer), a vinyl monomer a3, and other components such as described hereinafter, the polymer can be suitably synthesized, and a polymer A having the desired characteristics can be easily and reliably obtained.

The epoxy-containing vinyl monomer a1 used may have the structure indicated by Formula (5) below, for example. When the epoxy-containing vinyl monomer a1 has such a structure, the color filter ink can be provided with particularly excellent long-term storage properties and excellent discharge stability. When the epoxy-containing vinyl monomer a1 has the structure indicated by Formula (5) below, the colored portion formed using the color filter ink set can be provided with even more superior solvent resistance. When the epoxy-containing vinyl monomer a1 has the structure indicated by Formula (5) below, the curable resin material (binder resin) can be cured under relatively mild conditions when a colored portion is formed, and the formed colored portion is provided with excellent hardness and other characteristics. When the epoxy-containing vinyl monomer a1 has such a structure, the polymer A can be provided with particularly excellent compatibility with the polymer B (second polymer) described hereinafter. The advantages of the polymer A and the advantages of the polymer B can thereby both be adequately demonstrated when the polymer A and the polymer B are used jointly, and the synergistic effects of jointly using the polymer A and the polymer B can be more significantly demonstrated. The colored portion formed using the color filter ink can also be provided with particularly high transparency.

Formula (5)

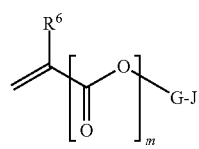

(5)

In Formula (5), $R^6$ is a hydrogen atom or a $C_{1-7}$ alkyl group; G is a single bond hydrocarbon group or a bivalent hydrocarbon group which may contain a hetero atom; J is an epoxy group or an alicyclic epoxy group which may have a ring-structured $C_{3-10}$ substituted group; and m is 0 or 1.

In Formula (5), examples of the $C_{1-7}$ alkyl group indicated by $R^6$ include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. Particularly excellent dispersion stability of the pigment in the color filter ink can thereby be obtained, and the color filter ink can be provided with particularly excellent long-term storage properties and discharge stability. The contrast of the displayed image can also be made particularly excellent in the manufactured color filter. The colored portion formed using the color filter ink can also be provided with excellent hardness and other characteristics. Particularly excellent compatibility of the polymer A and the polymer B can also be obtained. The advantages of the polymer A and the advantages of the polymer B can thereby both be adequately demonstrated when the polymer A and the polymer B are used jointly, and the synergistic effects of jointly using the polymer A and the polymer B can be more significantly demonstrated. The colored portion formed using the color filter ink can also be provided with extremely high transparency.

Typical examples of the bivalent hydrocarbon group that may contain a hetero atom indicated by G in Formula (5) include straight-chain or branched alkylene groups, or more specifically, methylenes, ethylenes, propylenes, tetramethylenes, ethyl ethylenes, pentamethylenes, hexamethylenes, oxymethylenes, oxyethylenes, oxypropylenes, and the like.

Specific examples of the epoxy-containing vinyl monomer a1 include glycidyl(meth)acrylate, methylglycidyl(meth)acrylate, ethylglycidyl(meth)acrylate, glycidyl vinylbenzyl ether (product name: VBGE; manufactured by Seimi Chemical), the alicyclic epoxy-containing unsaturated compounds indicated by Formulas (5-1) through (5-31) below, and the like; and one or more types of these compounds may be selected and used, but (3,4-epoxycyclohexyl)methyl(meth)acrylate is particularly preferred as the epoxy-containing vinyl monomer a1. Particularly excellent dispersion stability of the pigment in the color filter ink can thereby be obtained, and the color filter ink can be provided with particularly excellent long-term storage properties and discharge stability. The formed colored portion can also be provided with particularly excellent hardness, solvent resistance, and other characteristics. Particularly excellent compatibility of the polymer A and the polymer B can also be obtained. The advantages of the polymer A and the advantages of the polymer B can thereby both be adequately demonstrated when the polymer A and the polymer B are used jointly, and the synergistic effects of jointly using the polymer A and the polymer B can be more significantly demonstrated. The colored portion formed using the color filter ink can also be provided with extremely high transparency.

Formulas (5-1) through (5-31)

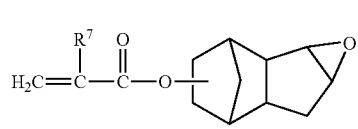 (5-1)

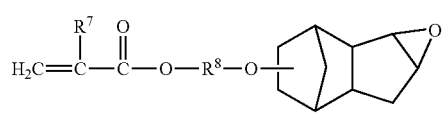 (5-2)

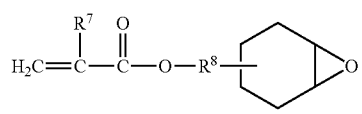 (5-3)

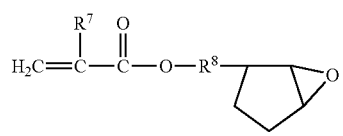 (5-4)

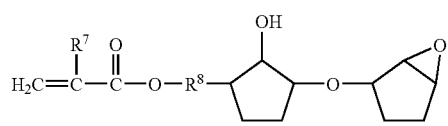 (5-5)

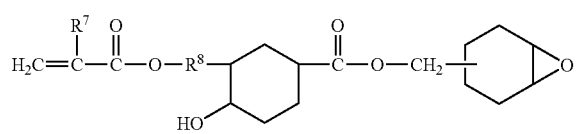 (5-6)

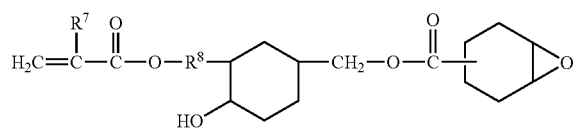 (5-7)

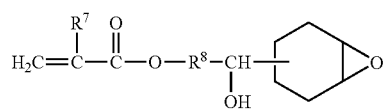 (5-8)

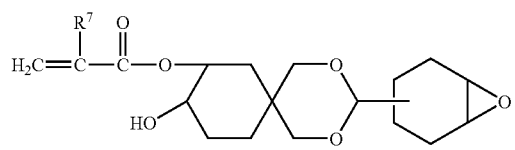 (5-9)

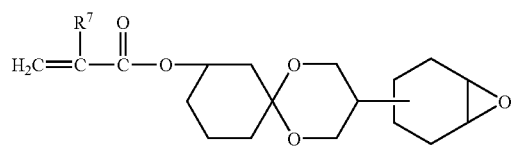 (5-10)

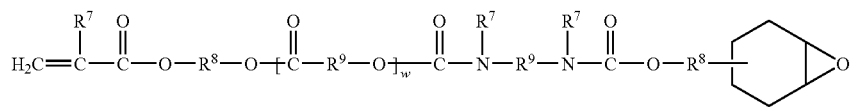 (5-11)

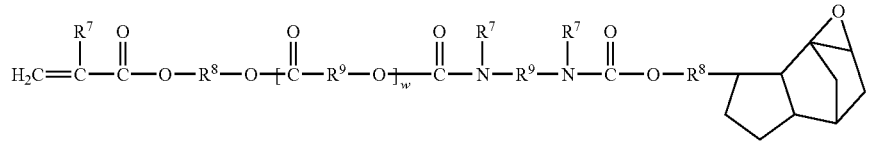
(5-12)

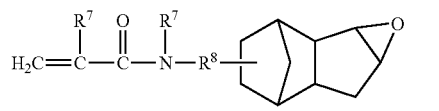
(5-13) (5-14)

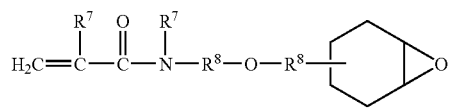
(5-15) (5-16)

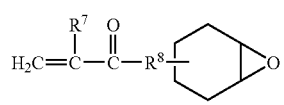
(5-17) (5-18)

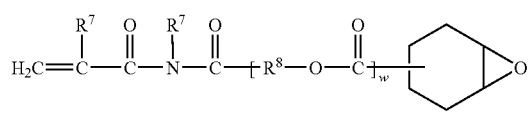
(5-19) (5-20)

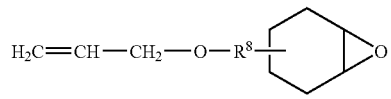
(5-21) (5-22)

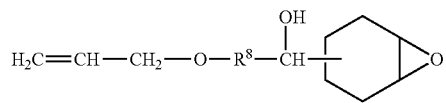
(5-23) (5-24)

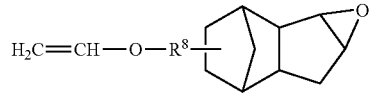
(5-25) (5-26)

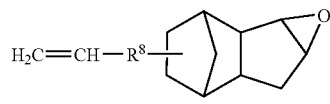
(5-27) (5-28)

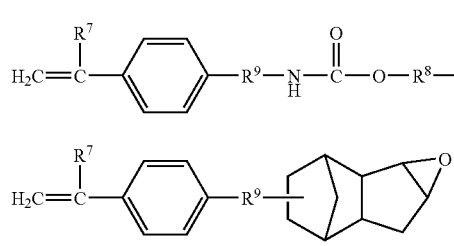
(5-29) (5-30)

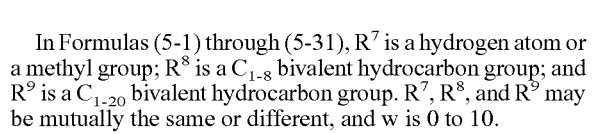
(5-31)

In Formulas (5-1) through (5-31), $R^7$ is a hydrogen atom or a methyl group; $R^8$ is a $C_{1-8}$ bivalent hydrocarbon group; and $R^9$ is a $C_{1-20}$ bivalent hydrocarbon group. $R^7$, $R^8$, and $R^9$ may be mutually the same or different, and w is 0 to 10.

The content ratio (which is a value obtained by substitution with the weight of the monomer used to synthesize the polymer) of the epoxy-containing vinyl monomer a1 in the polymer A is preferably 50 to 99 wt %, and more preferably 70 to 94 wt %. When the content ratio of the epoxy-containing vinyl monomer a1 in the polymer A is within the aforementioned range, the color filter ink can be provided with particularly excellent long-term storage properties and excellent discharge stability. When the content ratio of the epoxy-containing vinyl monomer a1 in the polymer A is within the aforementioned range, the curable resin material (binder resin) can be cured under relatively mild conditions when a colored portion is formed, and the formed colored portion can be provided with particularly excellent hardness, solvent resistance, and other characteristics. When the polymer A is a mixture of a plurality of types of compounds, the weighted average value (weighted average value based on weight ratio) of the mixed compounds may be used as the content ratio of the epoxy-containing vinyl monomer a1. When the polymer A is a mixture of a plurality of types of compounds, the compounds all preferably contain the epoxy-containing vinyl monomer a1 in such a content ratio as described above.

Vinyl Monomer a2

The polymer A may contain at least the epoxy-containing vinyl monomer a1 as a monomer component, but the polymer A is preferably one (a copolymer) containing the epoxy-containing vinyl monomer a1, as well as a vinyl monomer a2 as a monomer group provided with an isocyanate group or a blocked isocyanate group in which the isocyanate group is protected by a protective group. The content ratio of gas (dissolved gas, bubbles present as microbubbles, or the like) in the color filter ink can thereby be reduced more effectively, and particularly excellent droplet discharge stability by the inkjet method can be obtained. As a result, it is possible to more effectively prevent the occurrence of uneven color, uneven saturation, and the like between different regions of the manufactured color filter, and fluctuation of characteristics between individual units. The color can also be prevented from changing over time in the manufactured color filter (colored portion) manufactured, and the color filter can be provided with particularly excellent durability.

Examples of polymerizable vinyl monomers a2 include 2-acryloyloxyethyl isocyanate (product name: Karenz MOI; manufactured by Showa Denko), 2-methacryloyloxyethyl isocyanate, and other (meth)acryloyl isocyanates and the like in which (meth)acryloyl is bonded with an isocyanate group via a $C_{2-6}$ alkylene group.

The isocyanate group of the abovementioned (meth)acryloyl isocyanate is preferably a blocked isocyanate group. The term "blocked isocyanate group" refers to an isocyanate group in which the terminal ends are masked by a blocking agent. Examples of monomers having a blocked isocyanate group include ethyl 2-(0-[1'-methylpropylideneamino]carboxyamino)methacrylate and the like, and are commercially available under the trade name Karenz MOI-BM, manufactured by Showa Denko. A combination of one or more types of these polymerizable vinyl monomers may be used.

The content ratio (which is a value obtained by substitution with the weight of the monomer used to synthesize the polymer) of the vinyl monomer a2 in the polymer A is preferably 2 to 20 parts by weight, and more preferably 3 to 15 parts by weight, with respect to 100 parts by weight of the epoxy-containing vinyl monomer a1. When the content ratio of the vinyl monomer a2 in the polymer A is within the aforementioned range, the content ratio of gas (dissolved gas, bubbles present as microbubbles, or the like) in the color filter ink can be reduced more effectively, and particularly excellent stability of droplet discharge by the inkjet method can be obtained while the color filter ink is provided with adequately excellent long-term storage properties and other characteristics. The formed colored portion can also be provided with adequately high transparency. In contrast, when the content ratio of the vinyl monomer a2 in the polymer A is less than the lower limit of the aforementioned range, the effects of including a vinyl monomer a2 such as those described above may not be adequately demonstrated. When the content ratio of the vinyl monomer a2 in the polymer A exceeds the upper limit of the aforementioned range, the compatibility of the polymer A with the polymer B described hereinafter decreases, and the colored portion formed using the color filter ink may be difficult to provide with adequate transparency when the polymer A and the polymer B described hereinafter are used jointly. When the polymer A is a mixture of a plurality of types of compounds, the weighted average value (weighted average value based on weight ratio) of the mixed compounds may be used as the content ratio of the vinyl monomer a2. When the polymer A is a mixture of a plurality of types of compounds, the compounds all preferably contain the vinyl monomer a2 in such a content ratio as described above.

Vinyl Monomer a3

The polymer A may contain at least the epoxy-containing vinyl monomer a1 as a monomer component, but the polymer A is preferably one (a copolymer) containing the epoxy-containing vinyl monomer a1, as well as a vinyl monomer a3 provided with a hydroxyl group. The formed colored portion can thereby be provided with particularly excellent adhesion to the substrate, particularly adhesion under repeated exposure to sudden temperature changes that accompany image display. As a result, the occurrence of light leakage (white spots, bright points) and other problems can be reliably prevented even when the color filter is used for a long time, for example. Specifically, the color filter can be provided with particularly excellent durability. When the polymer A contains the vinyl monomer a3 as a monomer component, the polymer A can be provided with particularly excellent compatibility with the polymer B described hereinafter. The advantages of the polymer A and the advantages of the polymer B can thereby both be adequately demonstrated when the polymer A and the polymer B are used jointly, and the synergistic effects of jointly using the polymer A and the polymer B can be more significantly demonstrated. The colored portion formed using the color filter ink can also be provided with extremely high transparency.

Examples of the vinyl monomer a3 include monoester compounds of a acrylic acid or methacrylic acid with 2-hydroxyethyl(meth)acrylate, hydroxypropyl (meth)acrylate, 2,3-dihydroxybutyl(meth)acrylate, 4-hydroxybutyl(meth)acrylate, 6-hydroxyhexyl(meth)acrylate, 8-hydroxyoctyl (meth)acrylate, 4-hydroxymethyl cyclohexyl(meth)acrylate, polyalkylene glycol mono(meth)acrylate, and other polyalcohols; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized; and the like, and one or more types of compounds selected from the above examples may be used.

The content ratio (which is a value obtained by substitution with the weight of the monomer used to synthesize the polymer) of the vinyl monomer a3 in the polymer A is preferably 2 to 20 parts by weight, and more preferably 3 to 15 parts by weight, with respect to 100 parts by weight of the epoxy-containing vinyl monomer a1. When the content ratio of the vinyl monomer a3 in the polymer A is within the aforementioned range, the color filter manufactured using the color filter ink can be provided with particularly excellent durability while the color filter ink is provided with adequately excellent long-term storage properties and other characteristics. The formed colored portion can also be provided with high transparency. In contrast, when the content ratio of the vinyl monomer a3 in the polymer A is less than the lower limit of the aforementioned range, the effects of including a vinyl monomer a3 such as those described above may not be adequately demonstrated. When the content ratio of the vinyl monomer a3 in the polymer A exceeds the upper limit of the aforementioned range, it may be difficult to make the content ratio of gas in the color filter ink adequately low. When the polymer A is a mixture of a plurality of types of compounds, the weighted average value (weighted average value based on weight ratio) of the mixed compounds may be used as the content ratio of the vinyl monomer a3. When the polymer A is a mixture of a plurality of types of compounds, the compounds all preferably contain the vinyl monomer a3 in such a content ratio as described above.

Other Polymerizable Vinyl Monomer a4

The polymer A may contain as a monomer component a polymerizable vinyl monomer a4 other than the epoxy-containing vinyl monomer a1, the vinyl monomer a2, and the vinyl monomer a3 described above. A vinyl monomer that can be copolymerized with the epoxy-containing vinyl monomer a1 may be used as the polymerizable vinyl monomer a4, and specific examples thereof include methyl(meth)acrylate, ethyl(meth)acrylate, butyl(meth)acrylate, 2-ethylhexyl (meth)acrylate, phenyl(meth)acrylate, cyclohexyl(meth)acrylate, dicyclopentanyl(meth)acrylate, dicyclopentanyloxyethyl(meth)acrylate, isobornyl(meth)acrylate, benzyl (meth)acrylate, phenyl ethyl(meth)acrylate, and other $C_{1-12}$ alkyl and aralkyl (meth)acrylates; styrene, α-methylstyrene, and other vinyl aromatic compounds; $CF_3(CF_2)_3$ $CH_2CH=CH_2$, $CF_3(CF_2)_3CH=CH_2$, $CF_3(CF_2)_5$ $CH_2CH=CH_2$, $CF_3(CF_2)_5CH=CH_2$, $CF_3(CF_2)_7CH=CH_2$, $CF_3(CF_2)_9CH_2CH=CH_2$, $CF_3(CF_2)_9CH=CH_2$, $(CF_3)_2CF$ $(CF_2)_2CH_2CH=CH_2$, $(CF_3)_2$ $CF(CF_2)_2CH=CH_2$, $(CF_3)_2$ $CF(CF_2)_4CH_2CH=CH_2$, $(CF_3)_2CF(CF_2)_4CH=CH_2$, $(CF_3)_2$ $CF(CH_2)_6CH_2CH=CH_2$, $(CF_3)_2CF(CF_2)_6$ $CH=CH_2$, $F_5C_6CH=CH_2$, $CF_3(CF_2)_5$ $CH_2CH_2OCH_2CH=CH_2$, $CF_3(CF_2)_5$ $CH_2CH_2CH_2OCH_2CH=CH_2$, $CF_3(CF_2)_7CH_2CH_2$ $OCH_2CH=CH_2$, $CF_3(CF_2)_7CH_2CH_2CH_2OCH_2CH=CH_2$, $CF_3(CF_2)_9CH_2CH_2$ $OCH_2CH=CH_2$, $CF_3(CF_2)_9$ $CH_2CH_2CH_2OCH_2CH=CH_2$, $H(CF_2)_6$ $CH_2OCH_2CH=CH_2$, $H(CF_2)_8CH_2OCH_2CH=CH_2$, $(CF_3)_2$ $CF(CF_2)_2CH_2CH_2OCOCH=CH_2$, $(CF_3)_2CF(CF_2)_2$ $CH_2CH_2OCOC(CH_3)=CH_2$, $(CF_3)_2CF(CF_2)_4$ $CH_2CH_2OCOCH=CH_2$, $(CF_3)_2CF(CF_2)_4CH_2CH_2OCOC$ $(CH_3)=CH_2$, $(CF_3)_2CF(CF_2)_6$ $CH_2CH_2OCOCH=CH_2$, $(CF_3)_2CF(CF_2)_6CH_2CH_2OCOC(CH_3)=CH_2$, $CF_3(CF_2)_5$ $CH_2CH_2OCOCH=CH_2$, $CF_3(CF_2)_5CH_2CH_2OCOC$ $(CH_3)=CH_2$, $CF_3(CF_2)_7CH_2CH_2OCOCH=CH_2$, $CF_3$ $(CF_2)_7CH_2CH_2OCOC(CH_3)=CH_2$, $CF_3(CF_2)_9$ $CH_2CH_2OCOCH=CH_2$, $CF_3(CF_2)_9CH_2CH_2OCOC$ $(CH_3)=CH_2$, $H(CF_2)_6CH_2CH_2OCOCH=CH_2$, $H(CF_2)_8$ $CH_2CH_2OCOC(CH_3)=CH_2$, $F(CF_2)_8$ $CH_2CH_2OCOCH=CH_2$, $F(CF_2)_8CH_2CH_2OCOC(CH_3)=$ $CH_2$, $H(CF_2)_4CH_2OCOC(CH_3)=CH_2$, $H(CF_2)_4$ $CH_2OCOCH=CH_2$, and other fluoroalkyl- or fluoroaryl-containing vinyl compounds and the like, and one or more types of compounds selected from the above examples may be combined and used. However, the polymer A does not contain as a monomer component an alkoxysilyl-containing vinyl monomer b1 such as described hereinafter.

The content ratio (which is a value obtained by substitution with the weight of the monomer used to synthesize the polymer) of the polymerizable vinyl monomer a4 in the polymer A is preferably 20 parts by weight or less, and more preferably 10 parts by weight or less with respect to 100 parts by weight of the epoxy-containing vinyl monomer a1. When the polymer A is a mixture of a plurality of types of compounds, the weighted average value (weighted average value based on weight ratio) of the mixed compounds may be used as the content ratio of the polymerizable vinyl monomer a4. When the polymer A is a mixture of a plurality of types of compounds, the content ratio of the polymerizable vinyl monomer a4 with respect to the mixture of compounds preferably satisfies such conditions as those described above.

As described above, the polymer A may contain at least the epoxy-containing vinyl monomer a1 as a monomer component, but preferably contains the epoxy-containing vinyl monomer a1 as well as the vinyl monomer a2 and the vinyl monomer a3. The effects of including a vinyl monomer a2 such as the ones described above, and the effects of including a vinyl monomer a3 such as the ones described above can be obtained at the same time.

The ratio (content ratio) accounted for by the polymer A in the curable resin material (binder resin) is not particularly limited, but is preferably 25 to 80 wt %, and more preferably 33 to 70 wt %. When the polymer A is a mixture of a plurality of types of compounds, the sum of the content ratios of the mixed compounds may be used as the content ratio of the polymer A.

Polymer B

The curable resin material (binder resin) preferably includes a polymer A such as described above, as well as a polymer B that contains at least the alkoxysilyl-containing vinyl monomer b1 indicated by Formula (4) below as a monomer component.

Formula (4)

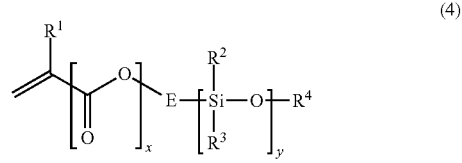

(4)

In Formula (4), $R^1$ is a hydrogen atom or a $C_{1-7}$ alkyl group; E is a single bond hydrocarbon group or a bivalent hydrocarbon group; $R^2$ and $R^3$ are the same or different $C_{1-6}$ alkyl groups or $C_{1-6}$ alkoxyl groups; $R^4$ is a $C_{1-6}$ alkyl group; x is 0 or 1; and y is an integer from 1 to 10.

When the curable resin material (binder resin) includes the polymer A as well as the polymer B, the content ratio of gas (dissolved gas, bubbles present as microbubbles, or the like) in the color filter ink can be reduced, the color filter ink can be provided with particularly excellent discharge stability, unevenness of color and saturation between regions can be suppressed in the color filter manufactured using the color filter ink, and it is possible to obtain excellent uniformity of characteristics between individual units. Including the polymer B together with the polymer A in the curable resin material (binder resin) makes it possible to provide the manufactured color filter with particularly excellent durability. When the curable resin material (binder resin) includes the polymer A as well as the polymer B, excellent mixture stability of the curable resin material and the pigment can be obtained over a long period of time, and color filters having excellent contrast can be stably manufactured over a long period of time. Since the color filter ink, once prepared, can be suitably used for a long time, the frequency of replacing the color filter ink and replacing the color filter ink in the droplet discharge device can be reduced. The color filter can therefore be manufactured with particularly excellent productivity, and the consistency of quality of the manufactured color filter is enhanced.

The polymer B may be composed of essentially a single compound, or may be a mixture of a plurality of types of compounds. However, when the polymer B is a mixture of a plurality of types of compounds, each of the compounds contains at least the alkoxysilyl-containing vinyl monomer b1 as a monomer component.

Alkoxysilyl-Containing Vinyl Monomer b1

The polymer B contains at least the alkoxysilyl-containing vinyl monomer b1 indicated by Formula (4) as a monomer component. Including such an alkoxysilyl-containing vinyl monomer b1 as a monomer component makes it possible to easily and reliably introduce an alkoxysilyl group into the polymer B. By including the alkoxysilyl-containing vinyl monomer b1 as a monomer component, curing of the polymer A can be supplemented when the curable resin material (curable resin composition) is cured to form the colored portion, the colored portion can be formed under relatively mild conditions, and the formed colored portion can be provided with adequately excellent hardness, adhesion to the substrate, light fastness, thermal resistance, and other characteristics. When the polymer B includes a vinyl monomer b2 or the like such as described hereinafter, the polymer can be suitably synthesized, and a polymer B having the desired characteristics can be easily and reliably obtained.

In Formula (4), examples of the $C_{1-7}$ alkyl group indicated by $R^1$ include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. The color filter ink can thereby be provided with particularly excellent dispersion stability of the pigment in the color filter ink, and discharge stability of the color filter ink, and the formed colored portion can be provided with particularly excellent hardness, adhesion to the substrate, light fastness, thermal resistance, and other characteristics. The polymer A can also be provided with particularly excellent compatibility with the polymer B, and the colored portion formed using the color filter ink can be provided with particularly high transparency.

Typical examples of the bivalent hydrocarbon group indicated by E in Formula (4) include straight-chain or branched alkylene groups, or more specifically, methylenes, ethylenes, propylenes, tetramethylenes, ethyl ethylenes, pentamethylenes, hexamethylenes, and the like. Among these examples, a $C_{1-3}$ straight-chain alkylene group (e.g., methylene, ethylene, propylene) is particularly preferred.

Examples of the $C_{1-6}$ alkyl groups indicated by $R^2$, $R^3$, and $R^4$ in Formula (4) include straight-chain or branched alkyl groups, e.g., methyl, ethyl, propyl, isopropyl, butyl, isobutyl, s-butyl, pentyl, hexyl, and the like. Examples of the $C_{1-6}$ alkoxyl groups indicated by $R^2$ and $R^3$ include straight-chain or branched alkoxyl groups, e.g., methoxy, ethoxy, propoxy, isopropoxy, butoxy, isobutoxy, s-butoxy, pentoxy, hexyloxy, and the like.

Specific examples of monomers indicated by Formula (4) include vinyltrimethoxysilane, vinyltriethoxysilane, vinylmethyldimethoxysilane, vinylmethyldiethoxysilane, γ-(meth)acryloyloxypropyltrimethoxysilane, γ-(meth)acryloyloxypropylmethyldimethoxysilane, γ-(meth)acryloyloxypropylmethyldiethoxysilane, γ-(meth)acryloyloxypropyltriethoxysilane, β-(meth)acryloyloxyethyltrimethoxysilane, γ-(meth)acryloyloxybutylphenyldimethoxysilane, and other alkoxysilyl-containing polymerizable unsaturated compounds and the like, and one or more types of compounds selected from the above examples may be combined and used.

The content ratio (which is a value obtained by substitution with the weight of the monomer used to synthesize the polymer) of the alkoxysilyl-containing vinyl monomer b1 in the polymer B is preferably 70 to 100 wt %, and more preferably 80 to 100 wt %. When the content ratio of the alkoxysilyl-containing vinyl monomer b1 in the polymer B is within the aforementioned range, the color filter ink can be provided with particularly excellent dispersion stability of the pigment in the color filter ink, and discharge stability of the color filter ink. Curing of the polymer A can be supplemented when the curable resin material (curable resin composition) is cured to form the colored portion, and the colored portion can be formed under relatively mild conditions. The formed colored portion can also be provided with particularly excellent hardness, adhesion to the substrate, light fastness, thermal resistance, and other characteristics. When the polymer B is a mixture of a plurality of types of compounds, the weighted average value (weighted average value based on weight ratio) of the mixed compounds may be used as the content ratio of the alkoxysilyl-containing vinyl monomer b1. When the polymer B is a mixture of a plurality of types of compounds, the compounds all preferably contain the alkoxysilyl-containing vinyl monomer b1 in such a content ratio as described above.

Other Polymerizable Vinyl Monomer b2

The polymer B may contain at least the alkoxysilyl-containing vinyl monomer b1 as a monomer component, but may also contain as a monomer component a polymerizable vinyl monomer b2 other than the alkoxysilyl-containing vinyl monomer b1, in addition to the alkoxysilyl-containing vinyl monomer b1. A vinyl monomer that can be copolymerized with the alkoxysilyl-containing vinyl monomer b1 may be used as the polymerizable vinyl monomer b2, and specific examples thereof include 2-hydroxyethyl(meth)acrylate, hydroxypropyl(meth)acrylate, 2,3-dihydroxybutyl(meth)acrylate, 4-hydroxybutyl(meth)acrylate, 6-hydroxyhexyl(meth)acrylate, 8-hydroxyoctyl(meth)acrylate, 4-hydroxymethyl cyclohexyl(meth)acrylate, polyalkylene glycol mono(meth)acrylate, and other monoester compounds of a polyalcohol and acrylic acid or methacrylic acid; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized, and other polymerizable vinyl monomers provided with a hydroxyl group; methyl(meth)acrylate, ethyl(meth)acrylate, butyl(meth)acrylate, 2-ethylhexyl(meth)acrylate, phenyl(meth)acrylate, cyclohexyl(meth)acrylate, dicyclopentanyl(meth)acrylate, dicyclopentanyloxyethyl(meth)acrylate, isobornyl(meth)acrylate, benzyl(meth)acrylate, phenyl ethyl(meth)acrylate, and other $C_{1-12}$ alkyl and aralkyl (meth)acrylates; styrene, α-methylstyrene, and other vinyl aromatic compounds; $CF_3(CF_2)_3CH_2CH=CH_2$, $CF_3(CF_2)_3CH=CH_2$, $CF_3(CF_2)_5 CH_2CH=CH_2$, $CF_3(CF_2)_5CH=CH_2$, $CF_3(CF_2)_7 CH=CH_2$, $CF_3(CF_2)_9CH_2CH=CH_2$, $CF_3(CF_2)_9CH=CH_2$, $(CF_3)_2CF(CF_2)_2CH_2CH=CH_2$, $(CF_3)_2CF(CF_2)_2CH=CH_2$, $(CF_3)_2CF(CF_2)_4CH_2CH=CH_2$, $(CF_3)_2CF(CF_2)_4CH=CH_2$, $(CF_3)_2CF(CF_2)_6CH_2CH=CH_2$, $(CF_3)_2CF(CF_2)_6CH=CH$, $F_5C_6CH=CH_2$, $CF_3(CF_2)_5CH_2CH_2OCH_2CH=CH_2$, $CF_3(CF_2)_5CH_2CH_2OCH_2CH=CH_2$, $CF_3(CF_2)_7 CH_2CH_2OCH_2CH=CH_2$, $CF_3(CF_2)_7CH_2CH_2CH_2 OCH_2CH=CH_2$, $CF_3(CF_2)_9CH_2CH_2OCH_2CH=CH_2$, $CF_3$ $(CF_2)_9CH_2CH_2CH_2$ $OCH_2CH=CH_2$, $H(CF_2)_6$ $CH_2OCH_2CH=CH_2$, $H(CF_2)_8CH_2OCH_2CH=CH_2$, $(CF_3)_2$ $CF(CF_2)_2CH_2CH_2OCOCH=CH_2$, $(CF_3)_2CF(CF_2)_2$ $CH_2CH_2OCOC(CH_3)=CH_2$, $(CF_3)_2CF(CF_2)_4$ $CH_2CH_2OCOCH=CH_2$, $(CF_3)_2CF(CF_2)_4CH_2CH_2OCOC$ $(CH_3)=CH_2$, $(CF_3)_2CF(CF_2)_6CH_2CH_2OCOCH=CH_2$, $(CF_3)_2CF(CF_2)_6CH_2CH_2OCOC(CH_3)=CH_2$, $CF_3(CF_2)_5$ $CH_2CH_2OCOCH=CH_2$, $CF_3(CF_2)_5CH_2CH_2OCOC$ $(CH_3)=CH_2$, $CF_3(CF_2)_7CH_2CH_2OCOCH=CH_2$, $CF_3$ $(CF_2)_7CH_2CH_2OCOC(CH_3)=CH_2$, $CF_3(CF_2)_9$ $CH_2CH_2OCOCH=CH_2$, $CF_3(CF_2)_9CH_2CH_2OCOC$ $(CH_3)=CH_2$, $H(CF_2)_6CH_2CH_2OCOCH=CH_2$, $H(CF_2)_8$ $CH_2CH_2OCOC(CH_3)=CH_2$, $F(CF_2)_8$ $CH_2CH_2OCOCH=CH_2$, $F(CF_2)_8CH_2CH_2OCOC(CH_3)=$ $CH_2$, $H(CF_2)_4CH_2OCOC(CH_3)=CH_2$, $H(CF_2)_4$ $CH_2OCOCH=CH_2$, and other fluoroalkyl- or fluoroaryl-containing vinyl monomers and the like, and one or more types of compounds selected from the above examples may be combined and used. However, the polymer B does not contain as a monomer component an epoxy-containing vinyl monomer a1 such as previously described. The polymer B also preferably does not contain a fluoroalkyl- or fluoroaryl-containing vinyl monomer such as described above as a monomer component.

The content ratio (which is a value obtained by substitution with the weight of the monomer used to synthesize the polymer) of the polymerizable vinyl monomer b2 in the polymer B is preferably 30 wt % or less, and more preferably 20 wt % or less. When the polymer B is a mixture of a plurality of types of compounds, the weighted average value (weighted average value based on weight ratio) of the mixed compounds may be used as the content ratio of the polymerizable vinyl monomer b2. When the polymer B is a mixture of a plurality of types of compounds, the content ratio of the polymerizable vinyl monomer b2 with respect to the mixture of compounds preferably satisfies such conditions as those described above.

As described above, the polymer B may contain at least the alkoxysilyl-containing vinyl monomer b1 as a monomer component, and may contain a monomer component other than the alkoxysilyl-containing vinyl monomer b1, but is preferably a homopolymer of the alkoxysilyl-containing vinyl monomer b1. Specifically, the polymer B preferably does not contain components other than the alkoxysilyl-containing vinyl monomer b1 as monomer components. The dispersion stability of the pigment in the color filter ink, the discharge stability of the color filter ink, and the durability of the manufactured color filter can thereby be made particularly excellent.

When the curable resin material (binder resin) includes the polymer B, the ratio (content ratio) accounted for by the polymer B in the curable resin material (binder resin) is not particularly limited, but is preferably 20 to 60 wt %, and more preferably 25 to 55 wt %. When the polymer B is a mixture of a plurality of types of compounds, the sum of the content ratios of the mixed compounds may be used as the content ratio of the polymer B.

The ratio of the polymer A content and the polymer B content in terms of weight is preferably 25:75 to 75:25, and more preferably 45:55 to 55:45. Satisfying such conditions makes it possible to obtain particularly excellent dispersion stability of the pigment in the color filter ink, and particularly excellent discharge stability of the color filter ink. Unevenness of color and saturation between regions of the manufactured color filter can also be more reliably prevented, and particularly excellent uniformity of characteristics between individual units can be obtained. The color filter can also be provided with particularly excellent durability.

Polymer C

The curable resin material (curable resin composition) may also include a polymer C that contains as a monomer component the fluoroalkyl- or fluoroaryl-containing vinyl monomer c1 indicated by Formula (6) below.

Formula (6)

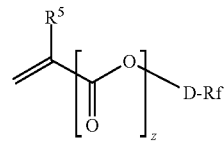

In Formula (6), $R^5$ is a hydrogen atom or a $C_{1-7}$ alkyl group; D is a single bond hydrocarbon group or a bivalent hydrocarbon group which may contain a hetero atom; Rf is a $C_{1-20}$ fluoroalkyl group or fluoroaryl group; and z is 0 or 1.

Including such a polymer C enables the color filter ink to be provided with particularly excellent discharge stability. In particular, fluid depletion from the nozzles of the droplet discharge head can be improved, and such problems as solid components of the color filter ink adhering to the nozzles can be more effectively prevented. The colored portion formed using the color filter ink can also be provided with particularly excellent thermal resistance.

The polymer C may be composed of essentially a single compound, or may be a mixture of a plurality of types of compounds. However, when the polymer C is a mixture of a plurality of types of compounds, each of the compounds contains at least the fluoroalkyl- or fluoroaryl-containing vinyl monomer c1 as a monomer component.

Fluoroalkyl- or Fluoroaryl-containing Vinyl Monomer c1

The polymer C contains at least the fluoroalkyl- or fluoroaryl-containing vinyl monomer c1 indicated by Formula (6) as a monomer component. Including such a fluoroalkyl- or fluoroaryl-containing vinyl monomer c1 as a monomer component makes it possible to easily and reliably introduce a fluoroalkyl group or a fluoroaryl group into the polymer C. Including the fluoroalkyl- or fluoroaryl-containing vinyl monomer c1 as a monomer component enables the color filter ink to be provided with particularly excellent discharge stability. The formed colored portion can also be provided with particularly excellent thermal resistance. When the polymer C includes a vinyl monomer c2 or the like such as described hereinafter, the polymer can be suitably synthesized, and a polymer C having the desired characteristics can be easily and reliably obtained.

Examples of the $C_{1-7}$ alkyl group indicated by $R^5$ in Formula (6) include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. The discharge stability of the color filter ink and the thermal resistance of the formed colored portion can thereby be made particularly excellent.

Typical examples of the bivalent hydrocarbon group (hydrocarbon group which may contain a hetero atom) indicated by D in Formula (6) include straight-chain or branched alkylene groups, or more specifically, methylenes, ethylenes, propylenes, tetramethylenes, ethyl ethylenes, pentamethylenes, hexamethylenes, oxymethylenes, oxyethylenes, oxypropylenes, and the like.

Specific examples of monomers indicated by Formula (6) include $CF_3(CF_2)_3CH_2CH=CH_2$, $CF_3(CF_2)_3CH=CH_2$, $CF_3(CF_2)_5CH_2CH=CH_2$, $CF_3(CF_2)_5CH=CH_2$, $CF_3(CF_2)_7CH=CH_2$, $CF_3(CF_2)_9CH_2CH=CH_2$, $CF_3(CF_2)_9CH=CH_2$, $(CF_3)_2CF(CF_2)_2CH_2CH=CH_2$, $(CF_3)_2CF(CF_2)_2CH=CH_2$, $(CF_3)_2CF(CF_2)_4CH_2CH=CH_2$, $(CF_3)_2CF(CF_2)_4CH=CH_2$, $(CF_3)_2CF(CF_2)_6CH_2CH=CH_2$, $(CF_3)_2CF(CF_2)_6CH=CH_2$, $F_5C_6CH=CH_2$, $CF_3(CF_2)_5CH_2CH_2OCH_2CH=CH_2$, $CF_3(CF_2)_5CH_2CH_2CH_2OCH_2CH=CH_2$, $CF_3(CF_2)_7CH_2CH_2OCH_2CH=CH_2$, $CF_3(CF_2)_7CH_2CH_2CH_2OCH_2CH=CH_2$, $CF_3(CF_2)_9CH_2CH_2OCH_2CH=CH_2$, $CF_3(CF_2)_9CH_2CH_2CH_2OCH_2CH=CH_2$, $H(CF_2)_6CH_2OCH_2CH=CH_2$, $H(CF_2)_8CH_2OCH_2CH=CH_2$, $(CF_3)_2CF(CF_2)_2CH_2CH_2OCOCH=CH_2$, $(CF_3)_2CF(CF_2)_2CH_2CH_2OCOC(CH_3)=CH_2$, $(CF_3)_2CF(CF_2)_4CH_2CH_2OCOCH=CH_2$, $(CF_3)_2CF(CF_2)_4CH_2CH_2OCOC(CH_3)=CH_2$, $(CF_3)_2CF(CF_2)_6CH_2CH_2OCOCH=CH_2$, $(CF_3)_2CF(CF_2)_6CH_2CH_2OCOC(CH_3)=CH_3$, $CF_3(CF_2)_5CH_2CH_2OCOCH=CH_2$, $CF_3(CF_2)_5CH_2CH_2OCOC(CH_3)=CH_2$, $CF_3(CF_2)_7CH_2CH_2OCOCH=CH_2$, $CF_3(CF_2)_7CH_2CH_2OCOC(CH_3)=CH_2$, $CF_3(CF_2)_9CH_2CH_2OCOCH=CH_2$, $CF_3(CF_2)_9CH_2CH_2OCOC(CH_3)=CH_2$, $H(CF_2)_6CH_2CH_2OCOCH=CH_2$, $H(CF_2)_8CH_2CH_2OCOC(CH_3)=CH_2$, $F(CF_2)_8CH_2CH_2OCOCH=CH_2$, $F(CF_2)_8CH_2CH_2OCOC(CH_3)=CH_2$, $H(CF_2)_4CH_2OCOC(CH_3)=CH_2$, $H(CF_2)_4CH_2OCOCH=CH_2$, and the like, and one or more types of compounds selected from the above examples may be combined and used.

The content ratio (which is a value obtained by substitution with the weight of the monomer used to synthesize the polymer) of the fluoroalkyl- or fluoroaryl-containing vinyl monomer c1 in the polymer C is preferably 15 to 100 wt %, and more preferably 18 to 100 wt %. When the content ratio of the fluoroalkyl- or fluoroaryl-containing vinyl monomer c1 in the polymer C is within the aforementioned range, the dispersion stability of the pigment in the color filter ink, the discharge stability of the color filter ink, and the thermal resistance of the formed colored portion can be made particularly excellent. The polymer C can also be provided with particularly excellent compatibility with the polymer A or the polymer B, and the formed colored portion can be provided with particularly high transparency. In contrast, when the content ratio of the fluoroalkyl- or fluoroaryl-containing vinyl monomer c1 in the polymer C is less than the lower limit of the aforementioned range, the effects of including a fluoroalkyl- or fluoroaryl-containing vinyl monomer c1 such as those described above may not be adequately demonstrated. When the polymer C is a mixture of a plurality of types of compounds, the weighted average value (weighted average value based on weight ratio) of the mixed compounds may be used as the content ratio of the fluoroalkyl- or fluoroaryl-containing vinyl monomer c1. When the polymer C is a mixture of a plurality of types of compounds, the compounds all preferably contain the fluoroalkyl- or fluoroaryl-containing vinyl monomer c1 in such a content ratio as described above.

Other Polymerizable Vinyl Monomer c2

The polymer C may contain as a monomer component a polymerizable vinyl monomer c2 other than the fluoroalkyl- or fluoroaryl-containing vinyl monomer c1 such as described above. A vinyl monomer that can be copolymerized with the fluoroalkyl- or fluoroaryl-containing vinyl monomer c1 may be used as the polymerizable vinyl monomer c2, and specific examples thereof include 2-acryloyloxyethyl isocyanate (product name: Karenz MOI; manufactured by Showa Denko), 2-methacryloyloxyethyl isocyanate, and other (meth)acryloyl isocyanates and the like in which (meth)acryloyl is bonded with an isocyanate group via a $C_{2-6}$ alkylene group; ethyl 2-(0-[1'-methylpropylideneamino]carboxyamino)methacrylate (product name: Karenz MOI-BM; manufactured by Showa Denko) and other polymerizable vinyl monomers provided with an isocyanate group or a blocked isocyanate group in which the isocyanate group is protected by a protective group; 2-hydroxyethyl(meth)acrylate, hydroxypropyl(meth)acrylate, 2,3-dihydroxybutyl (meth)acrylate, 4-hydroxybutyl(meth)acrylate, 6-hydroxyhexyl(meth)acrylate, 8-hydroxyoctyl(meth)acrylate, 4-hydroxymethyl cyclohexyl(meth)acrylate, polyalkylene glycol mono(meth)acrylate, and other monoester compounds of a polyalcohol and acrylic acid or methacrylic acid; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized, and other polymerizable vinyl monomers provided with a hydroxyl group; methyl(meth)acrylate, ethyl(meth)acrylate, butyl(meth)acrylate, 2-ethylhexyl(meth)acrylate, phenyl (meth)acrylate, cyclohexyl(meth)acrylate, dicyclopentanyl (meth)acrylate, dicyclopentanyloxyethyl(meth)acrylate, isobornyl(meth)acrylate, benzyl(meth)acrylate, phenyl ethyl (meth)acrylate, and other $C_{1-12}$ alkyl and aralkyl(meth)acrylates; styrene, α-methylstyrene, and other vinyl aromatic compounds; and one or more types of compounds selected from the above examples may be combined and used. However, the polymer C does not contain as a monomer component the epoxy-containing vinyl monomer a1 and the alkoxysilyl-containing vinyl monomer b1 such as previously described.

The content ratio (which is a value obtained by substitution with the weight of the monomer used to synthesize the polymer) of the polymerizable vinyl monomer c2 in the polymer C is preferably 85 wt % or less, and more preferably 82 wt % or less. When the polymer C is a mixture of a plurality of types of compounds, the weighted average value (weighted average value based on weight ratio) of the mixed compounds may be used as the content ratio of the polymerizable vinyl monomer c2. When the polymer C is a mixture of a plurality of types of compounds, the content ratio of the polymerizable vinyl monomer c2 with respect to the mixture of compounds preferably satisfies such conditions as those described above.

When the curable resin material (binder resin) includes the polymer C, the ratio (content ratio) accounted for by the polymer C in the curable resin material (binder resin) is not particularly limited, but is preferably 1 to 20 wt %, and more preferably 2 to 15 wt %. When the polymer C is a mixture of a plurality of types of compounds, the sum of the content ratios of the mixed compounds may be used as the content ratio of the polymer C.

When the curable resin material (binder resin) includes the polymer C, the ratio of the polymer A content and the polymer C content in terms of weight is preferably 50:50 to 99:1, and more preferably 60:40 to 98:2. Satisfying such conditions enables the color filter ink to be provided with particularly excellent dispersion stability of the pigment in the color filter ink, and discharge stability of the color filter ink. The color filter manufactured using the color filter ink can be provided with particularly excellent uniformity of characteristics between individual units, and unevenness of color and saturation between different regions can be more effectively prevented. The color filter can also be provided with particularly excellent durability.

The weight-average molecular weight of each polymer (polymer A, polymer B, polymer C) such as described above is preferably 1000 to 50000, more preferably 1200 to 10000, and even more preferably 1500 to 5000. The degree of dispersion (weight-average molecular weight Mw/number-average molecular weight Mn) of each polymer (polymer A, polymer B, polymer C) such as described above is about 1 to 3.

The content ratio of the curable resin material in the color filter ink is preferably 0.5 to 15 wt %, and more preferably 1 to 8 wt %. When the content ratio of the curable resin material is within this range, the manufactured color filter can be provided with particularly excellent durability while providing particularly excellent pigment dispersion stability in the color filter ink and particularly excellent discharge properties of the color filter ink from the droplet discharge head. Adequate color saturation can also be maintained in the manufactured color filter.

The curable resin material (binder resin) constituting the color filter ink may also include a polymer other than the polymer A, polymer B, and polymer C described above.

The type, content ratio, and other conditions of the curable resin material may be the same or different in the inks (color filter inks) constituting the color filter ink set.

Dispersing Agent

A dispersing agent may be included in the color filter ink. Particularly excellent dispersion stability and dispersion properties of the pigment in the color filter ink, for example, can thereby be obtained. Through the use of a dispersing agent, the dispersing agent is efficiently caused to adhere to (adsorb on) the surfaces of the pigment particles (pigment particles having a relatively large grain size that are not fine dispersed) added to the dispersing-agent-dispersed liquid (dispersing agent solution) in the fine dispersion step, and excellent dispersion properties of the pigment particles (pigment particles having a relatively large grain size that are not fine dispersed) in the dispersing-agent-dispersed liquid can be obtained. The fine dispersion process in the fine dispersion step can thereby be efficiently performed, the production properties of the color filter ink can be made particularly excellent, particularly excellent long-term dispersion stability of the pigment particles (fine dispersed pigment fine-particles) can be obtained in the color filter ink ultimately obtained. The manufactured color filter can also be provided with particularly excellent brightness and contrast.

The dispersing agent is not particularly limited, but a polymer-based dispersing agent, for example, may be used. Examples of polymer-based dispersing agents include basic polymer-based dispersing agents, neutral polymer-based dispersing agents, acidic polymer-based dispersing agents, and the like. Examples of such polymer-based dispersing agents include dispersing agents composed of acrylic-based and modified acrylic-based copolymers; urethane-based dispersing agents; and dispersing agents composed of polyaminoamide salts, polyether esters, phosphoric acid ester-based compounds, aliphatic polycarboxylic acids, and the like.

More specific examples of dispersing agents include Disperbyk 101, Disperbyk 102, Disperbyk 103, Disperbyk P104, Disperbyk P104S, Disperbyk 220S, Disperbyk 106, Disperbyk 108, Disperbyk 109, Disperbyk 110, Disperbyk 111, Disperbyk 112, Disperbyk 116, Disperbyk 140, Disperbyk 142, Disperbyk 160, Disperbyk 161, Disperbyk 162, Disperbyk 163, Disperbyk 164, Disperbyk 166, Disperbyk 167, Disperbyk 168, Disperbyk 170, Disperbyk 171, Disperbyk 174, Disperbyk 180, Disperbyk 182, Disperbyk 183, Disperbyk 184, Disperbyk 185, Disperbyk 2000, Disperbyk 2001, Disperbyk 2050, Disperbyk 2070, Disperbyk 2095, Disperbyk 2150, Disperbyk LPN6919, Disperbyk 9075, and Disperbyk 9077 (all manufactured by Byk Chemie Japan); EFKA 4008, EFKA 4009, EFKA 4010, EFKA 4015, EFKA 4020, EFKA 4046, EFKA 4047, EFKA 4050, EFKA 4055, EFKA 4060, EFKA 4080, EFKA 4400, EFKA 4401, EFKA 4402, EFKA 4403, EFKA4406, EFKA 4408, EFKA 4300, EFKA 4330, EFKA 4340, EFKA 4015, EFKA 4800, EFKA 5010, EFKA 5065, EFKA 5066, EFKA 5070, EFKA 7500, and EFKA 7554 (all manufactured by Ciba Specialty Chemicals); Solsperse 3000, Solsperse 9000, Solsperse 13000, Solsperse 16000, Solsperse 17000, Solsperse 18000, Solsperse 20000, Solsperse 21000, Solsperse 24000, Solsperse 26000, Solsperse 27000, Solsperse 28000, Solsperse 32000, Solsperse 32500, Solsperse 32550, Solsperse 33500 Solsperse 35100, Solsperse 35200, Solsperse 36000, Solsperse 36600, Solsperse38500, Solsperse 41000, Solsperse 41090, and Solsperse 20000 (all manufactured by Nippon Lubrizol); Ajisper PA 111, Ajisper PB711, Ajisper PB821, Ajisper PB822, and Ajisper PB824 (all manufactured by Ajinomoto Fine-Techno); Disparlon 1850, Disparlon 1860, Disparlon 2150, Disparlon 7004, Disparlon DA-100, Disparlon DA-234, Disparlon DA-325, Disparlon DA-375, Disparlon DA-705, Disparlon DA-725, and Disparlon PW-36 (all manufactured by Kusumoto Chemicals); Floren DOPA-14, Floren DOPA-15B, Floren DOPA-17, Floren DOPA-22, Floren DOPA-44, Floren TG-710, and Floren D-90 (all manufactured by Kyoei Kagaku); Anti-Terra-205 (manufactured by Byk Chemie Japan); and the like, and one or more types of compounds selected from the above examples may be combined and used.

The joint use of a dispersing agent having a predetermined acid value (also referred to hereinafter as an acid-value dispersing agent) and a dispersing agent having a predetermined amine value (also referred to hereinafter as an amine-value dispersing agent) is particularly preferred in the present invention. The effects of an acid-value dispersing agent for demonstrating viscosity-reducing effects whereby the viscosity of the color filter ink is reduced, and the effects of an amine-value dispersing agent whereby the viscosity of the color filter ink is stabilized can thereby be obtained at the same time; particularly excellent dispersion stability of the pigment in the color filter ink and discharge stability of the color filter ink can be obtained; unevenness of color, saturation, and other characteristics between regions of the manufactured color filter can be more effectively prevented; and it is possible to obtain particularly excellent uniformity of characteristics between individual units. In particular, a method such as the one described hereinafter has a preparatory dispersion step for obtaining a dispersing-agent-dispersed liquid in which the dispersing agent is dispersed in a solvent by stirring a mixture of the dispersing agent, a thermoplastic resin, and a solvent prior to performing the pigment fine dispersion process, but in such a method, the joint use of an acid-value dispersing agent and an amine-value dispersing agent makes it possible to reliably prevent association of the dispersing agents (association of the acid-value dispersing agent and the amine-value dispersing agent), and to obtain particularly excellent dispersion stability of the pigment, discharge stability of the color filter ink, and other characteristics.

Specific examples of acid-value dispersing agents include Disperbyk P104, Disperbyk P104S, Disperbyk 220S, Disperbyk 110, Disperbyk 111, Disperbyk 170, Disperbyk 171, Disperbyk 174, and Disperbyk 2095 (all manufactured by Byk Chemie Japan); EFKA 5010, EFKA 5065, EFKA 5066, EFKA 5070, EFKA 7500, and EFKA 7554 (all manufactured by Ciba Specialty Chemicals); Solsperse 3000, Solsperse 16000, Solsperse 17000, Solsperse 18000, Solsperse 36000, Solsperse 36600, and Solsperse 41000 (all manufactured by Nippon Lubrizol); and the like. The acid-value dispersing agent applied in the present invention is, of course, not limited by the examples given above.

Specific examples of amine-value dispersing agents include Disperbyk 102, Disperbyk 160, Disperbyk 161, Disperbyk 162, Disperbyk 163, Disperbyk 164, Disperbyk 166, Disperbyk 167, Disperbyk 168, Disperbyk 2150, Disperbyk LPN6919, Disperbyk 9075, and Disperbyk 9077 (all manufactured by Byk Chemie Japan); EFKA 4015, EFKA 4020, EFKA 4046, EFKA 4047, EFKA 4050, EFKA 4055, EFKA 4060, EFKA 4080, EFKA 4300, EFKA 4330, EFKA 4340, EFKA 4400, EFKA 4401, EFKA 4402, EFKA 4403, and EFKA 4800 (all manufactured by Ciba Specialty Chemicals); Ajisper PB711 (manufactured by Ajinomoto Fine Techno); Anti-Terra-205 (manufactured by Byk Chemie Japan); and the like. The amine-value dispersing agent applied in the present invention is, of course, not limited by the examples given above.

When an acid-value dispersing agent and an amine-value dispersing agent are used jointly, the acid value (acid value on a solid basis) of the acid-value dispersing agent is not particularly limited, but is preferably 5 to 370 KOH mg/g, more preferably 20 to 270 KOH mg/g, and more preferably 30 to 135 KOH mg/g. When the acid value of the acid-value dispersing agent is within the aforementioned range, particularly excellent dispersion stability of the pigment can be obtained in the case of joint use with an amine-value dispersing agent. The acid value of the dispersing agent can be calculated by a method based on DIN EN ISO 2114, for example.

The acid-value dispersing agent preferably does not have a predetermined amine value; i.e., the acid-value dispersing agent preferably has an amine value of zero.

When an amine-value dispersing agent and an acid-value dispersing agent are jointly used, the amine value (amine value on a solid basis) of the amine-value dispersing agent is not particularly limited, but is preferably 5 to 200 KOH mg/g, more preferably 25 to 170 KOH mg/g, and more preferably 30 to 130 KOH mg/g. When the amine value of the amine-value dispersing agent is within the aforementioned range, particularly excellent dispersion stability of the pigment can be obtained in the case of joint use with an acid-value dispersing agent. The amine value of the dispersing agent can be calculated by a method based on DIN 16945, for example.

The amine-value dispersing agent preferably does not have a predetermined acid value; i.e., the amine-value dispersing agent preferably has an acid value of zero.

When an acid-value dispersing agent and an amine-value dispersing agent are jointly used, the relation $0.1 \leq C_A/C_B \leq 1$ is preferably satisfied, and the relation $0.15 \leq C_A/C_B \leq 0.5$ is more preferably satisfied, wherein $C_A$ (wt %) is the content ratio of the acid-value dispersing agent in the color filter ink, and $C_B$ (wt %) is the content ratio of the amine-value dispersing agent in the color filter ink. Satisfying such a relation makes it possible to more significantly demonstrate the synergistic effects of jointly using the acid-value dispersing agent and the amine-value dispersing agent, and to obtain particularly excellent dispersion stability of the pigment, discharge stability of droplets, and other effects.

The relation $0.01 \leq (AV \times C_A)/(BV \times C_B) \leq 1.9$ is preferably satisfied, and the relation $0.10 \leq (AV \times C_A)/(BV \times C_B) \leq 0.95$ is more preferably satisfied, wherein AV (KOH mg/g) is the acid value of the acid-value dispersing agent, BV (KOH mg/g) is the amine value of the amine-value dispersing agent, $C_A$ (wt %) is the content ratio of the acid-value dispersing agent, and $C_B$ (wt %) is the content ratio of the amine-value dispersing agent. Satisfying such a relation makes it possible to more significantly demonstrate the synergistic effects of jointly using the acid-value dispersing agent and the amine-value dispersing agent, and to obtain particularly excellent dispersion stability of the pigment, discharge stability of droplets, and other effects.

A dispersing agent other than the ones described above may be used as the dispersing agent. For example, a compound provided with a cyamelide backbone, for example, may be used as the dispersing agent. The use of such a compound as the dispersing agent makes it possible to obtain particularly excellent dispersion properties of the pigment in the liquid medium in which the curable resin material such as described above is dissolved, and to provide the color filter ink with particularly excellent discharge stability. Such excellent effects are obtained by the synergistic effects of using a liquid medium such as described above, and a curable resin material such as described above (curable resin material including the polymer A) jointly with a compound provided with a cyamelide backbone, and not merely by using a compound provided with a cyamelide backbone as the dispersing agent.

A compound having the partial structure indicated by Formula (7) and Formula (8) below, for example, may be used as the dispersing agent. Using such a compound as the dispersing agent makes it possible to obtain particularly excellent dispersion properties of the pigment in the color filter ink, and to provide the color filter ink with particularly excellent discharge stability.

Formula (7)

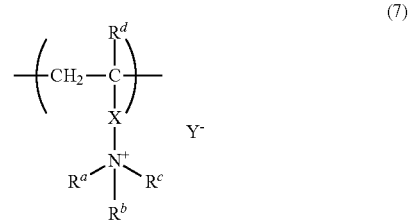

(7)

In Formula (7), $R^a$, $R^b$, and $R^c$ are each independently a hydrogen atom, or a cyclic or chain hydrocarbon group which may be substituted; or two or more of $R^a$, $R^b$, and $R^c$ bond with each other and form a cyclic structure; $R^d$ is a hydrogen atom or a methyl group; X is a bivalent linking group; and $Y^-$ is a counter anion.

Formula (8)

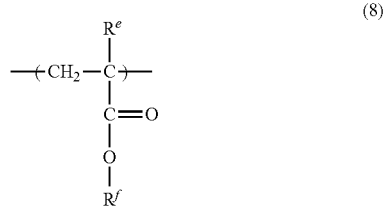

(8)

In Formula (8), $R^e$ is a hydrogen atom or a methyl group; $R^f$ is a cyclic or chain alkyl group which may have a substituted group, an aryl group which may have a substituted group, or an aralkyl group which may have a substituted group.

The content ratio of the dispersing agent in the color filter ink is not particularly limited, but is preferably 0.3 to 15 wt %, and more preferably 0.5 to 8 wt %.

Thermoplastic Resin

The color filter ink may include a thermoplastic resin. Particularly excellent dispersion properties of the pigment particles in the color filter ink can thereby be obtained. In particular, in a manufacturing method such as described hereinafter, the dispersion stability of the pigment particles in the color filter ink can be made extremely excellent by using a thermoplastic resin in the preparatory dispersion process.

Examples of thermoplastic resins include alginic acid, polyvinyl alcohol, hydroxypropyl cellulose, carboxymethyl cellulose, hydroxyethyl cellulose, methyl cellulose, styrene-acrylic acid resin, styrene-acrylic acid-acrylic acid ester resin, styrene-maleic acid resin, styrene-maleic acid semi-ester resin, methacrylic acid-methacrylic acid ester resin, acrylic acid-acrylic acid ester resin, isobutylene-maleic acid resin, rosin-modified maleic acid resin, polyvinyl pyrrolidone, gum arabic starch, polyallyl amine, polyvinyl amine, polyethylene imine, and the like, and one or more types of compounds selected from the above examples may be combined and used.

The content ratio of the thermoplastic resin in the color filter ink is not particularly limited, but is preferably 1.5 to 7.7 wt %, and more preferably 2.1 to 7.2 wt %.

Other Components

The color filter ink that constitutes the color filter ink set may include components other than those described above. Examples of such components include various cross-linking agents; thermoacid generators such as diazonium salt, iodonium salt, sulfonium salt, phosphonium salt, selenium salt, oxonium salt, ammonium salt, benzothiazolium salt, and other onium salts; diazonium salt, iodonium salt, sulfonium salt, phosphonium salt, selenium salt, oxonium salt, ammonium salt, and other photoacid generators; various polymerization initiators; acid crosslinking agents; intensifiers; photostabilizers; adhesive improvers; various polymerization accelerants; various photostabilizers; glass, alumina, and other fillers; vinyl trimethoxysilane, vinyl triethoxysilane, vinyl tris(2-methoxy ethoxy)silane, N-(2-aminoethyl)-3-aminopropyl methyl dimethoxysilane, N-(2-aminoethyl)-3-aminopropyl trimethoxysilane, 3-aminopropyl triethoxysilane, 3-glycidoxy propyl trimethoxysilane, 3-glycidoxy propyl methyl dimethoxysilane, 2-(3,4-epoxy cyclohexyl) ethyl trimethoxysilane, 3-chloro propyl methyl dimethoxysilane, 3-chloro propyl trimethoxysilane, 3-methacryloxy propyl trimethoxysilane, 3-mercapto propyl trimethoxysilane, and other adhesion accelerants; 2,2-thiobis(4-methyl-6-t-butyl phenol), 2,6-di-t-butyl phenol, and other antioxidants; 2-(3-t-butyl-5-methyl-2-hydroxy phenyl)-5-chloro benzotriazole, alkoxy benzophenone, and other UV absorbers; sodium polyacrylate, and other anti-coagulants; and the like.

Examples of cross-linking agents that may be used include polycarboxylic acid anhydrides, polycarboxylic acids, polyfunctional epoxy monomers, polyfunctional acrylic monomers, polyfunctional vinyl ether monomers, and polyfunctional oxetane monomers. Specific examples of polycarboxylic acid anhydrides include phthalic anhydride, itaconic anhydride, succinic anhydride, citraconic anhydride, dodecenyl succinic anhydride, tricarballylic anhydride, maleic anhydride, hexahydrophthalic anhydride, dimethyl tetrahydrophthalic anhydride, himic anhydride, nadic anhydride, and other aliphatic or alicyclic dicarboxylic anhydrides; 1,2,3,4-butane tetracarboxylic acid dianhydride and cyclopentane tetracarboxylic acid dianhydride; benzophenone tetracarboxylic anhydride and other aromatic polycarboxylic acid anhydrides; ethylene glycol bis trimellitate, glycerin tris trimellitate, and other ester-containing organic anhydrides, among which an aromatic polycarboxylic acid anhydride is preferred. An epoxy resin curing agent composed of a commercially available carboxylic acid anhydride can also be suitably used. Specific examples of polycarboxylic acids include succinic acid, glutaric acid, adipic acid, butane tetracarboxylic acid, maleic acid, itaconic acid, and other aliphatic polycarboxylic acids; hexahydrophthalic acid, 1,2-cyclohexane dicarboxylic acid, 1,2,4-cyclohexane tricarboxylic acid, cyclopentane tetracarboxylic acid, and other alicyclic polycarboxylic acids; and phthalic acid, isophthalic acid, terephthalic acid, pyromellitic acid, trimellitic acid, 1,4,5,8-naphthalene tetracarboxylic acid, benzophenone tetracarboxylic acid, and other aromatic polycarboxylic acid, but among these, aromatic polycarboxylic acid is preferred. Specific examples of a polyfunctional epoxy monomer include the product name Celloxide 2021 manufactured by Daicel Chemical Industries, the product name Epolead GT401 manufactured by Daicel Chemical Industries, the product name Epolead PB3600 manufactured by Daicel Chemical Industries, bisphenol A, hydrogenated bisphenol A, and triglycidyl isocyanurate. Specific example of a polyfunctional acrylic monomer include pentaerythritolethoxy tetraacrylate, pentaerythritol tetraacrylate, pentaerythritol triacrylate, pentaerythritolethoxy tetraacrylate, ditrimethylolpropane tetraacrylate, trimethylolpropane triacrylate, trimethylolpropane ethoxy triacrylate, dipentaerythritol hexaacrylate trimethallyl isocyanurate, and triallyl isocyanurate. Examples of a polyfunctional vinyl ether monomer include 1,4-butanediol vinyl ether, 1,6-hexanediol divinyl ether, nonanediol divinyl ether, cyclohexanediol divinyl ether, cyclohexanedimethanol divinyl ether, triethylene glycol divinyl ether, trimethylolpropane trivinyl ether, and pentaerythritol tetravinyl ether. Examples of polyfunctional oxetane monomers include xylylene dioxetane, biphenyl-type oxetane, and novolac-type oxetane.

The thermoacid generator is a component for generating acid by applying heat, and particularly preferred among those described above are sulfonium salt and benzothiazolium. More specific examples of thermoacid generators in terms of product names include Sunaid SI-45, Sunaid SI-47, Sunaid SI-60, Sunaid SI-60L, Sunaid SI-80, Sunaid SI-80L, Sunaid SI-100, Sunaid SI-100L, Sunaid SI-145, Sunaid SI-150, Sunaid SI-160, Sunaid SI-110L, Sunaid SI-180L (all product names, manufactured by Sanshin Chemical Industry Co., Ltd.), CI-2921, CI-2920, CI-2946, CI-3128, CI-2624, CI-2639, CI-2064 (all product names, manufactured by Nippon Soda Co., Ltd.), CP-66, CP-77 (product names, manufactured by Adeka Corporation), and FC-520 (product name, manufactured by 3M Company).

The photoacid generator is a component for generating acid by using light, and more specific examples include the product names Cyracure UVI-6970, Cyracure UVI-6974, Cyracure UVI-6990, Cyracure UVI-950 (all product names, manufactured by US Union Carbide), Irgacure 261 (product name, Ciba Specialty Chemicals), SP-150, SP-151, SP-170, Optomer SP-171 (all product names, manufactured by Adeka Corporation), CG-24-61 (product name, manufactured by Ciba Specialty Chemicals), Daicat II (product name, manufactured by Daicel Chemical Industries, Ltd.), UVAC 1591 (product name, manufactured by Daicel UCB Co., Ltd.), CI-2064, CI-2639, CI-2624, CI-2481, CI-2734, CI-2855, CI-2823, CI-2758 (product name, manufactured by Nippon Soda Co., Ltd.), PI-2074 (product name, manufactured by Rhone Poulenc, pentafluorophenyl borate tolyl cumyl iodonium), FFC509 (product name, manufactured by 3M Company), BBI-102, BBI-101, BBI-103, MPI-103, TPS-103, MDS-103, DTS-103, NAT-103, NDS-103 (product name, manufactured by Midori Kagaku Co., Ltd.), and CD-1012 (product name, manufactured by Sartomer Co., Inc.).

The viscosity (viscosity (kinetic viscosity) measured using an E-type viscometer) of the color filter ink at 25° C. is preferably 13 mPa·s or lower, more preferably 12 mPa·s or lower, and more preferably 5 to 11 mPa·s. The production efficiency (efficiency of forming the colored portion) of the color filter can thereby be made particularly excellent, for example, and unwanted fluctuation of the thickness and other characteristics of the colored portion can be effectively prevented. The viscosity (kinetic viscosity) of the color filter ink can be measured using an E-type viscometer (e.g., RE-01 manufactured by Toki Sangyo), for example, and can particularly be performed in accordance with JIS Z8809.

The amount of change in the viscosity at 25° C. of the color filter ink constituting the color filter ink set after the color filter ink is left for 10 days at 50° C. is preferably 0.5 mPa·s or less, more preferably 0.3 mPa·s or less, and more preferably 0.2 mPa·s or less. The color filter ink can thereby be provided with particularly excellent discharge stability, and the color filter ink can be suitably used for a longer period of time to manufacture a color filter in which the occurrence of uneven color, saturation, and the like is reliably prevented.

Color Filter Ink Manufacturing Method

Preferred embodiments of the method for manufacturing a color filter ink such as described above, and particularly of a method for manufacturing a color filter ink that includes a curable resin material, a thermoplastic resin, and a pigment as the colorant will next be described.

The manufacturing method of the present embodiment has a preparatory dispersion step of obtaining a dispersing-agent-dispersed liquid (dispersing agent solution) in which a dispersing agent is dispersed in a solvent, by stirring a mixture of a dispersing agent, a thermoplastic resin, and a solvent; a fine dispersion step of adding a pigment to the dispersing-agent-dispersed liquid, adding inorganic beads in multi-stage fashion and performing a fine dispersion process, and obtaining a pigment dispersion; and a curable resin mixing step of mixing the pigment dispersion and the curable resin material.

Preparatory Dispersion Step

In the preparatory dispersion step, a dispersing-agent-dispersed liquid (dispersing agent solution) in which a dispersing agent is dispersed in a solvent is prepared by stirring a mixture that includes a dispersing agent, a thermoplastic resin, and a solvent. The associated state of the dispersing agent can thereby be released (undone). The acid-value dispersing agent and amine-value dispersing agent described above have the characteristic of being readily attracted to each other electrically, but by performing the preparatory dispersion step prior to fine dispersing the pigments (fine dispersion step) according to the present embodiment, the acid-value dispersing agent and amine-value dispersing agent can be uniformly and stably adhered to the surfaces of the pigment particles in a state in which association is adequately released; aggregation of the dispersing agents with each other, aggregation of pigment particles with each other, and other effects can be reliably prevented; and particularly excellent pigment dispersion stability and droplet discharge stability can be obtained.

In this step, the thermoplastic resin, the dispersing agent, and the solvent are mixed together in advance, whereby the dispersing agent and the thermoplastic resin are adhered to the surfaces of the pigment particles (pigment particles having a relatively large grain size that are not fine dispersed) added to the dispersing-agent-dispersed liquid in the fine dispersion step described hereinafter, and excellent dispersion properties of the pigment particles (pigment particles having a relatively large grain size that are not fine dispersed) in the dispersing-agent-dispersed liquid can be obtained. The fine dispersion process in the fine dispersion step can thereby be efficiently performed, the production properties of the color filter ink can be made particularly excellent, and particularly excellent long-term dispersion stability of the pigment particles (fine dispersed pigment fine-particles) and discharge stability of droplets can be obtained in the color filter ink ultimately obtained.

The content ratio (sum of the content ratios of the plurality of types of dispersing agents when a plurality of types of dispersing agents is included) of the dispersing agent in the dispersing-agent-dispersed liquid prepared in the present step is not particularly limited, but is preferably 10 to 40 wt %, and more preferably 12 to 32 wt %. When the content ratio of the dispersing agent is within this range, such effects as previously described are demonstrated more significantly.

The content ratio of the thermoplastic resin in the dispersing-agent-dispersed liquid prepared in the present step is not particularly limited, but is preferably 6 to 30 wt %, and more preferably 8 to 26 wt %. When the content ratio of the thermoplastic resin is within this range, such effects as previously described are demonstrated more significantly.

The content ratio of the solvent in the dispersing-agent-dispersed liquid prepared in the present step is not particularly limited, but is preferably 40 to 80 wt %, and more preferably 53 to 75 wt %. When the content ratio of the solvent is within this range, such effects as previously described are demonstrated more significantly. A solvent having the same composition as the liquid medium constituting the desired color filter ink may be used as the solvent, or a solvent having a different composition may be used. In the present step, when a solvent having a different composition than the liquid medium constituting the desired color filter ink is used as the solvent, a liquid medium having the desired composition can be obtained in the color filter ink ultimately obtained by diluting with a predetermined liquid (solvent), and performing liquid (solvent) replacement involving vacuum processing, heat treatment, or the like in a subsequent step, for example.

In the present step, a dispersing-agent-dispersed liquid is obtained by stirring a mixture of the abovementioned components using various types of agitators.

Examples of agitators that can be used in the present step include a Dispermill or other single-shaft or twin-shaft mixer or the like.

The stirring time for which the agitator is used is not particularly limited, but is preferably 1 to 30 minutes, and more preferably 3 to 20 minutes. The associated state of the dispersing agent can thereby be more effectively released while adequately excellent production properties of the color filter ink are obtained, and particularly excellent dispersion stability of pigment particles in the color filter ink ultimately obtained, particularly excellent discharge stability of the color filter ink can be obtained.

The speed of the stirring vanes of the agitator in the present step is not particularly limited, but is preferably 500 to 4000 rpm, and more preferably 800 to 3000 rpm. The associated state of the dispersing agent can thereby be more effectively released while adequately excellent production properties of the color filter ink are obtained, and it is possible to obtain particularly excellent dispersion stability of pigment particles in the color filter ink ultimately obtained. Degradation, denaturation, and the like of the thermoplastic resin and other components due to heat and the like can also be reliably prevented.

Fine Dispersion Step

A pigment such as described above is then added to the dispersing-agent dispersed liquid obtained in the step described above, inorganic beads are added in multiple stages, and a fine dispersion process is performed (fine dispersion step).

Prior to adding the pigment, a preparatory dispersion step such as the one described above is thus provided in the present embodiment, and inorganic beads are added in multiple stages in the step (fine dispersion step) of fine dispersing the pigment. In the fine dispersion step, adding the inorganic beads in multi-stage fashion makes it possible to form fine-particles of the pigment with superior efficiency, and to make the pigment particles adequately small in the color filter ink ultimately obtained. In particular, the effects of jointly using an acid-value dispersing agent and an amine-value dispersing agent such as described above, and the effects of using a method having a preparatory dispersion step and a multi-stage fine dispersion step act synergistically, the color filter ink ultimately obtained can be provided with extremely excellent dispersion stability of pigment and discharge stability of droplets, and the color filter ink can be used to manufacture a color filter having extremely excellent brightness and contrast.

In contrast, when the fine dispersion step is not performed in multiple stages, it is difficult to make the pigment particles adequately small in the color filter ink ultimately obtained, and the production properties of the color filter ink can be severely reduced. Even when the fine dispersion step is performed in multiple stages, such problems as the following can occur when the preparatory dispersion step such as described above is omitted. Specifically, when the preparatory dispersion step is omitted, since the associated state of the dispersing agent is not adequately released (not undone) when the pigment is added, it is difficult to uniformly adhere the dispersing agent and the thermoplastic resin to the surfaces of the pigment particles in the fine dispersion step. It is also difficult obtain adequately excellent dispersion properties of the pigment particles (pigment particles having relatively large grain size that are not fine dispersed) in the solvent in the fine dispersion step.

It is sufficient for the present step to be performed by adding the inorganic beads in multiple stages, and the inorganic beads may be added in three or more stages, but the inorganic beads are preferably added in two stages. The production properties of the color filter ink can thereby be made particularly excellent while the color filter ink ultimately obtained is provided with adequately excellent long-term dispersion stability of the pigment particles.

A method for adding the inorganic beads in two stages will be described below. Specifically, a typical example of a method will be described for performing a first treatment using first organic beads, and a second treatment using second organic beads in the fine dispersion step.

The inorganic beads (first inorganic beads and second inorganic beads) used in the present step may be composed of any material insofar as the material is an inorganic material, but preferred examples of the inorganic beads include zirconia beads (e.g., Toray Ceram milling balls (trade name); manufactured by Toray) and the like.

First Treatment

In the present step, the pigments are first added to the dispersing-agent-dispersed liquid prepared in the preparatory dispersion step described above, and a first treatment is performed for primary fine dispersion using first inorganic beads having a predetermined grain size.

The first inorganic beads used in the first treatment preferably have a larger grain size than the second inorganic beads used in the second treatment. The efficiency of fine-particle formation (fine dispersion) of the pigments in the overall fine dispersion step can thereby be made particularly excellent.

The average grain size of the first inorganic beads is not particularly limited, but is preferably 0.5 to 3.0 mm, more preferably 0.5 to 2.0 mm, and more preferably 0.5 to 1.2 mm. When the average grain size of the first inorganic beads is within the aforementioned range, the efficiency of fine-particle formation (fine dispersion) of the pigments in the overall fine dispersion step can be made particularly excellent. In contrast, when the average grain size of the first inorganic beads is less than the lower limit of the aforementioned range, severe reduction of the efficiency of fine-particle formation (grain size reduction) of the pigment particles by the first treatment tends to occur according to the type and other characteristics of the pigments. When the average grain size of the first inorganic beads exceeds the upper limit of the aforementioned range, although the efficiency of fine-particle formation (grain size reduction) of the pigment particles by the first treatment can be made relatively excellent, the efficiency of fine-particle formation (grain size reduction) of the pigment particles by the second treatment is reduced, and the efficiency of fine-particle formation (fine dispersion) of the pigments is reduced in the fine dispersion step as a whole.

The amount of the first inorganic beads used is not particularly limited, but is preferably 100 to 600 parts by weight, and more preferably 200 to 500 parts by weight with respect to 100 parts by weight of the dispersing-agent-dispersed liquid.

The amount of the pigments added to the dispersing-agent-dispersed liquid is not particularly limited, but is preferably 12 parts by weight or more, and more preferably 18 to 35 parts by weight with respect to 100 parts by weight of the dispersing-agent-dispersed liquid.

The first treatment may be performed by stirring using various types of agitators in a state in which the pigments and the first inorganic beads are added to the dispersing-agent-dispersed liquid.

Examples of agitators that can be used in the first treatment include a ball mill or other media-type dispersing device, a Dispermill or other single-shaft or twin-shaft mixer, or the like.

The stirring time (processing time of the first treatment) for which the agitator is used is not particularly limited, but is preferably 10 to 120 minutes, and more preferably 15 to 40 minutes. Fine-particle formation (fine dispersion) of the pigments can thereby be efficiently advanced without reducing the production properties of the color filter ink.

The speed of the stirring vanes of the agitator in the first treatment is not particularly limited, but is preferably 1000 to 5000 rpm, and more preferably 1200 to 3800 rpm. Fine-particle formation (fine dispersion) of the pigments can thereby be efficiently advanced without reducing the production properties of the color filter ink. Degradation, denaturation, and the like of the thermoplastic resin and other components due to heat and the like can also be reliably prevented.

Second Treatment

A second treatment using second inorganic beads is performed after the first treatment. A pigment dispersion is thereby obtained in which the pigment particles are adequately fine dispersed.

The second treatment may be performed in a state in which the first inorganic beads are included, but the first inorganic beads are preferably removed prior to the second treatment. Fine-particle formation (fine dispersion) of the pigments in the second treatment can thereby be performed with particularly excellent efficiency. The first inorganic beads can be easily and reliably removed by filtration or the like, for example.

The second inorganic beads used in the second treatment preferably have a smaller grain size than the first inorganic beads used in the first treatment. The pigments can thereby be adequately formed into fine-particles (fine dispersed) in the color filter ink ultimately obtained, particularly excellent dispersion stability (long-term dispersion stability) of the pigment particles in the color filter ink over a long period of time can be obtained, and particularly excellent discharge stability of droplets can be obtained.

The average grain size of the second inorganic beads is not particularly limited, but is preferably 0.03 to 0.3 mm, and more preferably 0.05 to 0.2 mm. When the average grain size of the second inorganic beads is within the aforementioned range, the pigments can be formed into fine-particles (fine dispersed) with particularly excellent efficiency in the fine dispersion step as a whole. In contrast, when the average grain size of the second inorganic beads is less than the lower limit of the aforementioned range, severe reduction of the efficiency of fine-particle formation (grain size reduction) of the pigment particles by the second treatment tends to occur according to the type and other characteristics of the pigments. When the average grain size of the second inorganic beads exceeds the upper limit of the aforementioned range, fine-particle formation (fine dispersion) of the pigment particles can be difficult to adequately advance.

The amount of the second inorganic beads used is not particularly limited, but is preferably 100 to 600 parts by weight, and more preferably 200 to 500 parts by weight with respect to 100 parts by weight of the dispersing-agent-dispersed liquid.

The second treatment can be performed using various types of agitators.

Examples of agitators that can be used in the second treatment include a ball mill or other media-type dispersing device, a Dispermill or other single-shaft or twin-shaft mixer, or the like.

The stirring time (processing time of the second treatment) for which the agitator is used is not particularly limited, but is preferably 10 to 120 minutes, and more preferably 15 to 40 minutes. Fine-particle formation (fine dispersion) of the pigments can thereby be adequately advanced without reducing the production properties of the color filter ink.

The speed of the stirring vanes of the agitator in the second treatment is not particularly limited, but is preferably 1000 to 5000 rpm, and more preferably 1200 to 3800 rpm. Fine-particle formation (fine dispersion) of the pigments can thereby be efficiently advanced without reducing the production properties of the color filter ink. Degradation, denaturation, and the like of the thermoplastic resin and other components due to heat and the like can also be reliably prevented.

A case was described above in which the fine dispersion process was performed in two stages, but three or more stages of processing may also be performed. In such a case, the inorganic beads used in the later stages preferably have a smaller diameter than the inorganic beads used in the first stages. In other words, the average grain size of the inorganic beads ($n^{th}$ inorganic beads) used in the $n^{th}$ process is preferably smaller than the average grain size of the inorganic beads ($(n-1)^{th}$ inorganic beads) used in the $(n-1)^{th}$ process. By satisfying such a relationship, the pigment particles can be formed into fine-particles (fine dispersed) with particularly excellent efficiency, and the diameter of the pigment particles can be reduced in the color filter ink ultimately obtained.

In the fine dispersion step (e.g., the first treatment and the second treatment), the solvent may be used for dilution or the like, for example, as needed.

Curable Resin Mixing Step

The pigment dispersion obtained in the fine dispersion step such as described above is mixed with the curable resin material (curable resin mixing step). The color filter ink is thereby obtained.

The present step is preferably performed in a state in which the second inorganic beads used in the second treatment have been removed. The second inorganic beads can be easily and reliably removed by filtration, for example.

The present step can be performed using various types of agitators.

Examples of agitators that can be used in the present step include a Dispermill or other single-shaft or twin-shaft mixer, or the like.

The stirring time (processing time of the present step) for which the agitator is used is not particularly limited, but is preferably 1 to 60 minutes, and more preferably 15 to 40 minutes.

The speed of the stirring vanes of the agitator in the present step is not particularly limited, but is preferably 1000 to 5000 rpm, and more preferably 1200 to 3800 rpm.

In the present step, a liquid having a different composition than the solvent used in the aforementioned step may be added. A color filter ink having the desired characteristics can thereby be reliably obtained while dispersion of the dispersing agent in the aforementioned preparatory dispersion step, and fine dispersion of the pigment particles in the fine dispersion step are appropriately performed.

In the present step, at least a portion of the solvent used in the aforementioned step may be removed prior to mixing of the pigment dispersion and the curable resin material, and after mixing of the pigment dispersion and the curable resin material. The composition of the solvent in the preparatory dispersion step and the fine dispersion step, and the composition of the liquid medium in the color filter ink ultimately obtained can thereby be made to differ from each other. As a result, a color filter ink having the desired characteristics can be reliably obtained while dispersion of the dispersing agent in the aforementioned preparatory dispersion step, and fine dispersion of the pigment particles in the fine dispersion step are appropriately performed. The solvent can be removed by placing the liquid to be removed in a reduced-pressure atmosphere, heating, or another method, for example.

Color Filter

Following is a description of an example of a color filter manufactured using the color filter ink (ink set) described above.

FIG. 1 is a sectional view showing a preferred embodiment of the color filter of the present invention.

A color filter 1 is provided with a substrate 11 and colored portions 12 formed using the color filter ink set described above, as shown in FIG. 1. The colored portions 12 are provided with a first colored portion 12A, a second colored portion 12B, and a third colored portion 12C, formed using mutually different types of ink. A partition wall 13 is disposed between adjacent colored portions 12. The first colored portion 12A, the second colored portion 12B, and the third colored portion 12C may be formed using mutually different types of ink, but description hereinafter will deal mainly with a case in which the first colored portion 12A is formed using red ink, the second colored portion 12B is formed using green ink, and the third colored portion 12C is formed using blue ink.

Substrate

The substrate 11 is a plate-shaped member having optical transparency, and has a function for holding the colored portions 12 and the partition wall 13.

It is preferred that the substrate 11 be essentially composed of a transparent material. A clearer image can thereby be formed by light transmitted through the color filter 1.

The substrate 11 is preferably one having excellent heat resistance and mechanical strength. Deformations or the like caused by, e.g., heat applied during the manufacture of the color filter 1 can thereby be reliably prevented. Examples of a constituent material of the substrate 11 that satisfies such conditions include glass, silicon, polycarbonate, polyester, aromatic polyamide, polyamidoimide, polyimide, norbornene-based ring-opening polymers, and hydrogenated substances.

Colored Portions

The colored portions 12 are formed using a color filter ink set such as that described above.

The colored portions 12 (first colored portion 12A, second colored portion 12B, and third colored portion 12C) are formed using a color filter ink such as that described above, and therefore have little variation in characteristics between colors and pixels. For this reason, the color filter 1 has an adequately wide color reproduction range, and is highly reliable in that the occurrence of unevenness of color and saturation, and the like is suppressed.

Each colored portion 12 is disposed inside a cell 14, which is an area enclosed by a later-described partition wall 13.

The first colored portion 12A, the second colored portion 12B, and the third colored portion 12C have mutually different colors. For example, the first colored portion 12A can be a red filter area (R), second colored portion 12B can be a green filter area (G), and the third colored portion 12C can be a blue filter area (B). The colored portions 12A, 12B, 12C as a single set of different colors constitute a single pixel. A prescribed number of the colored portions 12 are disposed in the lateral and longitudinal directions in the color filter 1. For example, when the color filter 1 is a color filter for high definition, 1366×768 pixels are disposed; when the color filter is a color filter for full high definition, 1920×1080 pixels are disposed; and when the color filter is a color filter for super high definition, 7680×4320 pixels are disposed. The color filter 1 may be provided with, e.g., spare pixels outside of the effective area.

Partition Wall

A partition wall (bank) 13 is disposed between adjacent colored portions 12. Adjacent colored portions 12 can thereby be reliably prevented from color mixing, and as a result, a sharp image can be reliably displayed.

The partition wall 13 may be composed of a transparent material, but is preferably composed of material having light-blocking properties. An image with excellent contrast can thereby be displayed. The color of the partition wall (light-blocking portion) 13 is not particularly limited, but black is preferred. Accordingly, the contrast of a displayed image is particularly good.

The height of the partition wall 13 is not particularly limited, but is preferably greater than the thickness of the colored portions 12. Color mixing between adjacent colored portions 12 can thereby be reliably prevented. The specific thickness of the partition wall 13 is preferably 0.1 to 10 μm, and more preferably 0.5 to 3.5 μm. Color mixing between adjacent colored portions 12 can thereby be reliably prevented, and image display devices and electronic devices provided with the color filter 1 can be provided with excellent visual angle characteristics.

The partition wall 13 may be composed of any material, but is preferably composed principally of a resin material, for example. Accordingly, a partition wall 13 having a desired shape can be easily formed using a method described hereinafter. In the case that the partition wall 13 functions as a light-blocking portion, carbon black or another light-absorbing material may be included as a constituent element of the partition wall.

Method for Manufacturing Color Filter

Next, an example of the method for manufacturing the color filter 1 will be described.

Figure 3:
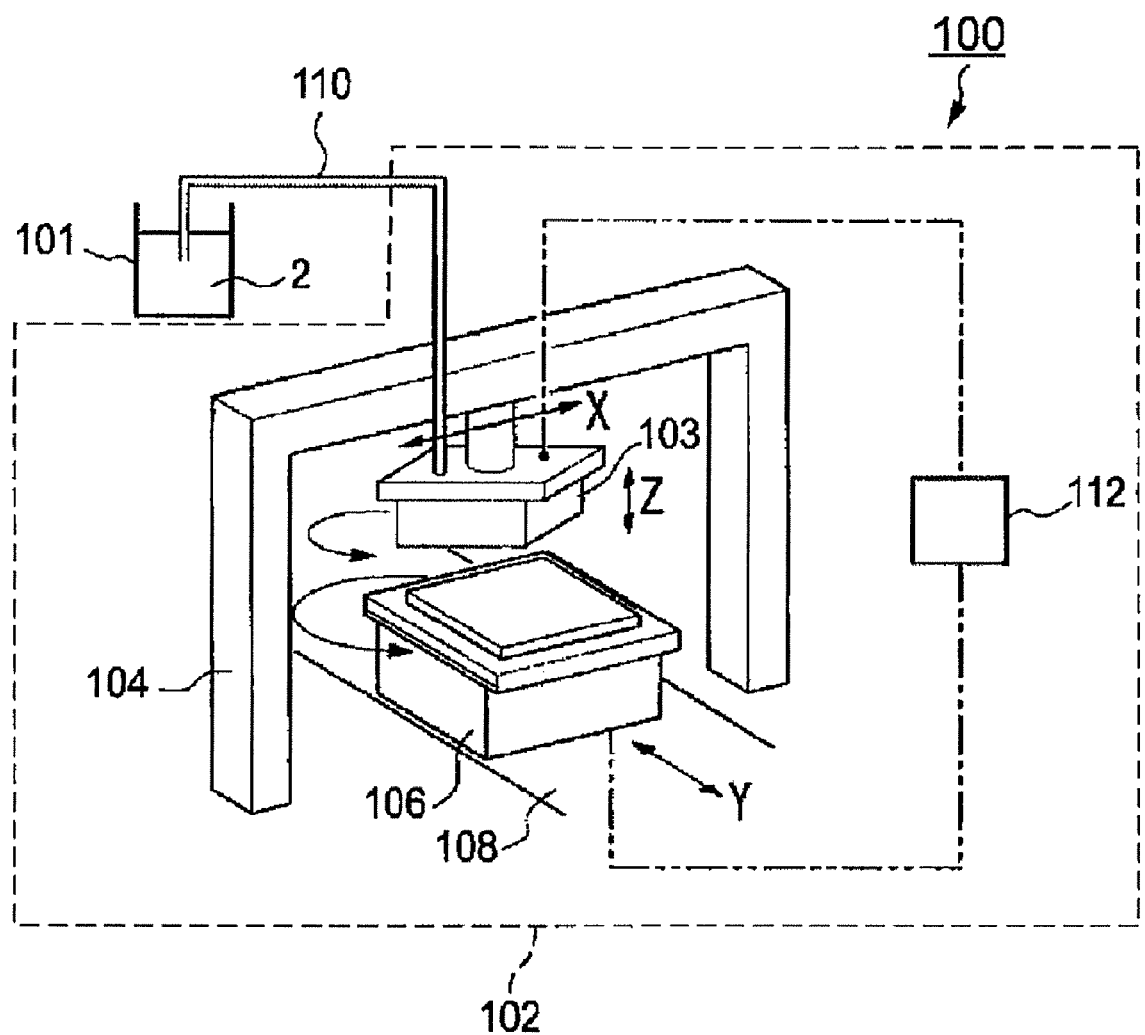
FIG. 3 is perspective view showing a droplet discharge device used in the manufacture of the color filter.
Figure 4:
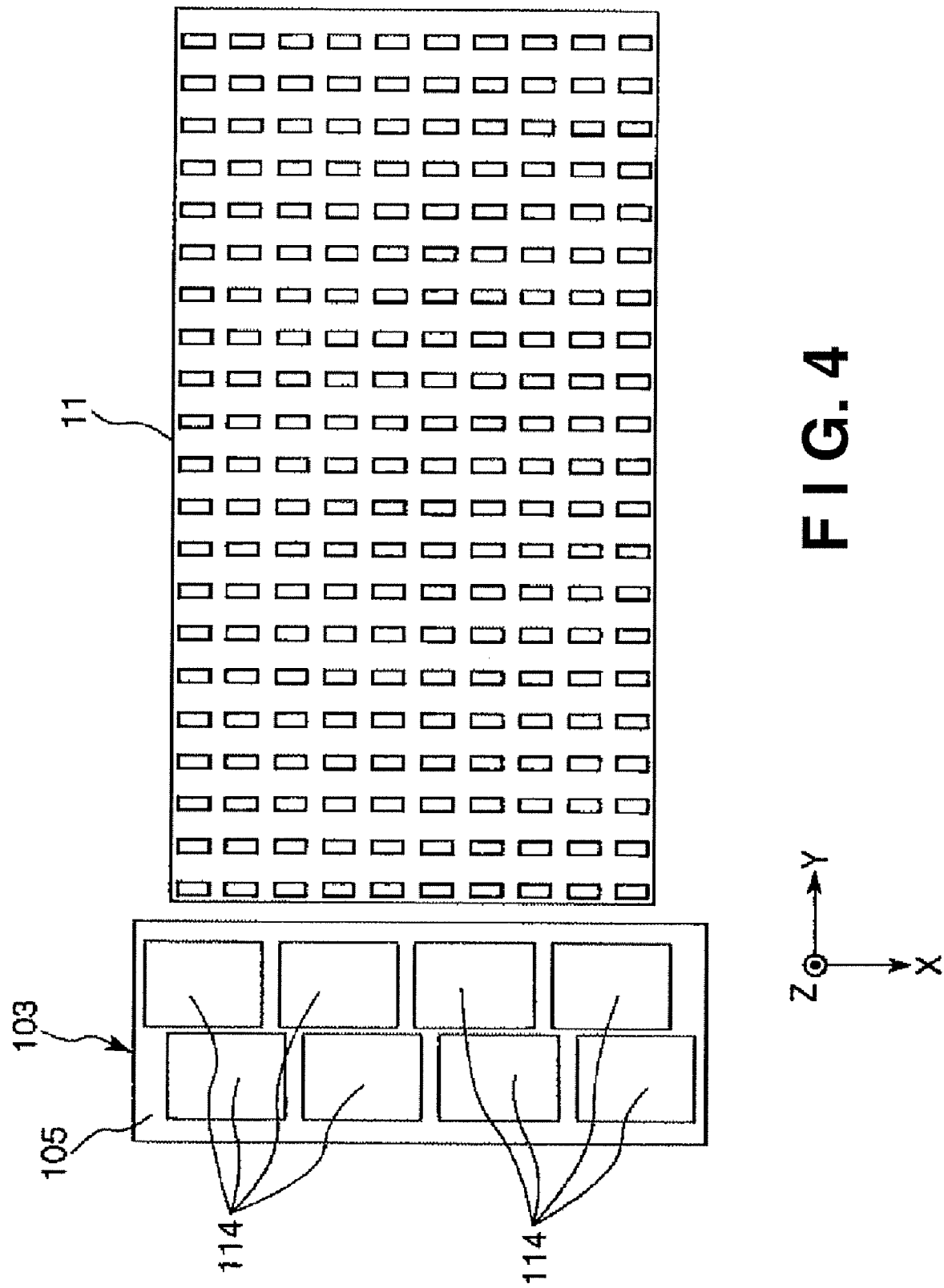
FIG. 4 is a view of the droplet discharge means of the droplet discharge device shown in FIG. 3 as seen from the stage.
Figure 5:
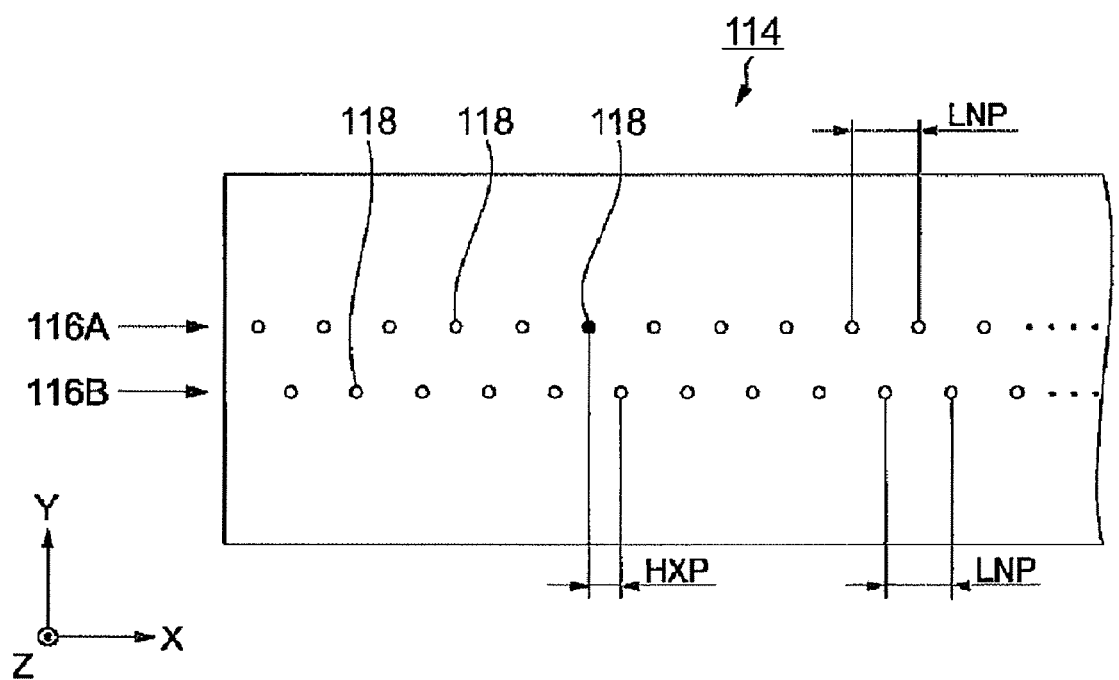
FIG. 5 is a view showing the bottom surface of the droplet discharge head of the droplet discharge device shown in FIG. 3.
Figure 6:
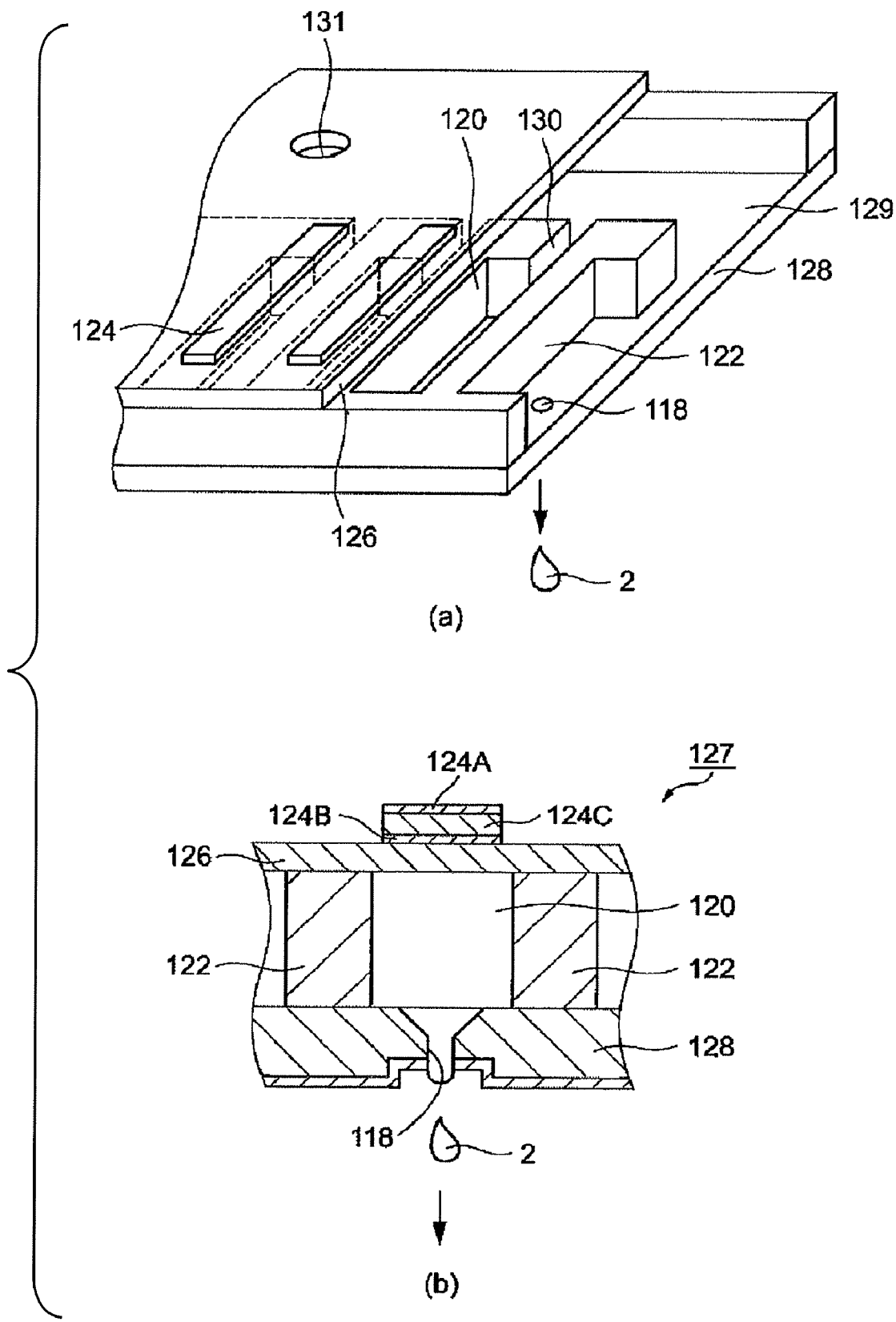
FIG. 6 includes a pair of diagrams (a) and (b) showing a droplet discharge head of the droplet discharge device shown in FIG. 3, wherein FIG. 6(*a*) is a cross-sectional perspective view and FIG. 6(*b*) is a cross-sectional view.

FIG. 2 is a cross-sectional view showing a method for manufacturing a color filter; FIG. 3 is a perspective view showing the droplet discharge device used in the manufacture of the color filter; FIG. 4 is a view of droplet discharge means in the droplet discharge device shown in FIG. 3, as seen from the stage side; FIG. 5 is a view showing the bottom surface of the droplet discharge head in the droplet discharge device shown in FIG. 3; and FIG. 6 is a view showing the droplet discharge head in the droplet discharge device shown in FIG.

3, wherein FIG. 6(a) is a cross-sectional perspective view and FIG. 6(b) is a cross-sectional view.

The present embodiment has a substrate preparation step (1a) for preparing a substrate 11, a partition wall formation step (1b, 1c) for forming a partition wall 13 on the substrate 11, an ink application step (1d) for applying color filter ink 2 into an area surrounded by the partition wall 13 by using an inkjet method, and a colored portion formation step (1e) for forming solid colored portions 12 by removing the liquid medium from the color filter ink 2 and curing the curable resin material, as shown in FIG. 2.

Substrate Preparation Step

First, a substrate 11 is prepared (1a). It is preferred that the substrate 11 to be prepared in the present step undergo a washing treatment. The substrate 11 to be prepared in the present step may be washed by chemical treatment using a silane-coupling agent or the like, a plasma treatment, ion plating, sputtering, gas phase reaction, vacuum deposition, or another suitable washing treatment.

Partition Wall Formation Step

Next, a radiation-sensitive composition is applied to substantially the entire surface of one of the surfaces of the substrate 11 to form (1b) a coated film 3. A prebaking treatment may be performed as required after the radiation-sensitive composition has been applied to the substrate 11. The prebaking treatment may be carried out under the conditions of, e.g., a heating temperature of 50 to 150° C. and a heating time of 30 to 600 seconds.

Next, a partition wall 13 is formed (1c) by irradiating the surface via a photomask, performing a post exposure bake (PEB), and carrying out a development treatment using an alkali development fluid. PEB can be carried out under the following example conditions: a heating temperature of 50 to 150° C., a heating time of 30 to 600 seconds, and a radiation intensity of 1 to 500 mJ/cm$^2$. The development treatment can be performed using, e.g., fluid overflow, dipping, vibration soaking, or another method, and the development treatment time can be set to 10 to 300 seconds, for example. After the development treatment, a post baking treatment may be performed as required. The post baking treatment can be carried out under the following example conditions: a heating temperature of 150 to 280° C. and a heating time of 3 to 120 minutes.

Ink Application Step

Next, the color filter ink (ink) 2 constituting the color filter ink set described above is applied (1d) to the cells 14 surrounded by the partition wall 13 using the inkjet method.

The present step is carried out using the color filter ink set provided with a plurality of types of color filter inks 2 that correspond to the plurality of colors of the colored portions 12 to be formed. In this case, a partition wall 13 is provided, and mixing of two or more color filter inks 2 can therefore be reliably prevented.

The color filter ink 2 is discharged using a droplet discharge device such as that shown in FIGS. 3 to 6.

The droplet discharge device 100 used in the present step is provided with a tank 101 for holding the color filter ink 2, a tube 110, and a discharge scan unit 102 to which the color filter ink 2 is fed from the tank 101 via the tube 110, as shown in FIG. 3. The discharge scan unit 102 is provided with droplet discharge means 103 in which a plurality of droplet discharge heads (inkjet heads) 114 is mounted on a carriage 105, a first position controller 104 (movement means) for controlling the position of the droplet discharge means 103, a stage 106 for holding the substrate 11 (hereinafter simply referred to as "substrate 11") on which the partition wall 13 is formed in an aforementioned step, a second position controller 108 (movement means) for controlling the position of the stage 106, and control means 112. The tank 101 and the plurality of droplet discharge heads 114 in the droplet discharge means 103 are connected by the tube 110, and the color filter ink 2 is fed by compressed air from the tank 101 to each of the plurality of droplet discharge heads 114.

The first position controller 104 moves the droplet discharge means 103 along the X-axis direction and Z-axis direction orthogonal to the X-axis direction, in accordance with a signal from the control means 112. The first position controller 104 also has a function for rotating the droplet discharge means 103 about the axis parallel to the Z-axis. In the present embodiment, the Z-axis direction is the direction parallel to the perpendicular direction (i.e., the direction of gravitational acceleration). The second position controller 108 moves the stage 106 along the Y-axis direction, which is orthogonal to both the X-axis direction and the Z-axis direction, in accordance with a signal from the control means 112. The second position controller 108 also has a function for rotating the stage 106 about the axis parallel to the Z-axis.

The stage 106 has a surface parallel to both the X-axis direction and the Y-axis direction. The stage 106 is configured so as to be capable of securing or holding the substrate 11 on the planar surface thereof, the substrate having the cells 14 in which the color filter ink 2 is to be applied.

As described above, the droplet discharge means 103 is moved in the X-axis direction by the first position controller 104. On the other hand, the stage 106 is moved in the Y-axis direction by the second position controller 108. In other words, the relative position of the droplet discharge heads 114 in relation to the stage 106 is changed by the first position controller 104 and the second position controller 108 (the substrate 11 held on the stage 106 and the droplet discharge means 103 move in a relative fashion).

The control means 112 is configured so as to receive from an external information processor discharge data that express the relative position in which the color filter ink 2 is to be discharged.

The droplet discharge means 103 has a plurality of droplet discharge heads 114, which have substantially the same structure as each other, and a carriage 105 for holding the droplet discharge heads 114, as shown in FIG. 4. In the present embodiment, the number of droplet discharge heads 114 held in the droplet discharge means 103 is eight. Each of the droplet discharge heads 114 has a bottom surface on which a plurality of later-described nozzles 118 is disposed. The shape of the bottom surface of each of the droplet discharge heads 114 is a polygon having two short sides and two long sides. The bottom surface of the droplet discharge heads 114 held in the droplet discharge means 103 faces the stage 106 side, and the long-side direction and the short-side direction of the droplet discharge heads 114 are parallel to the X-axis direction and the Y-axis direction, respectively.

The droplet discharge heads 114 have a plurality of nozzles 118 aligned in the X-axis direction, as shown in FIG. 5. The plurality of nozzles 118 is disposed so that a nozzle pitch HXP in the X-axis direction in the droplet discharge heads 114 has a prescribed value. The specific value of the nozzle pitch HXP is not particularly limited, but may be 50 to 90 μm, for example. In this case, "the nozzle pitch HXP in the X-axis direction in the droplet discharge heads 114" corresponds to the pitch between a plurality of nozzle images obtained by projecting all of the nozzles 118 in the droplet discharge heads 114 on the X axis along the Y-axis direction.

In the present embodiment, the plurality of nozzles 118 in the droplet discharge heads 114 forms a nozzle row 116A and a nozzle row 116B, both of which extend in the X-axis direction. The nozzle row 16A and the nozzle row 16B are disposed in parallel across an interval. In the present embodiment, 90 nozzles 118 are aligned in a row in the X-axis direction with a fixed interval LNP in each nozzle row 16A and nozzle row 16B. The specific value of LNP is not particularly limited, but may be 100 to 180 μm, for example.

The position of the nozzle row 116B is offset in the positive direction (to the right in FIG. 5) of the X-axis direction by half the length of the nozzle pitch LNP in relation to the position of the nozzle row 16A. For this reason, the nozzle pitch HXP in the X-axis direction of the droplet discharge heads 114 is half the length of the nozzle pitch LNP of the nozzle row 16A (or the nozzle row 16B).

Therefore, the nozzle line density in the X-axis direction of the droplet discharge heads 114 is twice the nozzle line density of the nozzle row 16A (or the nozzle row 16B). In the present specification, "the nozzle line density in the X-axis direction" corresponds to the number per unit length of the plurality of nozzle images obtained by projecting a plurality of nozzles on the X-axis along the Y-axis direction. Naturally, the number of nozzle rows included in the droplet discharge heads 114 is not limited to two rows. The droplet discharge heads 114 may include M number of nozzle rows. In this case, M is a natural number of 1 or higher. In this case, the plurality of nozzles 118 in each of the M number of nozzle rows is aligned at a pitch having a length that is M times that of the nozzle pitch HXP. In the case that M is a natural number of 2 or higher, another (M−1) number of nozzle rows are offset in the X-axis direction without overlapping, by a length i times that of the nozzle pitch HXP, in relation to a single nozzle row among the M number of nozzle rows. Here, i is a natural number from 1 to (M−1).

In the present embodiment, since the nozzle row 16A and the nozzle row 16B are each composed of 90 nozzles 118, a single droplet discharge head 114 has 180 nozzles 118. However, five nozzles at each end of the nozzle row 16A are set as "reserve nozzles." Similarly, five nozzles at each end of the nozzle row 16B are set as "reserve nozzles." The color filter ink 2 is not discharged from these 20 "reserve nozzles." For this reason, 160 nozzles 118 among the 180 nozzles 118 in the droplet discharge heads 114 function as nozzles for discharging the color filter ink 2.

In the droplet discharge means 103, the plurality of droplet discharge heads 114 is disposed in two rows along the X-axis direction, as shown in FIG. 4. One of the rows of droplet discharge heads 114 and the other row of droplet discharge heads 114 are disposed so that a portion of the droplet discharge heads overlap as viewed from the Y-axis direction, with consideration given to the reserve nozzles. The nozzles 118 for discharging the color filter ink 2 are thereby configured so as to be continuous in the X-axis direction at the nozzle pitch HXP across the length of the dimension in the X-axis direction of the substrate 11 in the droplet discharge means 103.

In the droplet discharge means 103 of the present embodiment, the droplet discharge heads 114 are disposed so as to cover the entire length of the dimension in the X-axis direction of the substrate 11. However, the droplet discharge means in the present invention may cover a portion of the length of the dimension in the X-axis direction of the substrate 11.

Each of the droplet discharge heads 114 is an inkjet head, as shown in the diagram. More specifically, each of the droplet discharge heads 114 is provided with a vibration plate 126 and a nozzle plate 128. A fluid reservoir 129 in which the color filter ink 2 fed from the tank 101 via a hole 131 is constantly filled is positioned between the vibration plate 126 and the nozzle plate 128.

A plurality of partition walls 122 is disposed between the vibration plate 126 and the nozzle plate 128. The portions enclosed by the vibration plate 126, the nozzle plate 128, and a pair of partition walls 122 are cavities 120. Since the cavities 120 are disposed in correspondence with the nozzles 118, the number of cavities 120 and the number of nozzles 118 is the same. The color filter ink 2 is fed to the cavities 120 from the fluid reservoir 129 via supply ports 130 positioned between pairs of partition walls 122.

An oscillator 124 is positioned on the vibration plate 126 in correspondence with each of the cavities 120. The oscillator 124 includes a piezoelement 124C, and a pair of electrodes 124A, 124B that sandwich the piezoelement 124C. The color filter ink 2 is discharged from the corresponding nozzle 118 by applying a drive voltage between the pair of electrodes 124A, 124B. The shape of the nozzles 118 is adjusted so that the color filter ink 2 is discharged in the Z-axis direction from the nozzles 118.

The control means 112 (see FIG. 3) may be configured so as to independently apply signals to each of the plurality of oscillators 124. In other words, the volume of the color filter ink 2 discharged from the nozzles 118 can be controlled for each nozzle 118 in accordance with a signal from the control means 112. The control means 112 can also set the nozzles 118 that will perform a discharge operation during a coating scan, as well as the nozzles 118 that will not perform a discharge operation.

In the present specification, the portion that includes a single nozzle 118, a cavity 120 that corresponds to the nozzle 118, and the oscillator 124 that corresponds to the cavity 120 will be referred to as a "discharge portion 127". In accordance with this designation, a single droplet discharge head 114 has the same number of discharge portions 127 as the number of nozzles 118.

The color filter ink 2 corresponding to the plurality of colored portions 12 of the color filter 1 is applied to the cells 14 using such a droplet discharge device 100. The color filter ink 2 can be selectively applied with good efficiency in the cells 14 by using such a device. In the configuration of the diagrams, the droplet discharge device 100 has a tank 101 for holding the color filter ink 2, a tube 110, and other components for only one color, but these members may have a plurality of colors the correspond to the plurality of colored portions 12 of the color filter 1. Also, in the manufacture of the color filter 1, a plurality of droplet discharge devices 100 corresponding to a plurality of color filter inks 2 may be used.

The color filter ink set of the present invention as described above has excellent uniformity of discharge characteristics between inks (ease of discharge from the droplet discharge head, discharge quantity, and other characteristics), and the uniformity of the discharge properties is stably maintained over a long period of time. Therefore, when droplet discharge such as described above is performed, it is possible to reliably prevent unintentional fluctuation of the droplet quantity of the color filter ink 2 that is applied to the cells 14. As a result, the color filter ultimately obtained can be provided with excellent uniformity of color saturation between colored portions 12. In particular, since the droplet discharge device (industrial) used for color filter manufacturing is entirely different from what is used for a printer (consumer-level), and the droplet discharge device is used for mass production and droplet discharge onto large-scale workpieces (substrates), for example, there is a need to discharge large quantities of droplets for long periods of time. However, even when droplet discharge is performed under such harsh conditions, since stable droplet discharge can be performed through the use of the color filter ink set of the present invention, adequately excellent uniformity of color saturation between colored portions can be obtained in the color filter ultimately obtained, and variations in quality between color filters can also be effectively prevented.

In the present invention, the droplet discharge heads 114 may use an electrostatic actuator in place of the piezoelement as the drive element. The droplet discharge heads 114 may have a configuration in which an electrothermal converter is used and color filter ink is discharged using the thermal expansion of material produced by an electrothermal converter.

Colored Portion Formation Step (Curing Step)

Next, the liquid medium is removed from the color filter ink 2 in the cells 14, and solid colored portions 12 are formed by curing the curable resin material (1e). The color filter 1 is obtained in this manner.

The present step, heating is ordinarily carried out, but in the present step, for example, treatments involving irradiation of active energy rays, treatments in which the substrate 11 to which the color filter ink 2 has been applied is placed under a reduced-pressure environment, and other treatments may also be performed. The curing reaction of the curable resin material can be made to proceed with good efficiency by irradiating active energy rays; the curing reaction of the curable resin material can be reliably promoted even when the heating temperature is relatively low; the occurrence of adverse effects on the substrate 11 and other components can reliably prevented; and other effects can be obtained. Examples of the active energy rays that may be used include light rays of various wavelengths, e.g., UV rays, X-rays, g-rays, i-rays, and excimer lasers. The substrate 11 on which the color filter ink 2 has been applied can be placed under a reduced-pressure environment, whereby the liquid medium can be removed with good efficiency, the shape of the colored portions in the pixels (cells) can be reliably made into good preferred shapes, the liquid medium can be reliably removed even when the heating temperature is relatively low, the occurrence of adverse effects on the substrate 11 and the like can be reliably prevented, and other effects can be obtained.

The heating temperature in the present step is not particularly limited, but 50 to 260° C. is preferred, and 80 to 240° C. is even more preferred.

Image Display Device

Preferred embodiments of the liquid crystal display device, which is an image display device (electrooptic device) having the color filter 1, will next be described.

FIG. 7 is a cross-sectional view showing a preferred embodiment of the liquid crystal display device. As shown in the diagram, the liquid crystal display device 60 has a color filter 1, a substrate (opposing substrate) 66 arranged on the surface on which the colored portions 12 of the color filter 1 are disposed, a liquid crystal layer 62 composed of a liquid crystal sealed in the gaps between the color filter 1 and the substrate 66, a polarizing plate 67 disposed on the surface (lower side in FIG. 7) opposite from the surface that faces the liquid crystal layer 62 of the substrate 11 of the color filter 1, and a polarizing plate 68 disposed on the side (upper side in FIG. 7) opposite from the surface that faces liquid crystal layer 62 of the substrate 66. A shared electrode 61 is disposed on the surface (the surface opposite from the surface facing the substrate 11 of the colored portions 12 and the partition wall 13) on which the colored portions 12 and the partition wall 13 of the color filter 1 are disposed. Pixel electrodes 65 are disposed in the form of a matrix in positions that correspond to the colored portions 12 of the color filter 1 on the substrate (opposing substrate) 66, facing the liquid crystal layer 62 and color filter 1. An alignment film 64 is disposed between the shared electrode 61 and the liquid crystal layer 62, and an alignment film 63 is disposed between the substrate 66 (pixel electrodes 65) and the liquid crystal layer 62.

The substrate 66 is a substrate having optical transparency with respect to visible light, and is a glass substrate, for example.

The shared electrode 61 and the pixel electrodes 65 are composed of a material having optical transparency with respect to visible light, and are ITO or the like, for example.

Although not depicted in the diagram, a plurality of switching elements (e.g., TFT: thin film transistors) is disposed so as to correspond to the pixel electrodes 65. The pixel electrodes 65 corresponding to the colored portions 12 can be used to control the transmission properties of light in areas that correspond to the colored portions 12 (pixel electrodes 65) by controlling the state of the voltage applied between the shared electrode 61 and the pixel electrodes.

In the liquid crystal display device 60, light emitted from the backlight, which is not depicted, is incident from the polarizing plate 68 side (the upper side in FIG. 7). The light that passes through the liquid crystal layer 62 and enters the colored portions 12 (12A, 12B, 12C) of the color filter 1 is emitted from the polarizing plate 67 (lower side of FIG. 7) as light having a color that corresponds to the colored portions 12 (12A, 12B, 12C).

As described above, the colored portions 12 are formed using the color filter ink set of the present invention and therefore have reduced variability in the characteristics between colors and pixels. As a result, an image having an adequately wide color reproduction range and reduced unevenness of color, saturation, and the like can be stably displayed in the liquid crystal display device 60.

Electronic Device

A liquid crystal display device or another image display device (electrooptic device) 1000 having a color filter 1 such as that described above can be used in a display unit of a variety of electronic equipment.

FIG. 8 is a perspective view showing the configuration of a mobile (or notebook) personal computer to which the electronic equipment of the present invention has been applied.

In the diagram, a personal computer 1100 is composed of a main unit 1104 provided with a keyboard 1102, and a display unit 1106. The display unit 1106 is rotatably supported by the main unit 1104 via a hinge structure.

In the personal computer 1100, the display unit 1106 is provided with an image display device 1000.

FIG. 9 is a perspective view showing the configuration of a portable telephone (including PHS) to which the electronic device of the present invention has been applied.

In the diagram, the portable telephone 1200 has a plurality of operating buttons 1202, an earpiece 1204, and a mouthpiece 1206, as well as an image display device 1000 provided to the display unit.

Figure 10:
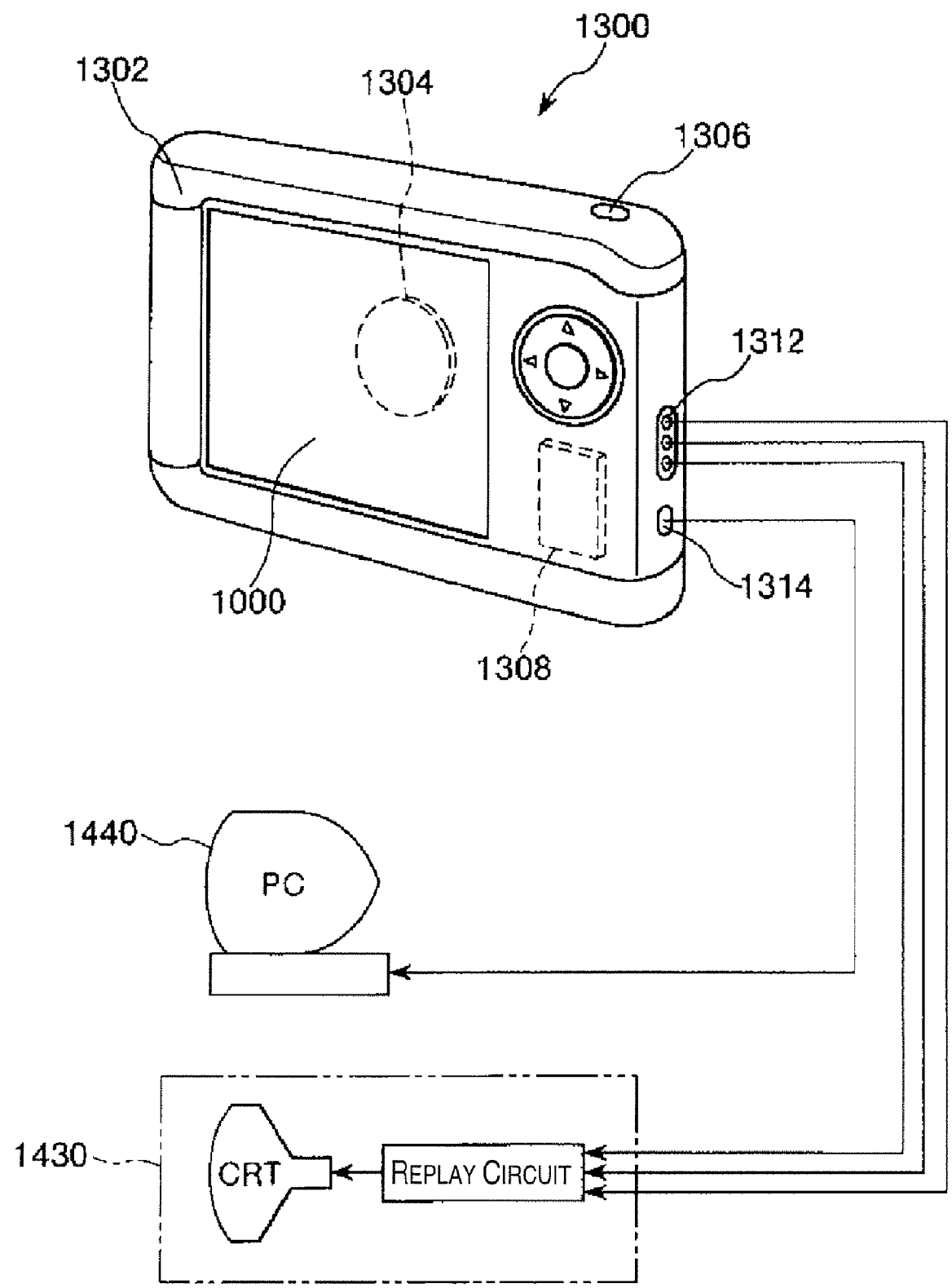
FIG. 10 is a perspective view showing a digital still camera exemplifying an electronic device in accordance with the present invention.

FIG. 10 is a perspective view showing the configuration of a digital still camera in which the electronic device of the present invention has been applied. In the diagram, connection to external apparatuses is displayed in a simplified manner.

In this case, an ordinary camera exposes a silver-salt photography film to the optical image of a photographed object, but in contrast, a digital still camera 1300 photoelectrically converts the optical image of a photographed image and generates an imaging signal (image signal) with the aid of a CCD (Charge Coupled Device) or another imaging element.

An image display device 1000 is disposed in the display portion on the back surface of a case (body) 1302 in the digital still camera 1300, is configured to perform display operation on the basis of a pickup signal from the CCD, and functions as a finder for displaying the photographed object as an electronic image.

A circuit board 1308 is disposed inside the case. The circuit board 1308 has a memory that can store (record) the imaging signal.

A photo-detection unit 1304 that includes an optical lens (imaging optical system), a CCD, and the like is disposed on the front surface side (back surface side in the configuration of the diagram) of the case 1302.

A photographer confirms the image of the object to be photographed displayed on the display unit, and the imaging signal of the CCD when a shutter button 1306 is pressed is transferred and stored in the memory of the circuit board 1308.

In the digital still camera 1300, a video signal output terminal 1312 and a data communication I/O terminal 1314 are disposed on the side surface of the case 1302. A television monitor 1430 is connected to the video signal output terminal 1312 as required, and a personal computer 1440 is connected to the data communication I/O terminal 1314 as required, as shown in the diagram. An imaging signal stored in the memory of the circuit board 1308 is configured to be outputted by a prescribed operation to the television monitor 1430 and the personal computer 1440.

The electronic device of the present invention may be applied to the above-described personal computer (mobile personal computer), portable telephone, and digital still camera, and other examples include televisions (e.g., liquid crystal display devices), video cameras, view finder-type and direct-view monitor-type video tape recorders, laptop personal computers, car navigation devices, pagers, electronic assistants (including those with a communication function), electronic dictionaries, calculators, electronic game devices, word processors, work stations, videophones, security television monitors, electronic binoculars, POS terminals, apparatuses having a touch panel (e.g., cash dispensers for financial institutions, and automatic ticketing machines), medical equipment (e.g., electronic thermometers, sphygmomanometers, blood glucose sensors, electrocardiograph display devices, ultrasound diagnostic devices, and endoscopic display devices), fish finders, various measuring apparatuses, instruments (e.g., instruments in vehicles, aircraft, and ships), flight simulators, and various other monitors, and projectors, and other projection display devices. Among these, televisions have display units that are tending to become markedly larger in recent years, but in electronic devices having such a large display unit (e.g., a display unit having a diagonal length of 80 cm or more), unevenness of color and saturation, and other problems particularly readily occur when a color filter manufactured using a conventional color filter ink set is used. However, in accordance with the present invention, the occurrence of such problems can be reliably prevented. In other words, the effect of the present invention is more markedly demonstrated when application is made to an electronic device having a large display unit such as that described above.

The present invention above was described based on preferred embodiments, but the present invention is not limited to these embodiments.

For example, in the embodiments described above, color filter ink corresponding to the colored portions of various colors was applied inside the cells, the liquid medium was thereafter removed in a single process from the color filter ink of each color in the cells, and the resin material was cured. In other words, a process was described in which the colored portion formation step (curing step) was carried out a single time, but the ink application step and the colored portion formation step may be repeated for each color.

It is also possible to substitute or to add as another configuration the parts constituting a color filter, image display device, and electronic device with any part that demonstrates the same function. For example, in the color filter of the present invention, a protective film for covering the colored portions may be provided to the surface opposite from the surface facing the substrate of the colored portions. Damage, degradation, and the like of the colored portions can thereby be more effectively prevented.

In the present invention, the color filter ink may be manufactured by any method, and is not limited to being manufactured using a method such as described above. For example, the manufacturing method was described in the embodiment as having a preparatory dispersion step and a multi-stage fine dispersion step, but the color filter ink in the present invention may be manufactured by a method that does not have a preparatory dispersion step, or a method that has a fine dispersion step that is not multi-stage. A thermoplastic resin was also described as being used in the preparatory dispersion step in the embodiment, but a curable resin material, e.g., the aforementioned polymer A, may also be used in the preparatory dispersion step. The curable resin mixing step can thereby be omitted, for example.

In the embodiments described above, a case in which the color filter ink set is provided with three types (three colors) of color filter inks corresponding to the three primary colors of light was mainly described, but the number and type (color) of color filter inks constituting the color filter ink set is not limited to the arrangement described above. For example, in the present invention, the color filter ink set may be provided with four or more types of color filter inks.

EXAMPLES

1. Synthesis of Polymer (Preparation of Polymer Solution)

Synthesis Example 1

As the medium (solvent), 37.6 parts by weight of 2-(2-methoxy-1-methylethoxy)-1-methyl ethyl acetate was placed in a 1-L reaction container provided with an agitator, a reflux condenser, a dropping funnel, a nitrogen introduction tube, and a temperature gauge, and heated to 90° C. Next, 2 parts by weight of 2,2'-azobis(isobutyronitrile) (AIBN) and 3 parts by weight 2-(2-methoxy-1-methylethoxy)-1-methyl ethyl acetate (solvent) were added, and a solution in which 27 parts by weight of (3,4-epoxy cyclohexyl) methyl methacrylate (product name: Cyclomer M100, manufactured by Daicel Chemical Industries), 1.5 parts by weight of 2-(0-[1'-methyl-propylideneamino]carboxyamino)methacrylate (product name: MOI-BM, manufactured by Showa Denko), and 1.5 parts by weight of 2-hydroxyethyl methacrylate (HEMA) were admixed was dropped over about 4 hours using a dropping pump. Also, a solution (polymerization initiator solution) in which 5 parts by weight of dimethyl 2,2'-azobis (isobutyrate) (product name V-601, manufactured by Wako Pure Chemical Industries) as the polymerization initiator were dissolved in 20 parts by weight of 2-(2-methoxy-1-methylethoxy)-1-methyl ethyl acetate (medium) was dropped over about 4 hours using a separate dropping pump. After the dropping of the polymerization initiator solution was completed, 0.2 part by weight of AIBN and 1 part by weight of 2-(2-methoxy-1-methylethoxy)-1-methyl ethyl acetate (medium) was added and held for about 2 hours at about the same temperature, after which 0.2 part by weight of AIBN and 1 part by weight of 2-(2-methoxy-1-methylethoxy)-1-methyl ethyl acetate (medium) was added and held for about 2 hours at about the same temperature, and then cooled to room temperature to obtain a polymer solution A1 containing a polymer A.

Synthesis Examples 2 to 15

The same operation as synthesis example 1 described above was carried out, except that the type of monomer components, usage amount, and type of medium (solvent) used in the synthesis of the polymer (preparation of the polymer solution) were varied in the manner shown in Table 1. As a result, fourteen polymer solutions (polymer solutions A2 to A15) containing the polymer A were obtained.

Synthesis Example 16

The same operation as synthesis example 1 described above was carried out, except that γ-methacryloxypropyl trimethoxysilane (product name: SZ6030, manufactured by Dow Corning Toray) was used in place of (3,4-epoxy cyclohexyl) methyl methacrylate (product name: Cyclomer M100, manufactured by Daicel Chemical Industries), 2-(0-[1'-methylpropylideneamino]carboxyamino)methacrylate (product name: MOI-BM, manufactured by Showa Denko), and 2-hydroxyethyl methacrylate (HEMA). As a result, a polymer solution (polymer solution B1) containing a polymer B was obtained.

Synthesis Examples 17 to 27

The same operation as synthesis example 16 described above was carried out, except that the type of monomer components, usage amount, and type of medium (solvent) used in the synthesis of the polymer (preparation of the polymer solution) were varied in the manner shown in Tables 1 and 2. As a result, eleven polymer solutions (polymer solutions B2 to B12) containing a polymer B were obtained.

Synthesis Example 28

The same operation as synthesis example 1 described above was carried out, except that 1H,1H,5H-octafluoropentyl methacrylate (product name: Biscoat 8FM, manufactured by Osaka Organic Chemical Industry) was used in place of 2-(0-[1'-methylpropylideneamino]carboxyamino)methacrylate (product name: MOI-BM, manufactured by Showa Denko) and 2-hydroxyethyl methacrylate (HEMA), and the usage amounts of the components were set as shown in Table 2. As a result, a polymer solution C1 (homopolymer solution) containing a polymer C was obtained.

Synthesis Examples 29 through 39

The same operation as synthesis example 28 described above was carried out, except that the type of monomer components, usage amount, and type of medium (solvent) used in the synthesis of the polymer (preparation of the polymer solution) were varied in the manner shown in Table 2. As a result, eleven polymer solutions (polymer solutions C2 through C12) containing a polymer C were obtained.

The type of material and usage amount (composition of the polymer synthesized in synthesis examples 1 to 39) used in the synthesis of the polymers (preparation of the polymer solutions) in the synthesis examples 1 to 39 are summarized in Tables 1 and 2. In the tables, "S" refers to the medium (solvent), and more particularly "S1" refers to 2-(2-methoxy-1-methylethoxy)-1-methyl ethyl acetate, "S2" refers to diethylene glycol monobutyl ether acetate, "S3" refers to diethylene glycol monoethyl ether acetate, "S4" refers to bis(2-butoxyethyl)ether, "S5" refers to 4-methyl-1,3-dioxolan-2-one, "S6" refers to dipropylene glycol dimethyl ether, and "S7" refers to 1,3-butylene glycol diacetate. Also, "V-601" refers to dimethyl 2,2'-azobis(isobutyrate), "AIBN" refers to 2,2'-azobis(isobutyronitrile), "a1-1" refers to (3,4-epoxy cyclohexyl) methyl methacrylate (Cyclomer M100), "a1-2" refers to (3,4-epoxycyclohexyl)methyl acrylate, "a2-1" refers to 2-(0-[1'-methylpropylideneamino]carboxyamino)ethyl methacrylate (MOI-BM), "a2-2" refers to 2-acryloyloxyethyl isocyanate (product name: "Karenz MOI", manufactured by Showa Denko), "a3-1" refers to 2-hydroxyethyl methacrylate (HEMA), "a3-2" refers to 4-hydroxybutyl acrylate, "a4-1" refers to 2-ethyl hexyl methacrylate, "a4-2" refers to 2-methyl hexyl acrylate, "b1-1" refers to γ-methacryloxy propyl trimethoxy silane (SZ6030), "b1-2" refers to γ-methacryloxy propyl triethoxy silane, "b2-1" refers to ethyl methacrylate, "c1-1" refers to 1H,1H,5H-octafluoropentyl methacrylate (Biscoat 8FM), "c1-2" refers to 1,2,3,4,5-pentafluorostyrene, "c2-1" refers to (3,4-epoxycyclohexyl)methyl methacrylate (Cyclomer M100), and "c2-2" refers to cyclohexyl methacrylate. Also shown in the table are the weight-average molecular weights Mw of the polymers that constitute the polymer solutions.

TABLE 1

| | COMPONENTS (PARTS BY WEIGHT) MONOMER COMPONENT | | | | | | | | | | | |
|---|---|---|---|---|---|---|---|---|---|---|---|---|
| | a1-1 | a1-2 | a2-1 | a2-2 | a3-1 | a3-2 | a4-1 | a4-2 | b1-1 | b1-2 | b2-1 | c1-1 |
| POLYMER SOLUTION A1 | 27 | — | 1.5 | — | 1.5 | — | — | — | — | — | — | — |
| POLYMER SOLUTION A2 | 27 | — | 3 | — | — | — | — | — | — | — | — | — |
| POLYMER SOLUTION A3 | 27 | — | — | — | 3 | — | — | — | — | — | — | — |
| POLYMER SOLUTION A4 | 24 | — | — | — | — | — | 6 | — | — | — | — | — |

TABLE 1-continued

| | | | | | | | | | | | | |
|---|---|---|---|---|---|---|---|---|---|---|---|---|
| POLYMER SOLUTION A5 | 19 | — | 5 | — | 4.5 | — | 1.5 | — | — | — | — | — |
| POLYMER SOLUTION A6 | 20.5 | — | 3 | — | 5.5 | — | 1 | — | — | — | — | — |
| POLYMER SOLUTION A7 | 25 | — | 1 | — | 2 | — | 2 | — | — | — | — | — |
| POLYMER SOLUTION A8 | — | 27.5 | — | 1.5 | — | 1 | — | — | — | — | — | — |
| POLYMER SOLUTION A9 | 26 | — | — | 1 | — | 1.5 | — | 1.5 | — | — | — | — |
| POLYMER SOLUTION A10 | 26.5 | — | 2 | — | 1.5 | — | — | — | — | — | — | — |
| POLYMER SOLUTION A11 | 27 | — | 1.5 | — | 1.5 | — | — | — | — | — | — | — |
| POLYMER SOLUTION A12 | 27 | — | 1.5 | — | 1.5 | — | — | — | — | — | — | — |
| POLYMER SOLUTION A13 | 27 | — | 1.5 | — | 1.5 | — | — | — | — | — | — | — |
| POLYMER SOLUTION A14 | 27 | — | 1.5 | — | 1.5 | — | — | — | — | — | — | — |
| POLYMER SOLUTION A15 | 27 | — | 1.5 | — | 1.5 | — | — | — | — | — | — | — |
| POLYMER SOLUTION B1 | — | — | — | — | — | — | — | — | 30 | — | — | — |
| POLYMER SOLUTION B2 | — | — | — | — | — | — | — | — | 26 | — | 4 | — |
| POLYMER SOLUTION B3 | — | — | — | — | — | — | — | — | 23 | — | 7 | — |
| POLYMER SOLUTION B4 | — | — | — | — | — | — | — | — | 24 | — | 6 | — |

| | COMPONENTS (PARTS BY WEIGHT) | | | | | | | POLYMER |
|---|---|---|---|---|---|---|---|---|
| | MONOMER COMPONENT | | | | | | SOLVENT (S) | |
| | c1-2 | c2-1 | c2-2 | S | V-601 | AIBN | COMPOSITION | Mw |
| POLYMER SOLUTION A1 | — | — | — | 62.6 | 5 | 2.4 | S1 | 2700 |
| POLYMER SOLUTION A2 | — | — | — | 62.6 | 5 | 2.4 | S2 | 2800 |
| POLYMER SOLUTION A3 | — | — | — | 62.6 | 5 | 2.4 | S6 | 2800 |
| POLYMER SOLUTION A4 | — | — | — | 62.6 | 5 | 2.4 | S3 | 2800 |
| POLYMER SOLUTION A5 | — | — | — | 62.6 | 5 | 2.4 | S7 | 2700 |
| POLYMER SOLUTION A6 | — | — | — | 62.6 | 5 | 2.4 | S5 | 2700 |
| POLYMER SOLUTION A7 | — | — | — | 62.6 | 5 | 2.4 | S1 | 2800 |
| POLYMER SOLUTION A8 | — | — | — | 62.6 | 5 | 2.4 | S1 | 2800 |
| POLYMER SOLUTION A9 | — | — | — | 62.6 | 5 | 2.4 | S1 | 2800 |
| POLYMER SOLUTION A10 | — | — | — | 62.6 | 5 | 2.4 | S1 | 2800 |
| POLYMER SOLUTION A11 | — | — | — | 62.6 | 5 | 2.4 | S2 | 2700 |
| POLYMER SOLUTION A12 | — | — | — | 62.6 | 5 | 2.4 | S3 | 2700 |
| POLYMER SOLUTION A13 | — | — | — | 62.6 | 5 | 2.4 | S7 | 2700 |
| POLYMER SOLUTION A14 | — | — | — | 62.6 | 5 | 2.4 | S4 | 2700 |
| POLYMER SOLUTION A15 | — | — | — | 62.6 | 5 | 2.4 | S5 | 2700 |
| POLYMER SOLUTION B1 | — | — | — | 62.6 | 5 | 2.4 | S1 | 2800 |
| POLYMER SOLUTION B2 | — | — | — | 62.6 | 5 | 2.4 | S7 | 2700 |
| POLYMER SOLUTION B3 | — | — | — | 62.6 | 5 | 2.4 | S4 | 2700 |
| POLYMER SOLUTION B4 | — | — | — | 62.6 | 5 | 2.4 | S5 | 2800 |

TABLE 2

| | COMPONENTS (PARTS BY WEIGHT) MONOMER COMPONENT | | | | | | | | | | | |
|---|---|---|---|---|---|---|---|---|---|---|---|---|
| | a1-1 | a1-2 | a2-1 | a2-2 | a3-1 | a3-2 | a4-1 | a4-2 | b1-1 | b1-2 | b2-1 | c1-1 |
| POLYMER SOLUTION B5 | — | — | — | — | — | — | — | — | — | 28 | 2 | — |
| POLYMER SOLUTION B6 | — | — | — | — | — | — | — | — | 30 | — | — | — |
| POLYMER SOLUTION B7 | — | — | — | — | — | — | — | — | 30 | — | — | — |
| POLYMER SOLUTION B8 | — | — | — | — | — | — | — | — | 30 | — | — | — |
| POLYMER SOLUTION B9 | — | — | — | — | — | — | — | — | 30 | — | — | — |
| POLYMER SOLUTION B10 | — | — | — | — | — | — | — | — | — | 28 | 2 | — |
| POLYMER SOLUTION B11 | — | — | — | — | — | — | — | — | — | 28 | 2 | — |
| POLYMER SOLUTION B12 | — | — | — | — | — | — | — | — | — | 26 | 2 | — |
| POLYMER SOLUTION C1 | — | — | — | — | — | — | — | — | — | — | — | 6 |
| POLYMER SOLUTION C2 | — | — | — | — | — | — | — | — | — | — | — | 2 |
| POLYMER SOLUTION C3 | — | — | — | — | — | — | — | — | — | — | — | 19 |
| POLYMER SOLUTION C4 | — | — | — | — | — | — | — | — | — | — | — | 30 |
| POLYMER SOLUTION C5 | — | — | — | — | — | — | — | — | — | — | — | 4 |
| POLYMER SOLUTION C6 | — | — | — | — | — | — | — | — | — | — | — | 6 |
| POLYMER SOLUTION C7 | — | — | — | — | — | — | — | — | — | — | — | — |
| POLYMER SOLUTION C8 | — | — | — | — | — | — | — | — | — | — | — | 6 |
| POLYMER SOLUTION C9 | — | — | — | — | — | — | — | — | — | — | — | 6 |
| POLYMER SOLUTION C10 | — | — | — | — | — | — | — | — | — | — | — | 6 |
| POLYMER SOLUTION C11 | — | — | — | — | — | — | — | — | — | — | — | 2 |
| POLYMER SOLUTION C12 | — | — | — | — | — | — | — | — | — | — | — | 2 |

| | COMPONENTS (PARTS BY WEIGHT) | | | | | | SOLVENT (S) | POLYMER |
|---|---|---|---|---|---|---|---|---|
| | MONOMER COMPONENT | | | | | | | |
| | c1-2 | c2-1 | c2-2 | S | V-601 | AIBN | COMPOSITION | Mw |
| POLYMER SOLUTION B5 | — | — | — | 62.6 | 5 | 2.4 | S1 | 2800 |
| POLYMER SOLUTION B6 | — | — | — | 62.6 | 5 | 2.4 | S2 | 2800 |
| POLYMER SOLUTION B7 | — | — | — | 62.6 | 5 | 2.4 | S3 | 2800 |
| POLYMER SOLUTION B8 | — | — | — | 62.6 | 5 | 2.4 | S7 | 2800 |
| POLYMER SOLUTION B9 | — | — | — | 62.6 | 5 | 2.4 | S5 | 2800 |
| POLYMER SOLUTION B10 | — | — | — | 62.6 | 5 | 2.4 | S2 | 2800 |
| POLYMER SOLUTION B11 | — | — | — | 62.6 | 5 | 2.4 | S6 | 2800 |
| POLYMER SOLUTION B12 | — | — | — | 62.6 | 5 | 2.4 | S3 | 2800 |
| POLYMER SOLUTION C1 | — | 24 | — | 62.6 | 5 | 2.4 | S1 | 2800 |
| POLYMER SOLUTION C2 | — | 28 | — | 62.6 | 5 | 2.4 | S7 | 2800 |
| POLYMER SOLUTION C3 | — | 11 | — | 62.6 | 5 | 2.4 | S2 | 2800 |
| POLYMER SOLUTION C4 | — | — | — | 62.6 | 5 | 2.4 | S4 | 2800 |
| POLYMER SOLUTION C5 | — | — | 26 | 62.6 | 5 | 2.4 | S1 | 2800 |

TABLE 2-continued

| | | | | | | | | |
|---|---|---|---|---|---|---|---|---|
| POLYMER SOLUTION C6 | — | 24 | — | 62.6 | 5 | 2.4 | S2 | 2800 |
| POLYMER SOLUTION C7 | 6 | 24 | — | 62.6 | 5 | 2.4 | S3 | 2800 |
| POLYMER SOLUTION C8 | — | 24 | — | 62.6 | 5 | 2.4 | S3 | 2800 |
| POLYMER SOLUTION C9 | — | 24 | — | 62.6 | 5 | 2.4 | S5 | 2800 |
| POLYMER SOLUTION C10 | — | 24 | — | 62.6 | 5 | 2.4 | S7 | 2800 |
| POLYMER SOLUTION C11 | — | 28 | — | 62.6 | 5 | 2.4 | S4 | 2800 |
| POLYMER SOLUTION C12 | — | 28 | — | 62.6 | 5 | 2.4 | S5 | 2800 |

2. Preparation of Color Filter Ink (Color Filter Ink Set)

Example 1

Added to an agitator (single-shaft mixer) having a capacity of 400 cc were 4.32 g (12 parts by weight) of Disperbyk 111 as an acid-value dispersing agent, 12.95 g (36 parts by weight) of Disperbyk 166 as an amine-value dispersing agent, 28.41 g (79 parts by weight) of SPCN-17X (manufactured by Showa Highpolymer) as a thermoplastic resin, and 61.90 g (172 parts by weight) of 2-(2-methoxy-1-methylethoxy)-1-methyl ethyl acetate as a liquid medium, and a dispersing-agent-dispersed liquid was obtained by stirring the mixture for 10 minutes in a Dispermill and performing preparatory dispersion (preparatory dispersion step). The speed of the stirring vanes of the agitator at this time was set to 2000 rpm.

Pigments were then added as described below to the dispersing-agent-dispersed liquid obtained by the preparatory dispersion step, inorganic beads were added in multiple stages, and the fine dispersion step of performing the fine dispersion process was performed.

First, 35.99 g (100 parts by weight) of pigments were added to the obtained dispersing-agent-dispersed liquid, and the mixture was stirred for 10 minutes. At this time, the speed of the stirring vanes of the agitator was set to 2000 rpm. The mixture used included 32.39 g of C. I. Pigment Green 58 and 3.60 g of a compound indicated by Formula (9) below as the pigments. At this time, the mixture of the pigments and the dispersing-agent-dispersed liquid was diluted by 2-(2-methoxy-1-methylethoxy)-1-methyl ethyl acetate as a liquid medium to give a pigment content ratio of 16 wt %.

Formula (9)

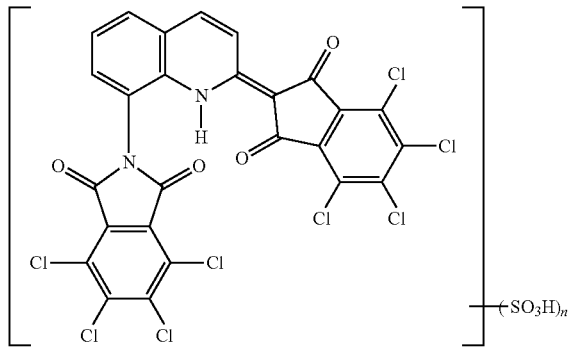

(9)

In Formula (9), n is an integer from 1 to 5.

Inorganic beads (first inorganic beads: zirconia beads; "Toray Ceram milling balls" (trade name); manufactured by Toray) having an average grain size of 0.8 mm were then added, the mixture was stirred for 30 minutes at room temperature, and the first stage of dispersion processing (first treatment) was performed. At this time, the speed of the stirring vanes of the agitator was set to 2000 rpm.

The inorganic beads (first inorganic beads) were then removed by filtration using a filter ("PALL HDCII Membrane Filter"; manufactured by PALL), after which inorganic beads (second inorganic beads: zirconia beads; "Toray Ceram milling balls" (trade name); manufactured by Toray) having an average grain size of 0.1 mm were added, the mixture was further stirred for 30 minutes, and the second stage of dispersion processing (second treatment) was performed. At this time, the speed of the stirring vanes of the agitator was set to 2000 rpm. The mixture was also diluted at this time by 2-(2-methoxy-1-methylethoxy)-1-methyl ethyl acetate as a solvent to give a pigment content ratio of 14 wt % in the obtained pigment dispersion.

The inorganic beads (second inorganic beads) were then removed by filtration using a filter ("PALL HDCII Membrane Filter"; manufactured by PALL), and a pigment dispersion was obtained.

The pigment dispersion obtained as described above, a polymer solution A1, a polymer solution B1, and a polymer solution C1 were then mixed. The present step was performed by placing the abovementioned pigment dispersion, polymer solution A1, polymer solution B1, and polymer solution C1 in a 400 cc agitator (single-shaft mixer) and stirring the mixture for 10 minutes in a Dispermill. At this time, the speed of the stirring vanes of the agitator was set to 2000 rpm. The desired green color filter ink (G ink) was thereby obtained.

A red color filter ink (R ink) and a blue color filter ink (B ink) were prepared in the same manner as the green color filter ink described above, except that the type and usage amount of pigment (colorant), liquid medium, and polymer solution, and the stirring conditions were varied. A color filter ink set composed of the three colors R, G, B of ink (color filter ink) was thereby obtained. The average grain size of the pigment constituting the R ink, the average grain size of the pigment constituting the G ink, and the average grain size of the pigment constituting the B ink were 70 nm, 70 nm, and 70 nm, respectively.

Examples 2 through 14

Color filter inks (ink set) were prepared, and a color filter ink set was obtained in the same manner as Example 1, except that the types and usage amounts of materials used to prepare the color filter inks, and the processing conditions of the fine dispersion step (first treatment, second treatment) and the curable resin mixing step were varied as shown in the tables.

Comparative Examples 1 through 6

Color filter inks (ink set) were prepared, and a color filter ink set was obtained in the same manner as Example 1 except that the types and usage amounts of materials used to prepare the color filter inks were varied as shown in the tables.

In the abovementioned examples and comparative examples, the liquid mediums (dilution media) added in each step have the same composition as the media (solvents) constituting the corresponding polymer solutions (polymer solution used in the preparation of the color filter ink).

Tables 3, 4, and 5 show the composition of the dispersing-agent-dispersed liquid, the type and usage amount of the colorants (pigments) added to the dispersing-agent-dispersed liquid in the fine dispersion step, and the type and solid-based usage amount of the curable resin material used in the curable resin mixing step in the abovementioned examples and comparative examples. In the tables, C. I. Pigment Red 177 is referred to as "PR177," C. I. Pigment Red 254 is referred to as "PR254," C. I. Pigment Green 36 is referred to as "PG36," C. I. Pigment Green 58 is referred to as "PG58," C. I. Pigment Blue 15:6 is referred to as "PB 15:6," C. I. Pigment Yellow 150 is referred to as "PY150," C. I. Pigment Red 23 is referred to as "PV23," the mixture of C. I. Pigment Red 177 and the pigment derivative indicated by Formula (2) is referred to as "PR177D," the mixture of C. I. Pigment Red 254 and the pigment derivative indicated by Formula (3) is indicated by "PR254D," the powder composed of the compound (in which there is one sulfo group in the molecule) indicated by Formula (9) is referred to as "X1," the powder composed of the compound (in which there are two sulfo groups in the molecule) indicated by Formula (10) below is referred to as "X2," 2-(2-methoxy-1-methylethoxy)-1-methyl ethyl acetate is referred to as "S1," diethylene glycol monobutyl ether acetate is referred to as "S2," diethylene glycol monoethyl ether acetate is referred to as "S3," bis(2-butoxyethyl)ether is referred to as "S4," 4-methyl-1,3-dioxolan-2-one is referred to as "S5," dipropylene glycol dimethyl ether is referred to as "S6," 1,3-butylene glycol diacetate is referred to as "S7," Disperbyk 111 is referred to as "DA2," Disperbyk 2095 is referred to as "DA3," Disperbyk P104 is referred to as "DA4," "Disperbyk 166 is referred to as "DA6," Disperbyk 9075 is referred to as "DA7," Disperbyk 2001 is referred to as "DA8," and SPCN-17X is referred to as "DR1." The content ratios of the pigment derivative indicated by the Formula (2) in the mixtures of C. I. Pigment Red 177 and the pigment derivative indicated by Formula (2) used in the examples and comparative examples were all 0.1 to 10 wt %. The content ratios of the pigment derivative indicated by the Formula (3) in the mixtures of C. I. Pigment Red 254 and the pigment derivative indicated by Formula (3) used in the examples and comparative examples were all 0.1 to 10 wt %. The acid value of Disperbyk 111 (DA2) was 50 KOHmg/g, the acid value of Disperbyk 2095 (DA3) was 13 KOHmg/g, the acid value of Disperbyk P104 (DA4) was 360 KOHmg/g, the amine value of Disperbyk 166 (DA6) was 115 KOHmg/g, and the amine value of Disperbyk 9075 (DA7) was 12 KOHmg/g. The acid values were calculated by a method in accordance with DIN EN ISO 2114, and the amine values were calculated by a method in accordance with DIN 16945. Tables 3 through 5 also show the viscosity and other characteristics of the color filter inks. In the tables, $\eta_{max}$ (mPa·s) indicates the viscosity at 25° C. of the ink having the highest viscosity at 25° C. of the plurality of inks constituting the color filter ink set, $\eta_{min}$ (mPa·s) indicates the viscosity at 25° C. of the ink having the lowest viscosity at 25° C. of the plurality of inks constituting the color filter ink set, $C_{G58}$ (wt %) indicates the content ratio of C. I. Pigment Green 58 in the color filter ink, $C_M$ (wt %) indicates the content ratio of the colorant in the ink having the smallest content ratio of colorant among the inks constituting the color filter ink set, $C_C$ (wt %) indicates the content ratio of the substance indicated by General Formula (1) in the green ink, $\eta_{MM}$ (mPa·s) indicates the viscosity of the liquid medium having the highest viscosity among the inks other than the green ink constituting the color filter ink set, and $\eta_{GM}$ (mPa·s) indicates the viscosity of the liquid medium constituting the green ink. In the curable resin material column in Tables 3 through 5, the polymer included in the polymer solution A1 is indicated as A1. In the same manner, the polymers included in the polymer solutions A2 to A15, B1 to B12, and C1 to C12 are referred to as A2 to A15, B1 to B12, and C1 to C12, respectively. Tables 6, 7, and 8 show the conditions used to manufacture the color filter inks of the examples and comparative examples. Tables 6, 7, and 8 also show the content ratios of the colorants (pigments) at the end of the first treatment, the end of the second treatment, and the end of the curable resin mixing step (final color filter ink). The viscosity was measured in a 25° C. environment using an E-type viscometer (RE-01, manufactured by Toki Sangyo) in accordance with JIS Z8809.

Formula (10)

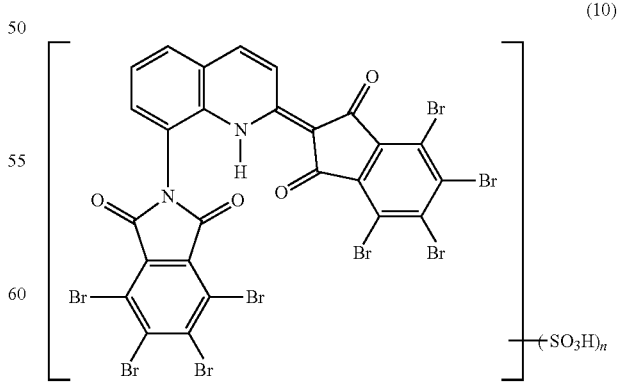

In Formula (10), n is an integer from 1 to 5.

TABLE 3

| | | \multicolumn{10}{c}{DISPERSING-AGENT-DISPERSED LIQUID} |
|---|---|---|---|---|---|---|---|---|---|---|---|

| | | \multicolumn{6}{c}{DISPERSING AGENT} | | | | |
|---|---|---|---|---|---|---|---|---|---|---|---|

| | | ACID-VALUE DISPERSING AGENT | | AMINE-VALUE DISPERSING AGENT | | OTHER DISPERSING AGENT | | THERMOPLASTIC RESIN | | SOLVENT (LIQUID MEDIUM) | |
|---|---|---|---|---|---|---|---|---|---|---|---|
| | | TYPE | AMOUNT (PARTS BY wt) | TYPE | AMOUNT (PARTS BY wt) | TYPE | AMOUNT (PARTS BY wt) | TYPE | AMOUNT (PARTS BY wt) | TYPE | AMOUNT (PARTS BY wt) |
| EXAMPLE 1 | R INK | DA2 | 14 | DA6 | 78 | — | — | DR1 | 54 | S2 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S3 | 312 |
| EXAMPLE 2 | R INK | DA2 | 22 | DA6 | 50 | — | — | DR1 | 40 | S2 | 287 |
| | G INK | DA2 | 28 | DA6 | 62 | — | — | DR1 | 30 | S1 | 179 |
| | B INK | DA2 | 17 | DA6 | 39 | — | — | DR1 | 88 | S3 | 312 |
| EXAMPLE 3 | R INK | DA2 | 20 | DA6 | 52 | — | — | DR1 | 40 | S7 | 287 |
| | G INK | DA2 | 28 | DA6 | 62 | — | — | DR1 | 30 | S1 | 179 |
| | B INK | DA2 | 19 | DA6 | 41 | — | — | DR1 | 88 | S3 | 312 |
| EXAMPLE 4 | R INK | DA2 | 18 | DA6 | 46 | — | — | DR1 | 40 | S2 | 287 |
| | G INK | DA2 | 24 | DA6 | 58 | — | — | DR1 | 30 | S1 | 179 |
| | B INK | DA2 | 16 | DA6 | 37 | — | — | DR1 | 88 | S3 | 312 |
| EXAMPLE 5 | R INK | DA2 | 22 | DA6 | 50 | — | — | DR1 | 38 | S2 | 289 |
| | G INK | DA2 | 28 | DA6 | 62 | — | — | DR1 | 31 | S1 | 181 |
| | B INK | DA2 | 17 | DA6 | 39 | — | — | DR1 | 86 | S3 | 314 |
| EXAMPLE 6 | R INK | DA2 | 22 | DA6 | 50 | — | — | DR1 | 42 | S7 | 285 |
| | G INK | DA2 | 28 | DA6 | 62 | — | — | DR1 | 32 | S1 | 177 |
| | B INK | DA2 | 17 | DA6 | 39 | — | — | DR1 | 90 | S3 | 310 |
| EXAMPLE 7 | R INK | DA2 | 22 | DA6 | 50 | — | — | DR1 | 41 | S2 | 286 |
| | G INK | DA2 | 28 | DA6 | 62 | — | — | DR1 | 32 | S1 | 178 |
| | B INK | DA2 | 17 | DA6 | 39 | — | — | DR1 | 89 | S3 | 311 |

| | | COMPONENT ADDED IN FINE DISPERSION STEP PIGMENT | | COMPONENT ADDED IN CURABLE RESIN MIXING STEP CURABLE RESIN MATERIAL | | | | | | |
|---|---|---|---|---|---|---|---|---|---|---|
| | | TYPE | AMOUNT (PARTS BY wt) | TYPE | AMOUNT (PARTS BY wt) | INK VISCOSITY (mPa·s) | ηmax−ηmin (mPa·s) | $C_M/C_{G58}$ | ηMM−ηGM (mPa·s) | $C_C/C_{G58}$ |
| EXAMPLE 1 | R INK | PR177D/PR254D | 50/50 | A11/B6/C6 | 12/12/6 | 7.6 | 0.5 | 0.54 | 1.4 | 0.11 |
| | G INK | PG58/X1 | 90/10 | A1/B1/C1 | 9/9/3 | 7.9 | | | | |
| | B INK | PB15:6 | 100 | A12/B7/C8 | 17/17/8 | 7.4 | | | | |
| EXAMPLE 2 | R INK | PR177D/PR254D | 60/40 | A11/B6/C6 | 17/17/4 | 7.2 | 0.8 | 0.58 | 1.4 | 0.17 |
| | G INK | PG58/X1 | 85/15 | A1/B1/C1 | 17/17/4 | 8.0 | | | | |
| | B INK | PB15:6 | 100 | A12/B7/C8 | 17/17/4 | 7.3 | | | | |
| EXAMPLE 3 | R INK | PR177D | 100 | A13/B8/C10 | 18/18/2 | 7.2 | 0.8 | 0.50 | 1.2 | 0.05 |
| | G INK | PG58/X1 | 95/5 | A7/B1/C5 | 18/18/2 | 8.0 | | | | |
| | B INK | PB15:6 | 100 | A12/B7/C8 | 18/18/2 | 7.4 | | | | |
| EXAMPLE 4 | R INK | PR177D/PR254D | 40/60 | A11/B6/C6 | 18/15/5 | 7.1 | 0.8 | 0.54 | 1.4 | 0.13 |
| | G INK | PG58/X1 | 88/12 | A1/B1/C1 | 18/15/5 | 7.9 | | | | |
| | B INK | PB15:6 | 100 | A12/B7/C8 | 18/15/5 | 7.3 | | | | |
| EXAMPLE 5 | R INK | PR254D | 100 | A11/B6/C6 | 15/18/5 | 7.2 | 0.8 | 0.52 | 1.4 | 0.08 |
| | G INK | PG58/X1 | 92/8 | A9/B1/C1 | 15/18/5 | 8.0 | | | | |
| | B INK | PB15:6 | 100 | A12/B7/C8 | 15/18/5 | 7.3 | | | | |
| EXAMPLE 6 | R INK | PR177D/PR254D | 30/70 | A13/B8/C10 | 17/14/8 | 7.3 | 0.8 | 0.51 | 1.2 | 0.08 |
| | G INK | PG58/X1 | 93/7 | A7/B1/C5 | 17/14/8 | 8.1 | | | | |
| | B INK | PB15:6 | 100 | A12/B7/C8 | 17/14/8 | 7.4 | | | | |
| EXAMPLE 7 | R INK | PR177D/PR254D | 55/45 | A11/B6/C6 | 14/17/8 | 7.3 | 0.8 | 0.52 | 1.4 | 0.10 |
| | G INK | PG58/X1 | 91/9 | A10/B1/C1 | 14/17/8 | 8.1 | | | | |
| | B INK | PB15:6 | 100 | A12/B7/C8 | 14/17/8 | 7.4 | | | | |

TABLE 4

| | | DISPERSING-AGENT-DISPERSED LIQUID ||||||||||
| | | DISPERSING AGENT |||||| THERMOPLASTIC RESIN || SOLVENT (LIQUID MEDIUM) ||
| | | ACID-VALUE DISPERSING AGENT || AMINE-VALUE DISPERSING AGENT || OTHER DISPERSING AGENT || | | | |
| | | TYPE | AMOUNT (PARTS BY wt) | TYPE | AMOUNT (PARTS BY wt) | TYPE | AMOUNT (PARTS BY wt) | TYPE | AMOUNT (PARTS BY wt) | TYPE | AMOUNT (PARTS BY wt) |
|---|---|---|---|---|---|---|---|---|---|---|---|
| EXAMPLE 8 | R INK | DA2 | 15 | DA6 | 77 | — | — | DR1 | 57 | S7 | 250 |
| | G INK | DA2 | 13 | DA6 | 35 | — | — | DR1 | 81 | S1 | 170 |
| | B INK | DA2 | 15 | DA6 | 41 | — | — | DR1 | 90 | S4 | 310 |
| EXAMPLE 9 | R INK | — | — | — | — | DA8 | 72 | DR1 | 40 | S7 | 287 |
| | G INK | — | — | — | — | DA8 | 90 | DR1 | 30 | S1 + S4 | 179 |
| | B INK | — | — | — | — | DA8 | 60 | DR1 | 88 | S5 | 312 |
| EXAMPLE 10 | R INK | DA3 | 25 | DA7 | 74 | — | — | DR1 | 28 | S2 | 272 |
| | G INK | DA3 | 13 | DA7 | 37 | — | — | DR1 | 21 | S1 + S5 | 228 |
| | B INK | DA3 | 32 | DA7 | 95 | — | — | DR1 | 32 | S3 | 297 |
| EXAMPLE 11 | R INK | DA2 | 10 | DA6 | 30 | — | — | DR1 | 82 | S7 | 277 |
| | G INK | DA2 | 7 | DA6 | 20 | — | — | DR1 | 41 | S1 + S4 | 231 |
| | B INK | DA2 | 13 | DA6 | 37 | — | — | DR1 | 92 | S5 | 314 |
| EXAMPLE 12 | R INK | DA4 | 20 | DA6 | 40 | — | — | DR1 | 112 | S2 | 227 |
| | G INK | DA4 | 14 | DA6 | 28 | — | — | DR1 | 84 | S4 + S6 | 173 |
| | B INK | DA4 | 21 | DA6 | 42 | — | — | DR1 | 123 | S3 | 270 |
| EXAMPLE 13 | R INK | DA2 | 23 | DA6 | 69 | — | — | DR1 | 54 | S2 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S3 | 312 |
| EXAMPLE 14 | R INK | DA2 | 69 | DA6 | 23 | — | — | DR1 | 54 | S2 | 253 |
| | G INK | DA2 | 36 | DA6 | 12 | — | — | DR1 | 79 | S1 | 172 |
| | B INK | DA2 | 42 | DA6 | 14 | — | — | DR1 | 88 | S3 | 312 |

| | | COMPONENT ADDED IN FINE DISPERSION STEP PIGMENT || COMPONENT ADDED IN CURABLE RESIN MIXING STEP CURABLE RESIN MATERIAL || INK ||||
| | | TYPE | AMOUNT (PARTS BY wt) | TYPE | AMOUNT (PARTS BY wt) | VIS-COSITY (mPa·s) | ηmax-ηmin (mPa·s) | $C_M/C_{G58}$ | ηMM-ηGM (mPa·s) | $C_c/C_{G58}$ |
|---|---|---|---|---|---|---|---|---|---|---|
| EXAMPLE 8 | R INK | PR177D/PR254D | 50/50 | A13 | 35 | 7.7 | 0.6 | 0.52 | 1.2 | 0.11 |
| | G INK | PG58/X2 | 90/10 | A1 | 24 | 8.0 | | | | |
| | B INK | PB15:6 | 100 | A14 | 45 | 7.4 | | | | |
| EXAMPLE 9 | R INK | PR177D/PR254D | 60/40 | A5/B2/C2 | 18/18/2 | 7.2 | 0.8 | 0.51 | 0.7 | 0.05 |
| | G INK | PG58/X2 | 95/5 | A9/B3/C11 | 18/18/2 | 8.0 | | | | |
| | B INK | PB15:6 | 100 | A6/B4/C12 | 18/18/2 | 7.4 | | | | |
| EXAMPLE 10 | R INK | PR177D | 100 | A11/B6/C6 | 25/8/2 | 7.4 | 0.1 | 0.63 | 1.0 | 0.30 |
| | G INK | PG58/X1 | 77/23 | A15/B1/C9 | 25/7/2 | 7.4 | | | | |
| | B INK | PB15:6 | 100 | A12/B7/C8 | 24/7/2 | 7.5 | | | | |
| EXAMPLE 11 | R INK | PR177 | 100 | A13/B8 | 9/9 | 7.1 | 0.0 | 0.49 | 0.7 | 0.01 |
| | G INK | PG58/X1 | 99/1 | A14/B1 | 8/8 | 7.1 | | | | |
| | B INK | PB15:6 | 100 | A15/B9 | 9/9 | 7.1 | | | | |
| EXAMPLE 12 | R INK | PR254 | 100 | A2/B10/C3 | 9/27/3 | 8.0 | 0.3 | 0.65 | 1.3 | 0.33 |
| | G INK | PG58/X2 | 75/25 | A3/B11/C4 | 8/25/2 | 8.1 | | | | |
| | B INK | PB15:6 | 100 | A4/B12/C7 | 7/23/2 | 7.8 | | | | |
| EXAMPLE 13 | R INK | PR254 | 100 | A11/B6/C6 | 12/13/15 | 7.7 | 0.5 | 0.50 | 1.4 | 0.04 |
| | G INK | PG58/X2 | 96/4 | A8/B1/C1 | 4/5/5 | 7.8 | | | | |
| | B INK | PB15:6 | 100 | A4/B7/C8 | 11/11/14 | 7.3 | | | | |
| EXAMPLE 14 | R INK | PR177/PR254 | 70/30 | A2/B10/C6 | 24/24/12 | 7.9 | 0.7 | 0.63 | 1.4 | 0.30 |
| | G INK | PG58/X2 | 77/23 | A1/B5/C1 | 18/18/7 | 8.1 | | | | |
| | B INK | PB15:6 | 100 | A4/B12/C8 | 17/17/10 | 7.4 | | | | |

TABLE 5

| | | DISPERSING-AGENT-DISPERSED LIQUID | | | | | | | | | |
|---|---|---|---|---|---|---|---|---|---|---|---|
| | | DISPERSING AGENT | | | | | | | | SOLVENT (LIQUID MEDIUM) | |
| | | ACID-VALUE DISPERSING AGENT | | AMINE-VALUE DISPERSING AGENT | | OTHER DISPERSING AGENT | | THERMOPLASTIC RESIN | | | |
| | | TYPE | AMOUNT (PARTS BY wt) | TYPE | AMOUNT (PARTS BY wt) | TYPE | AMOUNT (PARTS BY wt) | TYPE | AMOUNT (PARTS BY wt) | TYPE | AMOUNT (PARTS BY wt) |
| COMPARATIVE EXAMPLE 1 | R INK | DA2 | 14 | DA6 | 78 | — | — | DR1 | 54 | S1 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S1 | 312 |
| COMPARATIVE EXAMPLE 2 | R INK | DA2 | 14 | DA6 | 78 | — | — | DR1 | 54 | S2 | 253 |
| | G INK | DA2 | 12 | DA6 | 36 | — | — | DR1 | 79 | S2 | 172 |
| | B INK | DA2 | 14 | DA6 | 42 | — | — | DR1 | 88 | S2 | 312 |
| COMPARATIVE EXAMPLE 3 | R INK | DA2 | 14 | DA6 | 78 | — | — | DR1 | 54 | S3 | 253 |
| | G INK | DA2 | 12 | DA6 | 36 | — | — | DR1 | 79 | S3 | 172 |
| | B INK | DA2 | 14 | DA6 | 42 | — | — | DR1 | 88 | S3 | 312 |
| COMPARATIVE EXAMPLE 4 | R INK | DA2 | 14 | DA6 | 78 | — | — | DR1 | 54 | S2 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S3 | 312 |
| COMPARATIVE EXAMPLE 5 | R INK | DA2 | 14 | DA6 | 78 | — | — | DR1 | 54 | S2 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S3 | 312 |
| COMPARATIVE EXAMPLE 6 | R INK | DA2 | 14 | DA6 | 78 | — | — | DR1 | 54 | S2 | 253 |
| | G INK | DA2 | 12 | DA6 | 36 | — | — | DR1 | 79 | S1 | 172 |
| | B INK | DA2 | 14 | DA6 | 42 | — | — | DR1 | 88 | S3 | 312 |

| | | COMPONENT ADDED IN FINE DISPERSION STEP PIGMENT | | COMPONENT ADDED IN CURABLE RESIN MIXING STEP CURABLE RESIN MATERIAL | | INK VISCOSITY (mPa·s) | $\eta max - \eta min$ (mPa·s) | $C_M/C_{G58}$ | $\eta MM - \eta GM$ (mPa·s) | $C_c/C_{G58}$ |
|---|---|---|---|---|---|---|---|---|---|---|
| | | TYPE | AMOUNT (PARTS BY wt) | TYPE | AMOUNT (PARTS BY wt) | | | | | |
| COMPARATIVE EXAMPLE 1 | R INK | PR177D/PR254D | 50/50 | A1/B1/C1 | 12/12/6 | 6.3 | 1.6 | 0.54 | 0 | 0.11 |
| | G INK | PG58/X1 | 90/10 | A1/B1/C1 | 9/9/3 | 7.9 | | | | |
| | B INK | PB15:6 | 100 | A1/B1/C1 | 17/17/8 | 6.7 | | | | |
| COMPARATIVE EXAMPLE 2 | R INK | PR177D/PR254D | 50/50 | A11/B6/C6 | 12/12/6 | 7.6 | 1.6 | 0.54 | 0 | 0.11 |
| | G INK | PG58/X1 | 90/10 | A11/B6/C6 | 9/9/3 | 9.2 | | | | |
| | B INK | PB15:6 | 100 | A11/B6/C6 | 17/17/8 | 7.8 | | | | |
| COMPARATIVE EXAMPLE 3 | R INK | PR177D/PR254D | 50/50 | A12/B7/C8 | 12/12/6 | 7.2 | 1.2 | 0.54 | 0 | 0.11 |
| | G INK | PG58/X1 | 90/10 | A12/B7/C8 | 9/9/3 | 8.4 | | | | |
| | B INK | PB15:6 | 100 | A12/B7/C8 | 17/17/8 | 7.4 | | | | |
| COMPARATIVE EXAMPLE 4 | R INK | PR177D/PR254D | 50/50 | A11/B6/C6 | 12/12/6 | 7.6 | 0.4 | 0.49 | 1.4 | 0 |
| | G INK | PG58 | 100 | A1/B1/C1 | 9/9/3 | 7.8 | | | | |
| | B INK | PB15:6 | 100 | A12/B7/C8 | 17/17/8 | 7.4 | | | | |
| COMPARATIVE EXAMPLE 5 | R INK | PR177D/PR254D | 50/50 | A11/B6/C6 | 12/12/6 | 7.6 | 0.2 | — | 1.4 | — |
| | G INK | PG36/X1 | 90/10 | A1/B1/C1 | 9/9/3 | 7.4 | | | | |
| | B INK | PB15:6 | 100 | A12/B7/C8 | 17/17/8 | 7.4 | | | | |
| COMPARATIVE EXAMPLE 6 | R INK | PR177D/PR254D | 50/50 | A11/B6/C6 | 12/12/6 | 7.6 | 0.5 | 0.54 | 1.4 | 0 |
| | G INK | PG58/PY150 | 90/10 | A1/B1/C1 | 9/9/3 | 7.9 | | | | |
| | B INK | PB15:6 | 100 | A12/B7/C8 | 17/17/8 | 7.4 | | | | |

TABLE 6

| | | FINE DISPERSION STEP FIRST TREATMENT | | | | | | |
|---|---|---|---|---|---|---|---|---|
| | | PREPARATORY DISPERSION STEP | | | FIRST INORGANIC BEADS | | | |
| | | TREATMENT TIME (min.) | ROTATIONAL SPEED (rpm) | AVERAGE PARTICLE DIAMETER (mm) | AMOUNT (PARTS BY wt.) PER 100 PARTS BY WEIGHT OF DISPERSING-AGENT-DISPERSED LIQUID | TREATMENT TIME (min.) | ROTATIONAL SPEED (rpm) | PIGMENT CONTENT (wt %) |
| EXAMPLE 1 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| EXAMPLE 2 | R INK | 15 | 1200 | 0.6 | 300 | 20 | 2500 | 17 |
| | G INK | 5 | 2000 | 0.7 | 450 | 25 | 1900 | 17 |
| | B INK | 6 | 1900 | 0.8 | 550 | 25 | 2300 | 14 |
| EXAMPLE 3 | R INK | 12 | 1500 | 0.7 | 400 | 25 | 2500 | 17 |
| | G INK | 6 | 2200 | 0.8 | 400 | 25 | 1900 | 17 |
| | B INK | 6 | 1800 | 0.8 | 450 | 25 | 2300 | 13 |
| EXAMPLE 4 | R INK | 12 | 1600 | 0.8 | 400 | 25 | 2500 | 17 |
| | G INK | 6 | 2100 | 0.9 | 400 | 25 | 1900 | 17 |
| | B INK | 6 | 1900 | 0.9 | 450 | 25 | 2300 | 13 |
| EXAMPLE 5 | R INK | 12 | 1500 | 0.7 | 400 | 22 | 2600 | 17 |
| | G INK | 6 | 2200 | 0.8 | 400 | 22 | 2000 | 17 |
| | B INK | 6 | 1800 | 0.8 | 450 | 22 | 2500 | 13 |
| EXAMPLE 6 | R INK | 12 | 1500 | 0.7 | 400 | 25 | 2500 | 17 |
| | G INK | 6 | 2200 | 0.8 | 400 | 25 | 1900 | 17 |
| | B INK | 6 | 1800 | 0.8 | 450 | 25 | 2300 | 13 |
| EXAMPLE 7 | R INK | 12 | 1500 | 0.7 | 400 | 25 | 2500 | 17 |
| | G INK | 6 | 2200 | 0.8 | 400 | 25 | 1900 | 17 |
| | B INK | 6 | 1800 | 0.8 | 450 | 25 | 2300 | 13 |

| | | FINE DISPERSION STEP SECOND TREATMENT | | | | | CURABLE RESIN MIXING STEP | | |
|---|---|---|---|---|---|---|---|---|---|
| | | SECOND INORGANIC BEADS | | | | | | | |
| | | AVERAGE PARTICLE DIAMETER (mm) | AMOUNT (PARTS BY wt.) PER 100 PARTS BY WEIGHT OF DISPERSING-AGENT-DISPERSED LIQUID | TREATMENT TIME (min.) | ROTATIONAL SPEED (rpm) | PIGMENT CONTENT (wt %) | TREATMENT TIME (min.) | ROTATIONAL SPEED (rpm) | PIGMENT CONTENT (wt %) |
| EXAMPLE 1 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| EXAMPLE 2 | R INK | 0.07 | 350 | 20 | 3000 | 13 | 40 | 3000 | 7.1 |
| | G INK | 0.2 | 500 | 25 | 2200 | 13 | 45 | 3500 | 9.8 |
| | B INK | 0.1 | 550 | 30 | 1900 | 12 | 35 | 2800 | 4.8 |
| EXAMPLE 3 | R INK | 0.08 | 400 | 25 | 2700 | 13 | 20 | 2400 | 7.2 |
| | G INK | 0.1 | 500 | 25 | 2000 | 13 | 30 | 2300 | 10.1 |
| | B INK | 0.1 | 450 | 25 | 2100 | 12 | 30 | 2200 | 4.8 |
| EXAMPLE 4 | R INK | 0.08 | 400 | 25 | 2700 | 13 | 20 | 2400 | 7.2 |
| | G INK | 0.1 | 500 | 25 | 2000 | 13 | 30 | 2300 | 10.1 |
| | B INK | 0.1 | 450 | 25 | 2100 | 12 | 30 | 2200 | 4.8 |
| EXAMPLE 5 | R INK | 0.08 | 400 | 25 | 2700 | 13 | 20 | 2400 | 7.2 |
| | G INK | 0.1 | 500 | 25 | 2000 | 13 | 30 | 2300 | 10.1 |
| | B INK | 0.1 | 450 | 25 | 2100 | 12 | 30 | 2200 | 4.8 |
| EXAMPLE 6 | R INK | 0.08 | 450 | 25 | 2700 | 13 | 20 | 2400 | 7.2 |
| | G INK | 0.1 | 450 | 25 | 2000 | 13 | 30 | 2300 | 10.1 |
| | B INK | 0.1 | 500 | 25 | 2100 | 12 | 30 | 2200 | 4.8 |
| EXAMPLE 7 | R INK | 0.08 | 400 | 25 | 2500 | 15 | 20 | 2400 | 7.2 |
| | G INK | 0.1 | 500 | 25 | 2200 | 12 | 30 | 2300 | 10.1 |
| | B INK | 0.1 | 450 | 25 | 2200 | 11 | 30 | 2200 | 4.8 |

TABLE 7

| | | FINE DISPERSION STEP FIRST TREATMENT ||||||
| | | PREPARATORY DISPERSION STEP || FIRST INORGANIC BEADS ||| |
| | | TREATMENT TIME (min.) | ROTATIONAL SPEED (rpm) | AVERAGE PARTICLE DIAMETER (mm) | AMOUNT (PARTS BY wt.) PER 100 PARTS BY WEIGHT OF DESPERSING-AGENT-DISPERSED LIQUID | TREATMENT TIME (min.) | ROTATIONAL SPEED (rpm) | PIGMENT CONTENT (wt %) |
|---|---|---|---|---|---|---|---|---|
| EXAMPLE 8 | R INK | 10 | 2000 | 0.8 | 500 | 30 | 2000 | 16 |
| | G INK | 3 | 2500 | 1.0 | 350 | 35 | 1700 | 17 |
| | B INK | 7 | 1800 | 0.8 | 500 | 30 | 2000 | 12 |
| EXAMPLE 9 | R INK | 15 | 1200 | 0.6 | 300 | 20 | 2500 | 17 |
| | G INK | 5 | 2000 | 0.7 | 450 | 25 | 1900 | 17 |
| | B INK | 6 | 1900 | 0.8 | 550 | 25 | 2300 | 14 |
| EXAMPLE 10 | R INK | 2 | 4200 | 1.3 | 550 | 60 | 4000 | 16 |
| | G INK | 2 | 4100 | 1.4 | 500 | 70 | 4200 | 15 |
| | B INK | 2 | 4000 | 1.3 | 550 | 70 | 4000 | 10 |
| EXAMPLE 11 | R INK | 25 | 2200 | 0.7 | 500 | 10 | 2000 | 16 |
| | G INK | 30 | 2400 | 1.1 | 350 | 12 | 1700 | 13 |
| | B INK | 25 | 2000 | 0.6 | 500 | 10 | 2000 | 15 |
| EXAMPLE 12 | R INK | 8 | 2000 | 0.4 | 500 | 40 | 2000 | 17 |
| | G INK | 10 | 2500 | 0.4 | 350 | 40 | 1700 | 15 |
| | B INK | 7 | 1800 | 0.4 | 500 | 40 | 2000 | 10 |
| EXAMPLE 13 | R INK | 15 | 1000 | 0.4 | 200 | 60 | 1000 | 16 |
| | G INK | 20 | 1200 | 0.4 | 250 | 70 | 1100 | 15 |
| | B INK | 15 | 1000 | 0.4 | 300 | 70 | 1000 | 10 |
| EXAMPLE 14 | R INK | 18 | 1400 | 0.5 | 250 | 50 | 1800 | 15 |
| | G INK | 20 | 1200 | 0.4 | 250 | 70 | 1100 | 17 |
| | B INK | 15 | 1300 | 0.5 | 250 | 50 | 1600 | 13 |

| | | FINE DISPERSION STEP SECOND TREATMENT |||||| CURABLE RESIN MIXING STEP |||
| | | SECOND INORGANIC BEADS ||| | | | ||||
| | | AVERAGE PARTICLE DIAMETER (mm) | AMOUNT (PARTS BY wt.) PER 100 PARTS BY WEIGHT OF DISPERSING-AGENT-DISPERSED LIQUID | TREATMENT TIME (min.) | ROTATIONAL SPEED (rpm) | PIGMENT CONTENT (wt %) | TREATMENT TIME (min.) | ROTATIONAL SPEED (rpm) | PIGMENT CONTENT (wt %) |
|---|---|---|---|---|---|---|---|---|---|
| EXAMPLE 8 | R INK | 0.1 | 500 | 30 | 2000 | 13 | 10 | 2000 | 7.0 |
| | G INK | 0.1 | 450 | 20 | 2500 | 14 | 25 | 2000 | 9.8 |
| | B INK | 0.1 | 500 | 30 | 2000 | 8 | 30 | 1800 | 4.6 |
| EXAMPLE 9 | R INK | 0.07 | 350 | 20 | 3000 | 13 | 40 | 3000 | 6.8 |
| | G INK | 0.2 | 500 | 25 | 2200 | 13 | 45 | 3500 | 9.3 |
| | B INK | 0.1 | 550 | 30 | 1900 | 12 | 35 | 2800 | 4.5 |
| EXAMPLE 10 | R INK | 0.1 | 180 | 50 | 4000 | 14 | 15 | 1400 | 7.3 |
| | G INK | 0.1 | 170 | 45 | 4000 | 13 | 20 | 2100 | 10.1 |
| | B INK | 0.1 | 180 | 50 | 4000 | 8 | 25 | 2000 | 4.9 |
| EXAMPLE 11 | R INK | 0.1 | 500 | 35 | 2300 | 14 | 20 | 1600 | 7.3 |
| | G INK | 0.1 | 450 | 40 | 2700 | 12 | 25 | 1800 | 10.1 |
| | B INK | 0.1 | 500 | 30 | 2200 | 10 | 30 | 1600 | 4.9 |
| EXAMPLE 12 | R INK | 0.07 | 500 | 35 | 2000 | 15 | 20 | 2700 | 7.3 |
| | G INK | 0.05 | 450 | 30 | 2500 | 14 | 25 | 3000 | 10.1 |
| | B INK | 0.1 | 500 | 40 | 2000 | 9 | 30 | 2500 | 4.9 |
| EXAMPLE 13 | R INK | 0.1 | 600 | 50 | 2200 | 14 | 15 | 1600 | 7.3 |
| | G INK | 0.1 | 600 | 45 | 2500 | 13 | 20 | 2300 | 10.1 |
| | B INK | 0.1 | 550 | 50 | 2300 | 8 | 25 | 2100 | 4.9 |
| EXAMPLE 14 | R INK | 0.1 | 550 | 35 | 2700 | 13 | 20 | 2000 | 7.3 |
| | G INK | 0.1 | 600 | 45 | 2500 | 15 | 20 | 2300 | 10.1 |
| | B INK | 0.1 | 550 | 40 | 2800 | 10 | 25 | 2000 | 4.9 |

TABLE 8

| | | FINE DISPERSION STEP FIRST TREATMENT ||||||| 
| | | PREPARATORY DISPERSION STEP || FIRST INORGANIC BEADS ||||| 
| | | TREATMENT TIME (min.) | ROTATIONAL SPEED (rpm) | AVERAGE PARTICLE DIAMETER (mm) | AMOUNT (PARTS BY wt.) PER 100 PARTS BY WEIGHT OF DESPERSING-AGENT-DISPERSED LIQUID | TREATMENT TIME (min.) | ROTATIONAL SPEED (rpm) | PIGMENT CONTENT (wt %) |
|---|---|---|---|---|---|---|---|---|
| COMPARATIVE EXAMPLE 1 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| COMPARATIVE EXAMPLE 2 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| COMPARATIVE EXAMPLE 3 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| COMPARATIVE EXAMPLE 4 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| COMPARATIVE EXAMPLE 5 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |
| COMPARATIVE EXAMPLE 6 | R INK | 3 | 2500 | 1.0 | 350 | 35 | 1700 | 17 |
| | G INK | 10 | 2000 | 0.8 | 500 | 30 | 2000 | 16 |
| | B INK | 7 | 1800 | 0.8 | 500 | 30 | 2000 | 12 |

| | | FINE DISPERSION STEP SECOND TREATMENT ||||| CURABLE RESIN MIXING STEP |||
| | | SECOND INORGANIC BEADS ||||||||
| | | AVERAGE PARTICLE DIAMETER (mm) | AMOUNT (PARTS BY wt.) PER 100 PARTS BY WEIGHT OF DISPERSING-AGENT-DISPERSED LIQUID | TREATMENT TIME (min.) | ROTATIONAL SPEED (rpm) | PIGMENT CONTENT (wt %) | TREATMENT TIME (min.) | ROTATIONAL SPEED (rpm) | PIGMENT CONTENT (wt %) |
|---|---|---|---|---|---|---|---|---|---|
| COMPARATIVE EXAMPLE 1 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| COMPARATIVE EXAMPLE 2 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| COMPARATIVE EXAMPLE 3 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| COMPARATIVE EXAMPLE 4 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| COMPARATIVE EXAMPLE 5 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |
| COMPARATIVE EXAMPLE 6 | R INK | 0.1 | 450 | 20 | 2500 | 13 | 25 | 2000 | 7.3 |
| | G INK | 0.1 | 500 | 30 | 2000 | 14 | 10 | 2000 | 10.1 |
| | B INK | 0.1 | 500 | 30 | 2000 | 8 | 30 | 1800 | 4.9 |

Evaluation of Stability of Color Filter Ink (Durability Evaluation)

3-1. Change in Appearance After Heating

The color filter ink of the examples and comparative examples was left for 10 days in a 50° C. environment, after which the ink was visually observed and evaluated according to the four criteria shown below.

A: No change from the state prior to heating was observed.
B: Slight aggregation/precipitation of pigment particles was observed.
C: Aggregation/precipitation of pigment particles was plainly observed.
D: Severe aggregation/precipitation of pigment particles was observed.

3-2. Change in Viscosity

The viscosity (kinetic viscosity) of the color filter ink of the examples and comparative examples was measured after the ink was left for 10 days in a 50° C. environment, and the difference in viscosity was calculated with respect to the viscosity immediately after manufacture. Specifically, the difference indicated by $v_1-v_0$ was calculated, wherein $v_0$ (mPa·s) is the viscosity immediately after manufacturing, and $v_1$ (mPa·s) is the viscosity after the ink was left for 10 days in a 50° C. environment. The values calculated in this manner were evaluated according to the five criteria shown below.

A: The value of $v_1-v_0$ is less than 0.3 mPa·s.
B: The value of $v_1-v_0$ is 0.3 mPa·s or higher and less than 0.5 mPa·s.
C: The value of $v_1-v_0$ is 0.5 mPa·s or higher and less than 0.8 mPa·s.
D: The value of $v_1-v_0$ is 0.8 mPa·s or higher and less than 1.2 mPa·s.
E: The value of $v_1-v_0$ is 1.2 mPa·s or higher.

4. Evaluation of Stability of Droplet Discharge (Evaluation of Stable Discharge Properties)

Evaluation by testing as described below was performed using the color filter ink (color filter ink immediately after manufacturing) obtained in the examples and comparative examples, and the color filter ink that was left for 10 days in a 50° C. environment (color filter ink left in a heated environment).

4-1. Evaluation of Landing Position Accuracy

A droplet discharge device such as that shown in FIGS. 3 to 6 disposed in a chamber (thermal chamber) and the ink sets for a color filter of the examples and comparative examples were prepared, and 200,000 droplets (200,000 drops) of the inks were continuously discharged from the nozzles of a droplet discharge head in a state in which the drive waveform of the piezoelement had been optimized. The average value of the offset distance d from the center aim position of the center position of the landed droplets was calculated for the 200,000 droplets discharged from specified nozzles in the vicinity of the center of the droplet discharge head, and an evaluation was made based on the four ranges described below. It is apparent that the smaller this value is the more effectively prevented the occurrence of flight deflection is. The average value obtained for the three colors of ink constituting the color filter ink set was used as the average value of the offset distance d.

A: The average value of the offset distance d is less than 0.05 µm
B: The average value of the offset distance d is 0.05 µm or more and less than 0.12 µm.
C: The average value of the offset distance d is 0.12 µm or more and less than 0.18 µm
D: The average value of the offset distance d is 0.18 or more

4-2. Evaluation of Stability of Droplet Discharge Quantity

A droplet discharge device such as that shown in FIGS. 3 to 6 disposed in a chamber (thermal chamber), and the ink sets for a color filter of the examples and comparative examples were prepared, and 200,000 droplets (200,000 drops) of the inks were continuously discharged from the nozzles of a droplet discharge head in a state in which the drive waveform of the piezoelement had been optimized. The total weight of the discharged droplets was calculated for two specific nozzles at the left and right ends of the droplet discharge head, and the absolute value $\Delta W$ (ng) of the difference between the average discharge quantities of the droplets discharged from the two nozzles was calculated. The ratio ($\Delta W/W_T$) of the $\Delta W$ in relation to the target discharge quantity $W_T$ (ng) of the droplets was calculated, and an evaluation was made based on the four ranges described below. It is apparent that the smaller the value of $\Delta W/W_T$ is, the greater the stability of the droplet discharge quantity. The average value obtained for the three colors of ink constituting the color filter ink set was used as the average value of $\Delta W/W_T$.

A: The value of $\Delta W/W_T$ is less than 0.070
B: The value of $\Delta W/W_T$ is 0.070 or higher and less than 0.450
C: The value of $\Delta W/W_T$ is 0.450 or higher and less than 0.780
D: The value of $\Delta W/W_T$ is 0.780 or higher

4-3. Evaluation of Intermittent Printing Performance

A droplet discharge device such as that shown in FIGS. 3 to 6 disposed in a chamber (thermal chamber), and the ink sets for a color filter of the examples and comparative examples were prepared, and 10,000 droplets (10,000 drops) of the inks were continuously discharged from the nozzles of a droplet discharge head in a state in which the drive waveform of the piezoelement had been optimized, after which droplet discharge was stopped for 90 seconds (first sequence). Thereafter, droplets were continuously discharged in the same manner and the operation of stopping the discharge of droplets was repeated. The average weight $W_1$ (ng) of the droplets discharged in the first sequence and the average weight $W_{30}$ (ng) of the droplets discharged in the $30^{th}$ sequence were calculated for the specified nozzles in the vicinity of the center of the droplet discharge head. The ratio ($|W_1-W_{30}|/W_T$) of the absolute value of the difference between $W_1$ and $W_{30}$ in relation to the target discharge quantity $W_T$ (ng) of the droplets was calculated, and an evaluation was made based on the three ranges described below. It is apparent that the smaller the value of $|W_1-W_{30}|/W_T$ is, the greater the intermittent printing performance (stability of the droplet discharge quantity). The average value obtained for the three colors of ink constituting the color filter ink set was used as the average value of $|W_1-W_{30}|/W_T$.

A: The value of $|W_1-W_{30}|/W_T$ is less than 0.080

B: The value of $|W_1-W_{30}|/W_T$ is 0.080 or higher and less than 0.750

C: The value of $|W_1-W_{30}|/W_T$ is 0.750 or higher

4-4. Continuous Discharge Test

The inks constituting the color filter ink set were discharged by continuously operating the droplet discharge device for 96 hours in an environment of 40% RH using a droplet discharge device such as that shown in FIGS. 3 to 6 disposed in a chamber (thermal chamber), and the color filter ink sets of the examples and comparative examples.

The rate ([(number of clogged nozzles)/(total number of nozzles)]×100) at which clogging of the nozzles constituting the droplet discharge head occurs after continuous operation was calculated, and it was investigated whether clogging can be eliminated using a cleaning member composed of a plastic material. The results were evaluated based on the four ranges described below. The average value obtained for the three colors of ink constituting the color filter ink set was used as the occurrence rate of nozzle clogging.

A: Nozzle clogging does not occur.

B: The occurrence rate of nozzle clogging is less than 0.8% (not including 0), and clogging can be eliminated by cleaning.

C: The occurrence rate of nozzle clogging is 0.8% or higher and less than 1.3%, and clogging can be eliminated by cleaning.

D: The occurrence rate of nozzle clogging is 1.3% or higher, and clogging cannot be eliminated by cleaning.

The evaluation described above was carried out in the same conditions for the examples and the comparative examples.

5. Manufacturing of Color Filters

A color filter was manufactured in the following manner using the color filter ink set (color filter ink set immediately after manufacturing) obtained in the examples and comparative examples, and the color filter ink set that was left for 10 days in a 50° C. environment (color filter ink set left in a heated environment).

First, a substrate (G5 size: 1100×1300 mm) composed of soda glass on which a silica ($SiO_2$) film for preventing elution of the sodium ions was formed on the two sides was prepared and washed.

Next, a radiation-sensitive composition for forming a partition wall containing carbon black was applied to the entire surface of one of the surfaces of the washed substrate to form a coated film.

Next, a prebaking treatment was performed at a heating temperature of 110° C. and a heating time of 120 seconds.

The substrate was thereafter irradiated via a photomask, subjected to post exposure baking (PEB), subsequently developed using an alkali development fluid, and then subjected to a post baking treatment to thereby form a partition wall. PEB was carried out at a heating temperature of 110° C., a heating time of 120 seconds, and an irradiation intensity of 150 mJ/cm². The development treatment time was set to 60 seconds. The post baking treatment was carried out at a heating temperature of 170° C. for a heating time of 5 minutes. The thickness of the partition wall thus formed was 2.1 μm.

Next, the color filter ink was discharged into the cells as areas surrounded by the partition wall by using a droplet discharge device such as that shown in FIGS. 3 to 6. In this case, three color filter inks were used, and care was taken that the color filter ink of each color was not mixed.

Thereafter, heat treatment is carried out for 10 minutes at 110° C. on a hot plate, and heat treatment was then carried out for one hour in an oven at 200° C., whereby three colored portions were formed. A color filter such as that shown in FIG. 1 was thereby obtained.

The color filter inks (ink sets) of the examples and the comparative examples were used to manufacture 3000 color filters of each ink set using the method described above.

6. Evaluation of Color Filters

The color filters obtained in the manner described above were evaluated in the manner described below.

6-1. Unevenness of Color and Saturation

Among the color filters manufactured using the color filter ink sets of the examples and the comparative examples, a liquid crystal display device such as that shown in FIG. 7 was manufactured under the same conditions using the $3000^{th}$ color filter manufactured of each example and comparative example.

Red monochromatic display, green monochromatic display, blue monochromatic display, and white monochromatic display were visually observed in a dark room using these liquid crystal display devices, and the occurrence of uneven color and uneven saturation between different regions was evaluated based on the five levels described below.

A: Uneven color and uneven saturation were not observed.

B: Uneven color and uneven saturation were substantially not observed.

C: Some uneven color and uneven saturation was observed.

D: Uneven color and uneven saturation were plainly observed.

E: Uneven color and uneven saturation were markedly observed.

6-2. Difference in Characteristics Between Units

Of the color filters manufactured using the color filter ink sets of the examples and the comparative examples, the first to the $20^{th}$ and the $2980^{th}$ to the $2999^{th}$ color filters manufactured of each example and the comparative example were prepared, and 100 pixels were extracted at random from each color filter. Red monochromatic display, green monochromatic display, blue monochromatic display, and white monochromatic display were carried out in a dark room for the extracted 100 pixels, and the colors were measured using a spectrophotometer (MCPD 3000, manufactured by Otsuka Electronics). The average value of the hue calculated for the abovementioned 100 pixels was used as the color filter hue for each color filter. The maximum color differences (color difference ΔE in the Lab display system) in the first to the $20^{th}$ and the $2980^{th}$ to the $2999^{th}$ color filters (total of 40 color filters) manufactured for each of the examples and comparative examples were calculated from the results and evaluated based on the five ranges described below.

A: Color difference (ΔE) is less than 0.7.

B: Color difference (ΔE) is 0.7 or more and less than 1.4.

C: Color difference (ΔE) is 1.4 or more and less than 1.9.

D: Color difference (ΔE) is 1.9 or more and less than 2.4.

E: Color difference (ΔE) is 2.4 or more.

6-3. Durability

Among the color filters manufactured using the color filter ink sets of the examples and the comparative examples, a liquid crystal display device such as that shown in FIG. 7 was manufactured under the same conditions using the 2001$^{th}$ to 2010$^{th}$ color filters manufactured of each example and the comparative example.

Red monochromatic display, green monochromatic display, and blue monochromatic display were visually observed in a dark room using these liquid crystal display devices, and the occurrence of light leakage (white spots, luminescent spots) was checked.

Next, the color filters were removed from the liquid crystal display devices.

The color filters thus removed were left sitting for 1.5 hours at 20° C., then 2 hours at 50° C., subsequently 1.5 hours at 20° C., and then 3 hours at −5° C. Thereafter, the environment temperature was again restored to 20° C. to complete a single cycle (8 hours), and this cycle was repeated for a total of 20 times (total of 160 hours).

Thereafter, liquid crystal display devices such as the one shown in FIG. 7 were again assembled using these color filters.

Red monochromatic display, green monochromatic display and blue monochromatic display were visually observed in a dark room using these liquid crystal display devices, and the occurrence of light leakage (white spots, luminescent spots) was evaluated based on the following five levels.

A: There was no color filter in which light leakage (white spots, luminescent spots) occurred.

B: Light leakage (white spots, luminescent spots) was observed in 1 to 2 color filters.

C: Light leakage (white spots, luminescent spots) was observed in 3 to 5 color filters.

D: Light leakage (white spots, luminescent spots) was observed in 6 to 9 color filters.

E: Light leakage (white spots, luminescent spots) was observed in 10 color filters.

7. Evaluation of Color Reproduction Range

Colored substrates corresponding to each color of ink were fabricated as described below using color filter ink sets of the examples and comparative examples.

An ink composed of the color filter ink set was first applied by inkjet application on a glass substrate having a thickness of 7 mm in which 30 mm×30 mm partition walls (having a thickness of 2.1 μm) were formed. The quantity of ink applied was sufficient to give a thickness of 1.60 μm after baking.

Heat treatment for 10 minutes at a temperature of 100° C. on a hot plate was then performed, and further heat treatment for 1 hour in a 200° C. oven was performed, whereby a colored substrate was obtained on which a colored film having a thickness of 1.60 μm was formed.

The transmission spectrum was measured by a spectrophotometer (MCPD 3000, manufactured by Otsuka Electronics) for the three colored substrates obtained as described above corresponding to the inks using a standard C light source. The hue (R(xy), G(xy), B(xy)) according to an xy display system was calculated, the NTSC ratio was computed, and evaluation was performed according to the five ranges described below. A higher NTSC ratio can be considered to indicate a wider color reproduction range.

A: NTSC ratio is 30% or higher.

B: NTSC ratio is 72% or higher and less than 80%.

C: NTSC ratio is less than 72%.

In the evaluations described above, the color filters and glass substrates were observed and measured under the same conditions.

These results are shown in Tables 9, 10, and 11. In the tables, the color filter ink immediately after manufacturing is indicated as "before heating," and the color filter ink left for 10 days in a 50° C. environment (color filter ink left in a heated environment) is indicated as "after heating."

TABLE 9

| | | APPEARANCE CHANGE AFTER HEATING | CHANGE IN VISCOSITY | DISCHARGE CHARACTERISTICS EVALUATION | | | |
|---|---|---|---|---|---|---|---|
| | | | | LANDING POSITION ACCURACY | | STABILITY OF DROPLET DISCHARGE QUANTITY | |
| | | | | BEFORE HEATING | AFTER HEATING | BEFORE HEATING | AFTER HEATING |
| EXAMPLE 1 | R INK | A | A | A | A | A | A |
| | G INK | | | | | | |
| | B INK | | | | | | |
| EXAMPLE 2 | R INK | A | A | A | A | A | A |
| | G INK | | | | | | |
| | B INK | | | | | | |
| EXAMPLE 3 | R INK | A | A | A | A | A | A |
| | G INK | | | | | | |
| | B INK | | | | | | |
| EXAMPLE 4 | R INK | A | A | A | A | A | A |
| | G INK | | | | | | |
| | B INK | | | | | | |
| EXAMPLE 5 | R INK | A | A | A | A | A | A |
| | G INK | | | | | | |
| | B INK | | | | | | |
| EXAMPLE 6 | R INK | A | A | A | A | A | A |
| | G INK | | | | | | |
| | B INK | | | | | | |
| EXAMPLE 7 | R INK | A | A | A | A | A | A |
| | G INK | | | | | | |
| | B INK | | | | | | |

TABLE 9-continued

| | | DISCHARGE CHARACTERISTICS EVALUATION | | | | | |
|---|---|---|---|---|---|---|---|
| | | INTERMITTENT PRINTING PERFORMANCE | | CONTINUOUS DISCHARGE TEST | | COLOR AND SATURATION VARIATION | |
| | | BEFORE HEATING | AFTER HEATING | BEFORE HEATING | AFTER HEATING | BEFORE HEATING | AFTER HEATING |
| EXAMPLE 1 | R INK G INK B INK | A | A | A | A | A | A |
| EXAMPLE 2 | R INK G INK B INK | A | A | A | A | A | A |
| EXAMPLE 3 | R INK G INK B INK | A | A | A | A | A | A |
| EXAMPLE 4 | R INK G INK B INK | A | A | A | A | A | A |
| EXAMPLE 5 | R INK G INK B INK | A | A | A | A | A | A |
| EXAMPLE 6 | R INK G INK B INK | A | A | A | A | A | A |
| EXAMPLE 7 | R INK G INK B INK | A | A | A | A | A | A |

| | | DIFFERENCE IN CHARACTERISTICS BETWEEN UNITS | | DURABILITY | | COLOR REPRODUCTION RANGE | |
|---|---|---|---|---|---|---|---|
| | | BEFORE HEATING | AFTER HEATING | BEFORE HEATING | AFTER HEATING | BEFORE HEATING | AFTER HEATING |
| EXAMPLE 1 | R INK G INK B INK | A | A | A | A | A | A |
| EXAMPLE 2 | R INK G INK B INK | A | A | A | A | A | A |
| EXAMPLE 3 | R INK G INK B INK | A | A | A | A | A | A |
| EXAMPLE 4 | R INK G INK B INK | A | A | A | A | A | A |
| EXAMPLE 5 | R INK G INK B INK | A | A | A | A | A | A |
| EXAMPLE 6 | R INK G INK B INK | A | A | A | A | A | A |
| EXAMPLE 7 | R INK G INK B INK | A | A | A | A | A | A |

TABLE 10

| | | APPEARANCE | | DISCHARGE CHARACTERISTICS EVALUATION | | | | | | | |
|---|---|---|---|---|---|---|---|---|---|---|---|
| | | | | LANDING POSITION ACCURACY | | STABILITY OF DROPLET DISCHARGE QUANTITY | | INTERMITTENT PRINTING PERFORMANCE | | CONTINUOUS DISCHARGE TEST | |
| | | CHANGE AFTER HEATING | CHANGE IN VISCOSITY | BEFORE HEAT-ING | AFTER HEAT-ING | BEFORE HEAT-ING | AFTER HEAT-ING | BEFORE HEAT-ING | AFTER HEAT-ING | BEFORE HEAT-ING | AFTER HEAT-ING |
| EXAMPLE 8 | R INK G INK B INK | A A A | A A A | A | B | A | B | A | B | A | B |

TABLE 10-continued

| | | | | | | | | | | | |
|---|---|---|---|---|---|---|---|---|---|---|---|
| EXAMPLE 9 | R INK | B | B | B | B | A | B | B | B | A | B |
| | G INK | B | B | | | | | | | | |
| | B INK | B | B | | | | | | | | |
| EXAMPLE 10 | R INK | A | A | A | B | A | A | A | B | A | A |
| | G INK | A | B | | | | | | | | |
| | B INK | A | A | | | | | | | | |
| EXAMPLE 11 | R INK | A | A | B | B | B | B | B | B | B | B |
| | G INK | B | B | | | | | | | | |
| | B INK | A | A | | | | | | | | |
| EXAMPLE 12 | R INK | A | A | A | B | A | B | A | B | A | B |
| | G INK | A | B | | | | | | | | |
| | B INK | A | A | | | | | | | | |
| EXAMPLE 13 | R INK | A | A | A | B | A | B | A | A | A | A |
| | G INK | A | B | | | | | | | | |
| | B INK | A | A | | | | | | | | |
| EXAMPLE 14 | R INK | A | A | A | B | A | B | A | B | A | A |
| | G INK | A | A | | | | | | | | |
| | B INK | A | A | | | | | | | | |

| | | COLOR AND SATURATION VARIATION | | DIFFERENCES IN CHARACTERISTICS BETWEEN UNITS | | DURABILITY | | COLOR REPRODUCTION RANGE | |
|---|---|---|---|---|---|---|---|---|---|
| | | BEFORE HEATING | AFTER HEATING | BEFORE HEATING | AFTER HEATING | BEFORE HEATING | AFTER HEATING | BEFORE HEATING | AFTER HEATING |
| EXAMPLE 8 | R INK | A | B | A | B | B | B | A | A |
| | G INK | | | | | | | | |
| | B INK | | | | | | | | |
| EXAMPLE 9 | R INK | A | B | A | B | A | B | A | A |
| | G INK | | | | | | | | |
| | B INK | | | | | | | | |
| EXAMPLE 10 | R INK | A | A | A | A | A | B | A | A |
| | G INK | | | | | | | | |
| | B INK | | | | | | | | |
| EXAMPLE 11 | R INK | A | B | A | B | A | A | A | A |
| | G INK | | | | | | | | |
| | B INK | | | | | | | | |
| EXAMPLE 12 | R INK | A | A | A | A | A | B | A | A |
| | G INK | | | | | | | | |
| | B INK | | | | | | | | |
| EXAMPLE 13 | R INK | A | A | A | B | A | B | A | A |
| | G INK | | | | | | | | |
| | B INK | | | | | | | | |
| EXAMPLE 14 | R INK | A | A | A | B | A | A | A | A |
| | G INK | | | | | | | | |
| | B INK | | | | | | | | |

TABLE 11

| | | | | DISCHARGE CHARACTERISTICS EVALUATION | | | | | | | |
|---|---|---|---|---|---|---|---|---|---|---|---|
| | | APPEARANCE | | LANDING POSITION ACCURACY | | STABILITY OF DROPLET DISCHARGE QUANTITY | | INTERMITTENT PRINTING PERFORMANCE | | CONTINUOUS DISCHARGE TEST | |
| | | CHANGE AFTER HEATING | CHANGE IN VISCOSITY | BEFORE HEATING | AFTER HEATING | BEFORE HEATING | AFTER HEATING | BEFORE HEATING | AFTER HEATING | BEFORE HEATING | AFTER HEATING |
| COMPARATIVE EXAMPLE 1 | R INK | A | A | B | C | B | C | B | C | B | C |
| | G INK | A | A | | | | | | | | |
| | B INK | A | A | | | | | | | | |
| COMPARATIVE EXAMPLE 2 | R INK | A | A | B | C | B | C | B | C | B | C |
| | G INK | A | A | | | | | | | | |
| | B INK | A | A | | | | | | | | |
| COMPARATIVE EXAMPLE 3 | R INK | A | A | B | C | B | C | B | C | B | C |
| | G INK | A | A | | | | | | | | |
| | B INK | A | A | | | | | | | | |
| COMPARATIVE EXAMPLE 4 | R INK | A | A | D | D | D | D | C | C | D | D |
| | G INK | D | E | | | | | | | | |
| | B INK | A | A | | | | | | | | |
| COMPARATIVE EXAMPLE 5 | R INK | A | A | C | D | C | D | B | C | C | D |
| | G INK | C | C | | | | | | | | |
| | B INK | A | A | | | | | | | | |

TABLE 11-continued

| | | COLOR AND SATURATION VARIATION | | DIFFERENCES IN CHARACTERISTICS BETWEEN UNITS | | DURABILITY | | COLOR REPRODUCTION RANGE | |
|---|---|---|---|---|---|---|---|---|---|
| COMPARATIVE EXAMPLE 6 | R INK G INK B INK | A D A | A E A | D | D D | D | C | C D | D |

| | | COLOR AND SATURATION VARIATION | | DIFFERENCES IN CHARACTERISTICS BETWEEN UNITS | | DURABILITY | | COLOR REPRODUCTION RANGE | |
|---|---|---|---|---|---|---|---|---|---|
| | | BEFORE HEATING | AFTER HEATING | BEFORE HEATING | AFTER HEATING | BEFORE HEATING | AFTER HEATING | BEFORE HEATING | AFTER HEATING |
| COMPARATIVE EXAMPLE 1 | R INK G INK B INK | D | E | D | E | D | E | A | A |
| COMPARATIVE EXAMPLE 2 | R INK G INK B INK | D | E | D | E | D | E | A | A |
| COMPARATIVE EXAMPLE 3 | R INK G INK B INK | D | E | D | E | D | E | A | A |
| COMPARATIVE EXAMPLE 4 | R INK G INK B INK | E | E | E | E | E | E | C | C |
| COMPARATIVE EXAMPLE 5 | R INK G INK B INK | C | D | C | D | C | D | C | C |
| COMPARATIVE EXAMPLE 6 | R INK G INK B INK | E | E | E | E | E | E | B | B |

As is clear from the tables, the stability of droplet discharge was excellent in the color filter ink set of the present invention, and stable droplet discharge could be performed for a long period of time. In the present invention, the occurrence of uneven color, uneven saturation, and light leakage was suppressed in the manufactured color filters, and there was minimal variation of characteristics between units. An adequately excellent color reproduction range was also obtained in the present invention. The color filter also had excellent durability in the present invention. In the present invention, the color filter ink had excellent stability over time, droplet discharge could be suitably performed even after the color filter ink was left in heated conditions, and color filters having excellent quality could be stably manufactured. In contrast, satisfactory results were not obtained in the comparative examples.

The similar results as described above were also obtained when a commercially available liquid crystal television was disassembled, the liquid crystal display device unit was replaced by a unit manufactured as described above, and the same evaluations as described above were performed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A color filter ink set adapted to be used to manufacture a color filter by an inkjet method, the color filter ink set comprising:

a plurality of inks with each of the inks including a colorant and a liquid medium that disperses and/or dissolves the colorant, the inks including a green ink having C. I. Pigment Green 58 and a substance represented by a chemical formula (1) below,

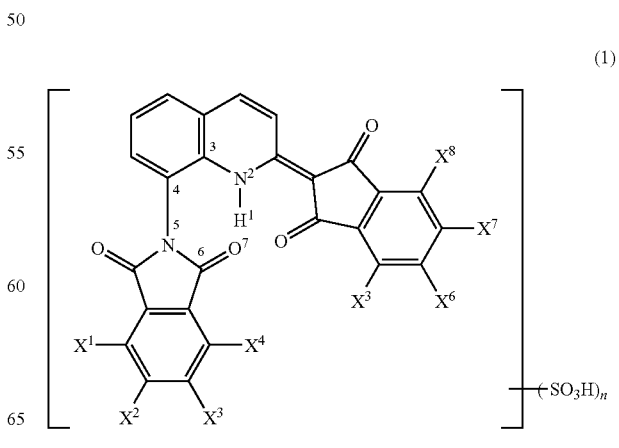

(1)

wherein, in the chemical formula (1), a value n is an integer from 1 to 5, and $X^1$ through $X^8$ represents each independently a hydrogen atom or a halogen atom, a viscosity at 25° C. of the liquid medium of the green ink being lower than a viscosity at 25° C. of the liquid medium of the ink other than the green ink, a difference ($\eta_{max} - \eta_{min}$) between a viscosity ($\eta_{max}$ (mPa·s)) of the ink having the highest viscosity among the inks at 25° C. and a viscosity ($\eta_{min}$ (mPa·s)) of the ink having the lowest viscosity among the inks at 25° C. being 1.0 mPa·s or less, the green ink including an acid-value dispersing agent having a predetermined acid value in a range from 5 to 370 KOH mg/g and an amine-value dispersing agent having a predetermined amine value in a range from 5 to 200 KOH mg/g, with the acid-value dispersing agent and the amine-value dispersing agent being arranged to satisfy a relationship $0.1 \leq C_A/C_B \leq 1$, wherein a value $C_A$ (wt %) is a content ratio of the acid-value dispersing agent in the green ink, and a value $C_B$ (wt %) is a content ratio of the amine-value dispersing agent in the green ink; and wherein at least one of the inks further includes a curable resin material having a first polymer containing at least a first epoxy-containing vinyl monomer as a monomer component.

2. The color filter ink set according to claim 1, wherein the inks further include a red ink having one or more substances selected from the group consisting of C. I. Pigment Red 177, C. I. Pigment Red 254, a pigment derivative represented by a chemical formula (2) below, and a pigment derivative represented by a chemical formula (3) below,

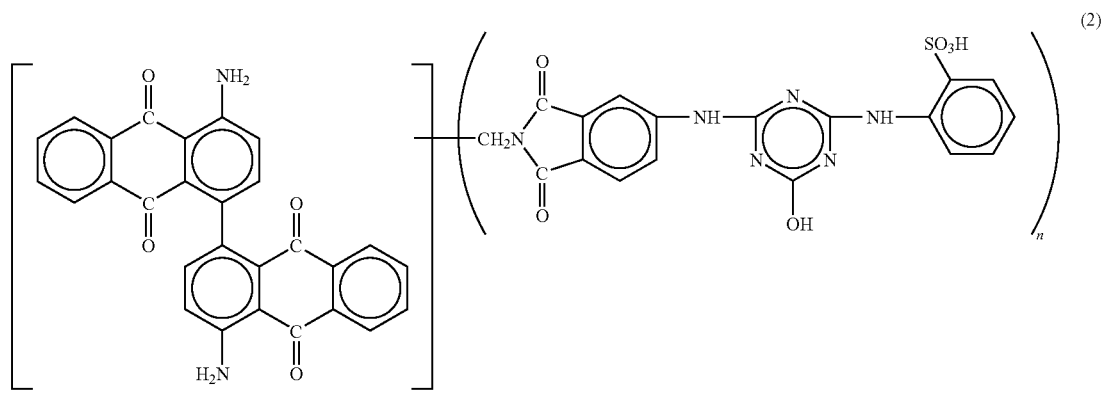

wherein, in the chemical formula (2), a value n is an integer from 1 to 4,

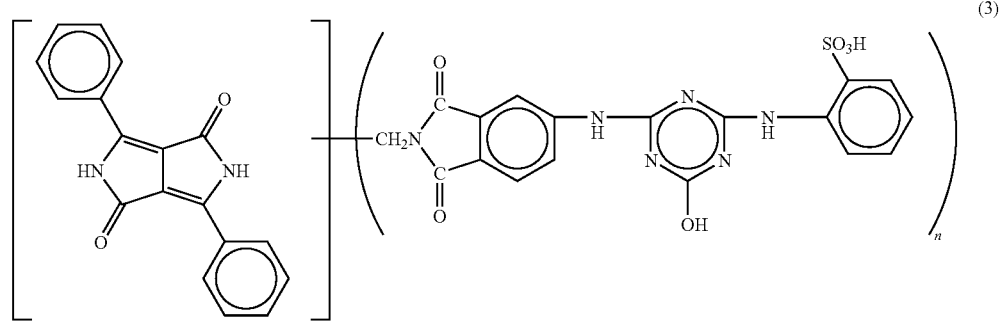

wherein, in the chemical formula (3), a value n is an integer from 1 to 4.

3. The color filter ink set according to claim 2, wherein a sum of a content ratio of C. I. Pigment Red 177, a content ratio of C. I. Pigment Red 254, a content ratio of the pigment derivative represented by the chemical formula (2), and a content ratio of the pigment derivative represented by the chemical formula (3) in the red ink is 3.0 to 10 wt %.

4. The color filter ink set according to claim 1, wherein the inks further include a blue ink having C. I. Pigment Blue 15:6.

5. The color filter ink set according to claim 4, wherein a content ratio of C. I. Pigment Blue 15:6 in the blue ink is 3.0 to 10 wt %.

6. The color filter ink set according to claim 1, wherein a content ratio of C. I. Pigment Green 58 in the green ink is 6.0 to 15 wt %.

7. The color filter ink set according to claim 1, wherein the inks are arranged to satisfy a relationship $0.02 \leq C_C/C_{G58} \leq 0.32$, wherein a value $C_{G58}$ (wt %) indicates a content ratio of C. I. Pigment Green 58 in the green ink and a value $C_C$ (wt %) indicates a content ratio of the substance represented by the chemical formula (1) in the green ink.

8. The color filter ink set according to claim 1, wherein the first polymer is a copolymer having the first epoxy-containing vinyl monomer and a second vinyl monomer as monomer components, the second vinyl monomer having an isocyanate group or a block isocyanate group in which an isocyanate group is protected by a protective group.

9. The color filter ink set according to claim 1, wherein the curable resin material further includes a second polymer containing at least an alkoxysilyl-containing vinyl monomer represented by a chemical formula (4) below as a monomer component,

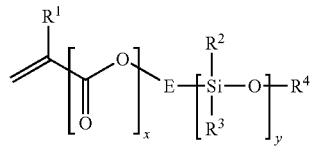
(4)

wherein, in the chemical formula (4), $R^1$ represents a hydrogen atom or a $C_{1-7}$ alkyl group, E represents a single bond hydrocarbon group or a bivalent hydrocarbon group, $R^2$ represents a $C_{1-6}$ alkyl group or a $C_{1-6}$ alkoxyl group, $R^3$ represents a $C_{1-6}$ alkyl group or a $C_{1-6}$ alkoxyl group, $R^4$ represents a $C_{1-6}$ alkyl group, a value x is 0 or 1, and a value y is an integer from 1 to 10.

10. The color filter ink set according to claim 1, wherein the acid-value dispersing agent and the amine-value dispersing agent are arranged to satisfy a relationship $0.01 \leq (AV \times C_A)/(BV \times C_B) \leq 1.9$, wherein a value AV (KOH mg/g) is the predetermined acid value of the acid-value dispersing agent, and a value BV (KOH mg/g) is the predetermined amine value of the amine-value dispersing agent.

11. A color filter manufactured using the color filter ink set according to claim 1.

12. An image display device having the color filter according to claim 11.

13. The image display device according to claim 12, wherein the image display device is a liquid crystal panel.

14. An electronic device having the image display device according to claim 12.

* * * * *